United States Patent
Hattori et al.

(10) Patent No.: US 7,036,936 B2
(45) Date of Patent: May 2, 2006

(54) DISPLAY SYSTEM

(75) Inventors: Toshikazu Hattori, Yokohama (JP);
Takashi Kuwabara, Yokohama (JP);
Susumu Ibaraki, Yokohama (JP);
Toshiyuki Itabashi, Yokohama (JP);
Morio Iwasaki, Musashino (JP);
Satoru Kotani, Yokohama (JP);
Toshiaki Mori, Mino (JP); Tomoo Hori, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/812,090

(22) Filed: Mar. 30, 2004

(65) Prior Publication Data
US 2004/0189947 A1  Sep. 30, 2004

(30) Foreign Application Priority Data

| Mar. 31, 2003 | (JP) | ............................ 2003-096175 |
| Aug. 27, 2003 | (JP) | ............................ 2003-302591 |
| Aug. 29, 2003 | (JP) | ............................ 2003-307695 |
| Sep. 1, 2003 | (JP) | ............................ 2003-308835 |

(51) Int. Cl.
*G03B 21/14* (2006.01)
(52) U.S. Cl. .......................................... 353/13; 353/79
(58) Field of Classification Search ................. 353/12, 353/13, 79, 119
See application file for complete search history.

(56) References Cited

U.S. PATENT DOCUMENTS

| 1,832,821 | A | * | 11/1931 | Sponable | ...................... 352/36 |
| 2,276,104 | A | * | 3/1942 | Shaunessey | ................... 353/13 |
| 2,571,903 | A | | 10/1951 | Loewi et al. | |
| 3,475,045 | A | * | 10/1969 | Willy | ............................ 296/21 |
| 4,701,627 | A | | 10/1987 | Gambuti et al. | |
| 4,908,611 | A | | 3/1990 | Iino | |
| 5,281,985 | A | * | 1/1994 | Chan | ............................ 353/13 |
| 5,822,023 | A | | 10/1998 | Suman et al. | |

FOREIGN PATENT DOCUMENTS

| DE | 19948896 C1 | 1/2001 |
| DE | 19938330 A1 | 2/2001 |
| DE | 20018639 U1 | 2/2001 |
| DE | 19939972 A1 | 3/2001 |
| FR | 2544675 | 10/1984 |
| JP | 59-126387 | 7/1984 |
| JP | 7-162783 | 6/1995 |
| JP | 9-6270 | 1/1997 |
| JP | 10-301200 | 11/1998 |
| JP | 2001-311902 | 11/2001 |
| JP | 2002-2395 | 1/2002 |

* cited by examiner

Primary Examiner—William C. Dowling
(74) Attorney, Agent, or Firm—Wenderoth, Lind & Ponack, L.L.P.

(57) ABSTRACT

In a display system, a projector is mounted inside a vehicle, and emits a light beam, which is generated based on an image signal, toward an opening formed at a portion near a rear end of the vehicle. An exterior screen is extendable toward the opening and is made of a material having low stiffness. While being extended toward the opening, the exterior screen displays an image by allowing the light beam emitted by the projector to pass therethrough. A screen housing unit is mounted on or near one of a rear hatch and a back door of the vehicle for accommodating the exterior screen.

15 Claims, 48 Drawing Sheets

DISPLAY SYSTEM

BACKGROUND OF THE INVENTION

1. Field of the Invention

The present invention relates to display systems and, more specifically, to a display system including a projector and a screen which are mounted on a vehicle so that the projector emits a light beam representing an image onto the screen.

2. Description of the Background Art

In recent years, there have been increasing needs to enjoy entertainment such as videos inside or around a vehicle irrespective of time and place. In order to fulfill such needs, the development of a vehicle-mounted display system in which a projector emits a light beam representing an image onto a screen has accelerated. Hereinafter, three examples of a conventional display system are described.

A first display system includes a projector and an interior screen which are mounted inside a vehicle, and an exterior screen which can be installed outside the vehicle. The projector is mounted on a ceiling of the vehicle so as to rotate approximately about the vertical axis. Specifically, if a viewer desires to watch a video on the interior screen, a projection lens of the projector is directed to the interior screen. On the other hand, if the viewer desires to watch a video outdoors by using the exterior screen, the projection lens is directed to the exterior screen.

In the first display system, however, the viewer has to install the exterior screen outside the vehicle before enjoying video. Moreover, the viewer also has to set the projector as required so that video is appropriately displayed on the exterior screen. In this way, the viewer is subject to burdensome operations whenever installing the exterior screen.

A second display system includes a projector and a screen which are mounted inside a vehicle. The projector is mounted typically on a ceiling of the vehicle. The screen reflects a light beam emitted from the projector, thereby presenting video to the viewer.

Generally speaking, however, vehicles have transparent windows which occupy a larger proportion of the inner space than those of airplanes or trains do. In other words, relatively more external ambient light enters inside the vehicle. Such external ambient light makes it difficult for the viewer to view the video presented by the second display system.

A third display system includes a liquid crystal display device mounted inside a vehicle and a half mirror. The liquid crystal display device is mounted near a center portion of a ceiling of the vehicle so that the display surface of the liquid crystal display device is oriented downward approximately in a vertical direction for displaying images. The half mirror is mounted below the liquid crystal display device so that the surface of the half mirror is positioned at an angle of 45 degrees with respect to the display surface of the liquid crystal display device. This half mirror reflects the images displayed by the liquid crystal display device to the back seat in the vehicle, and also allows light to pass therethrough. In the above-structured third display system, a viewer sitting in the back seat views the images reflected by the half mirror. Furthermore, since the half mirror also transmits light, the viewer sitting in the back seat can also view, through the half mirror, the situation ahead of the vehicle beyond the windshield of the vehicle (specifically, a sight and/or the state of traffic). Still further, a driver can check a rear portion in the vehicle or behind the vehicle by viewing images reflected by the room mirror through the half mirror.

According to the above-structured third display system, emitted light (that is, images) from the liquid crystal display device is directed to the surface of the half mirror at an angle of incidence of approximately 45 degrees. Furthermore, with the reflective characteristic of the half mirror, approximately half of the incident light is reflected to the back of the vehicle, and the remaining half to the bottom thereof. With a combination of the liquid crystal display device and the half mirror described above, the viewer sitting in the back seat views virtual images of the images displayed on the liquid crystal display device through the half mirror.

In the third display system, however, even when the viewer sitting in the back seat does not want to see images, the half mirror is always located in front of the viewer, thereby detrimentally affecting the comfort of the viewer in the vehicle.

SUMMARY OF THE INVENTION

Therefore, a first object of the present invention is to provide a display system which allows easy image viewing outside a vehicle.

Also, a second object of the present invention is to provide a display system which is capable of providing images that are easy to view inside a vehicle.

Furthermore, a third object of the present invention is to provide a display system which does not detrimentally affect the comfort of a viewer sitting in the back seat of a vehicle.

In order to attain the above-described first object, a first aspect of the present invention is directed to a display system including: a projector mounted inside a vehicle for emitting a light beam, which is generated based on an image signal, toward an opening formed at a portion near a rear end of the vehicle; an exterior screen extendable toward the opening and made of a material having low stiffness for displaying an image by allowing the light beam emitted by the projector to pass therethrough while the exterior screen is extended toward the opening; and a housing unit mounted on or near one of a rear hatch and a back door of the vehicle for accommodating the exterior screen.

In order to attain the above-described second object, a second aspect of the present invention is directed to a display system including: a projector mounted inside a vehicle for emitting a light beam which is generated based on an image signal; a screen for displaying an image by allowing the light beam emitted by the projector to pass therethrough or by reflecting the light beam; and a light shield having a surface which forms a predetermined angle with respect to the screen.

In order to attain the above-described third object, a third aspect of the present invention is directed to a display system including: a projector mounted inside a vehicle for emitting a light beam which is generated based on an image signal; a screen mounted inside the vehicle for displaying an image by reflecting the light beam emitted by the projector; a supporting member for rotatably supporting the screen; a reflecting member mounted inside the vehicle for reflecting the light beam reflected by the screen toward a rear seat of the vehicle; and a detector for detecting a rotation angle of the screen. Here, the projector includes: an image deforming unit for deforming the image based on the rotation angle detected by the detector and a position of the screen; and an optical system for generating a light beam based on the image deformed by the image deforming unit, and for emitting the light beam.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
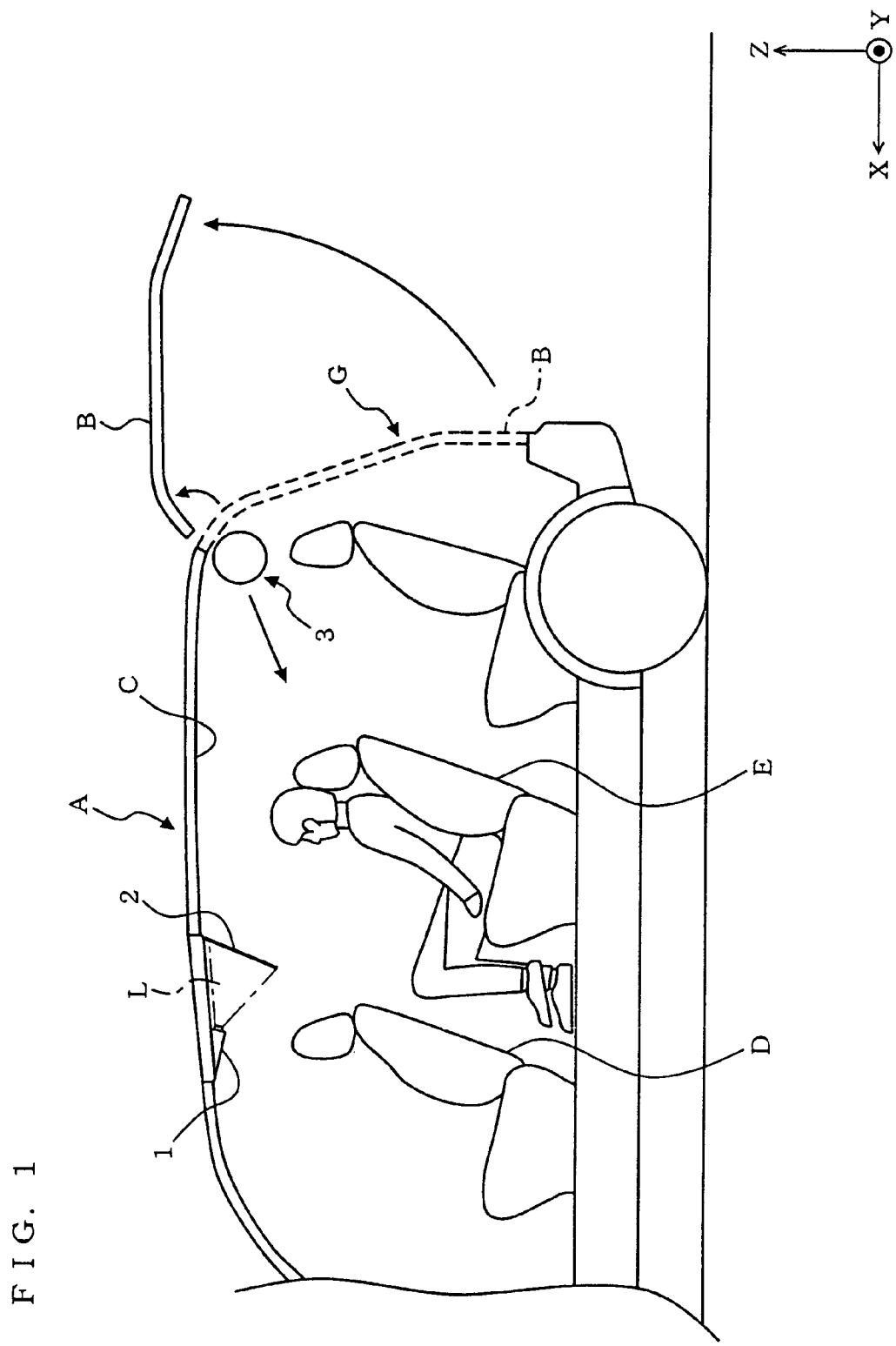
FIG. 1 is a schematic view illustrating the entire configuration of a display system according to a first embodiment of the present invention.

FIG. 1 is a schematic view illustrating the entire configuration of a display system according to a first embodiment of the present invention. For the sake of convenience of description, FIG. 1 also shows an orthogonal coordinate system having an X axis which is indicative of a traveling direction of a vehicle A, a Y axis which is indicative of a right-hand direction with respect to the traveling direction of the vehicle A, and a Z axis which is indicative of a vertical direction.

In FIG. 1, the display system is typically mounted on the vehicle A having a back door B or a rear hatch B. Examples of the vehicle A include a sedan with five doors, a station wagon (estate car) with five doors, an SUV (Sports Utility Vehicle), and a four-wheel drive car. The display system provides images to a viewer sitting in a rear seat E of the vehicle A or a viewer outside the vehicle A.

Figure 9A:
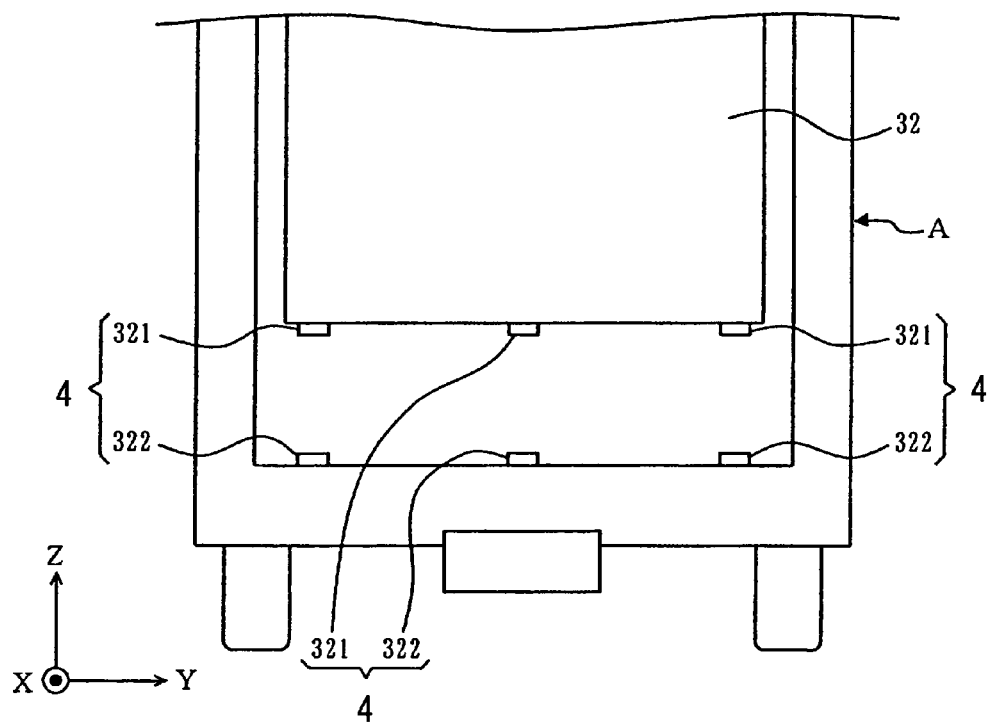
FIG. 9A is a schematic illustration showing a fixing member 4 in the course of extracting the exterior screen 32 illustrated in FIG. 5.
Figure 9B:
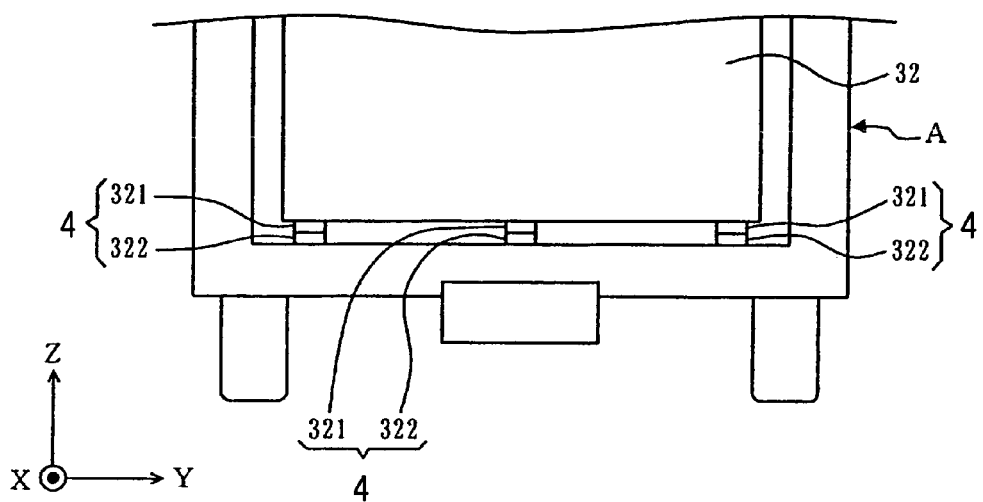
FIG. 9B is a schematic illustration showing the fixing member 4 after the exterior screen 32 illustrated in FIG. 5 has been completely extracted.

In order to provide images, the display system includes a projector 1, an interior screen device 2, an exterior screen device 3, and a fixing member 4, which is not shown in FIG. 1 but is shown in FIGS. 9A and 9B.

The projector 1 is mounted on a ceiling C inside the vehicle A. A more specific mounting position of the projector 1 largely depends on amounting position of the interior screen device 2. In the present embodiment, the projector 1 is positioned near a point which is located approximately directly above a front seat D on a line formed by the longitudinal plane of symmetry (not shown) of the vehicle A and the ceiling C. Here, the longitudinal plane of symmetry is a vertical plane parallel to a Z-X plane and passing through a midpoint of a line connecting the rotational centers of the right and left wheels of the vehicle A. The projector 1 mounted at the above-described mounting position is accommodated in the ceiling C while not emitting a light beam L (hereinafter referred to as "when not in use") (refer to FIG. 2). Immediately before emitting the light beam L, a projection lens (not shown) of the projector 1 is automatically moved so that an optical axis of the projection lens is oriented to either one of two predetermined directions (refer to FIG. 3 or FIG. 5).

After the projection lens has been properly positioned (hereinafter referred to as "when in use"), the projector 1 receives an image signal generated by an external video source. Examples of the video source typically include a DVD (Digital Versatile Disc) player, a BD (Bru-Ray Disc) player, and a game machine. A signal processing circuit included in the projector 1 then performs a process typified by a gamma correcting process or a resolution correcting process on the received image signal to generate a drive signal for driving a built-in display device (not shown), such as a liquid crystal panel. The projector 1 then drives the display device (not shown) with the generated drive signal. Furthermore, the display device is fed with unmodulated light generated by a light source (not shown). The display device then uses the fed drive signal and unmodulated light to generate an optical signal representing an image. Note that the display device can also generate such an optical signal representing an image only from the fed drive signal. Then, the light beam L is emitted from the projection lens through an optical system (not shown).

Figure 2:
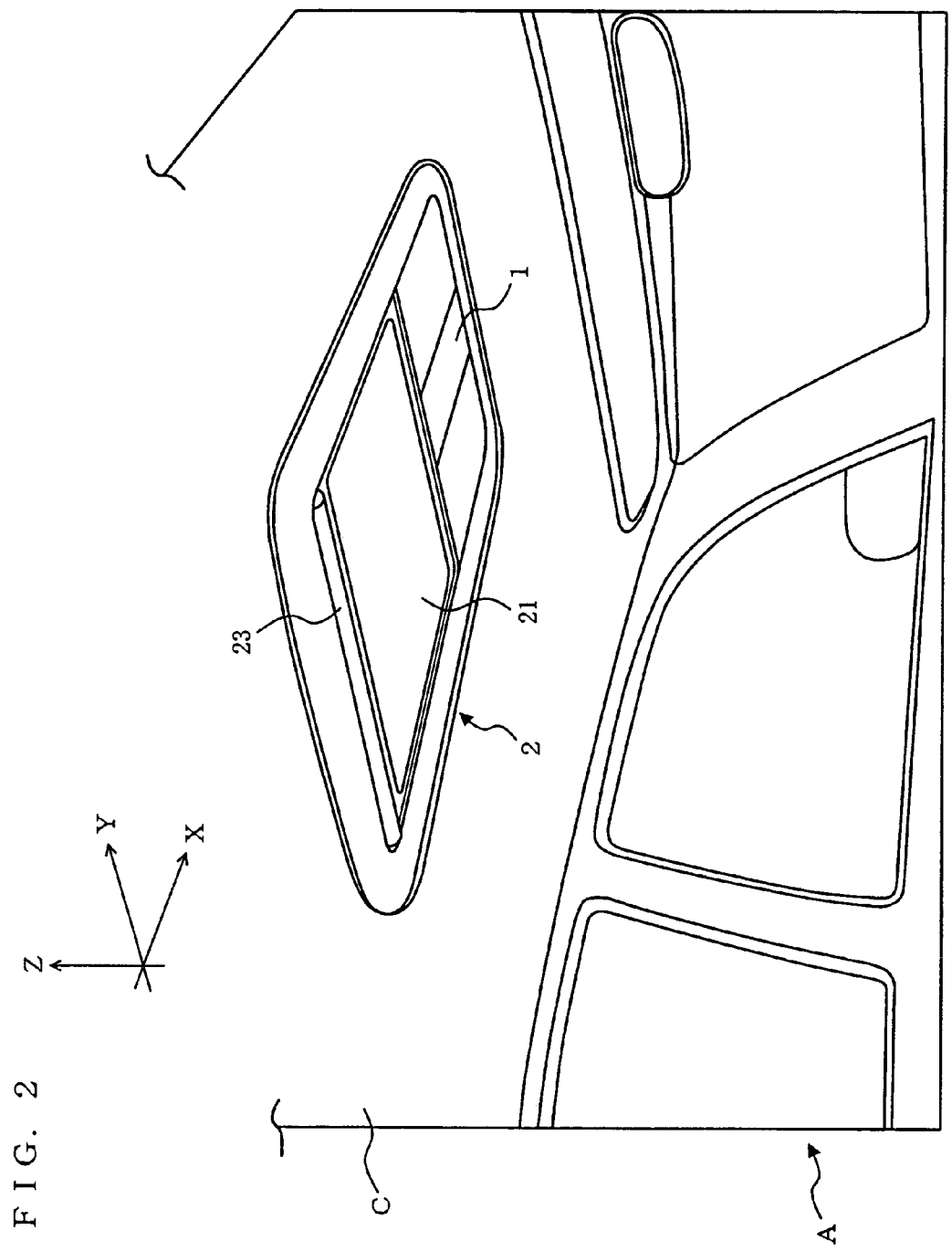
FIG. 2 is a schematic view of an interior screen device 2 illustrated in FIG. 1 when not in use, viewed from the right rear angle of a vehicle A.
Figure 3:
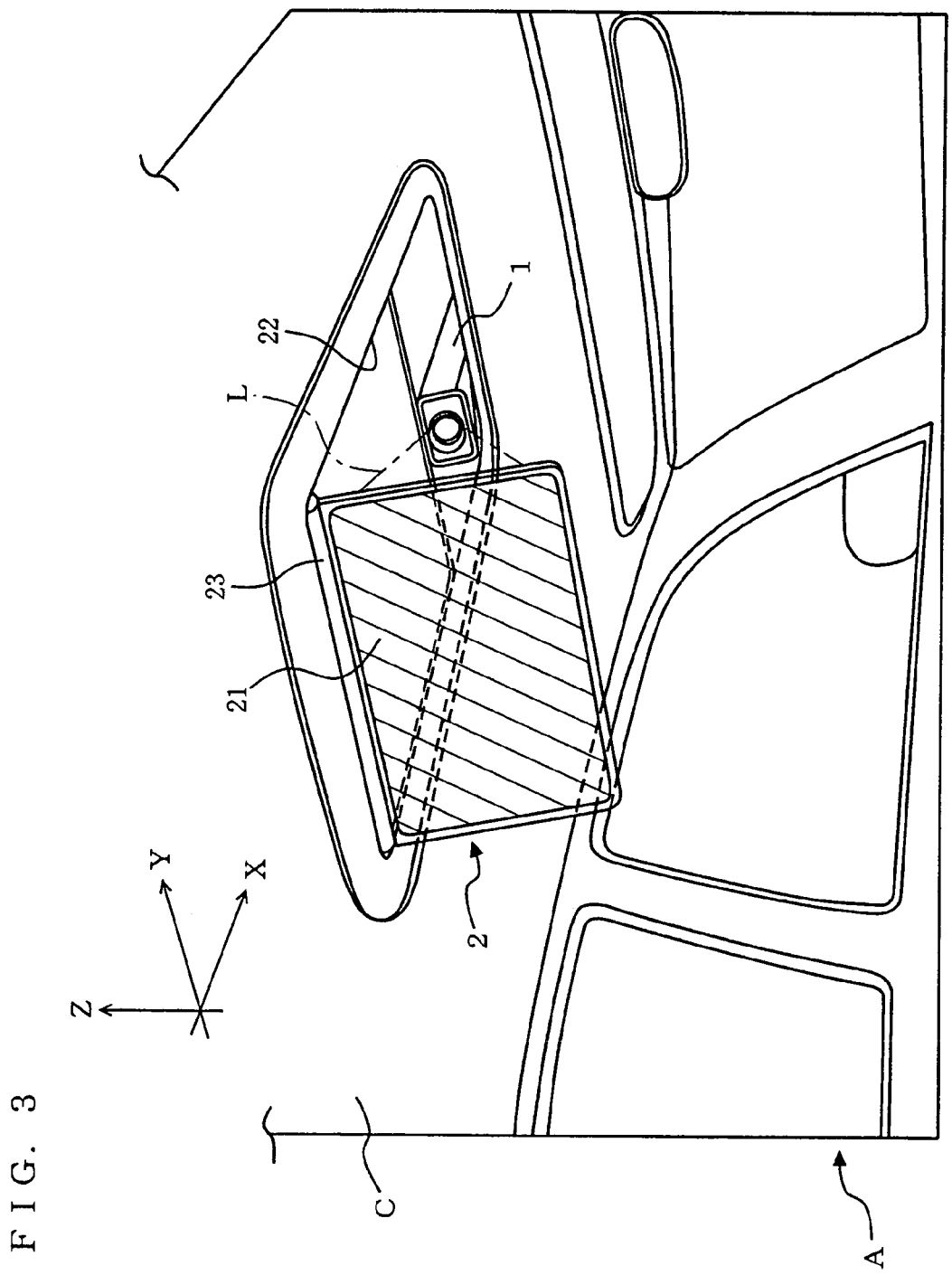
FIG. 3 is a schematic view of the interior screen device 2 illustrated in FIG. 1 when in use, viewed from the right rear angle of the vehicle A.

Next, the interior screen device 2 is described below. FIG. 2 is a schematic view of the interior screen device 2 when not in use, viewed from the right rear angle of the vehicle A. FIG. 3 is a schematic view of the interior screen device 2 when in use, viewed from the right rear angle of the vehicle A. In these drawings, as with the projector 1, the interior screen device 2 is mounted on the ceiling C. Preferably, the interior screen device 2 is mounted at a position which is assumed to allow a viewer sitting in the rear seat E to easily view the images. Byway of example, in the present embodiment, the interior screen device 2 is mounted at a position which is a predetermined amount (distance) away from the position of the projector 1 in the negative direction of the X axis. The interior screen device 2 includes an interior screen 21, an interior housing unit 22, and a supporting member 23.

As illustrated in FIGS. 2 and 3, the interior screen 21 is a translucent screen having a size defined by design specifications. The interior housing unit 22 has a space allowing the interior screen 21 and the supporting member 23 to be accommodated therein. Also, the supporting member 23 is fixedly mounted inside the interior housing unit 22 along one side of the interior screen 21 so as to rotatably support the interior screen 21 for rotation about an axis of rotation of the supporting member 23.

Figure 4:
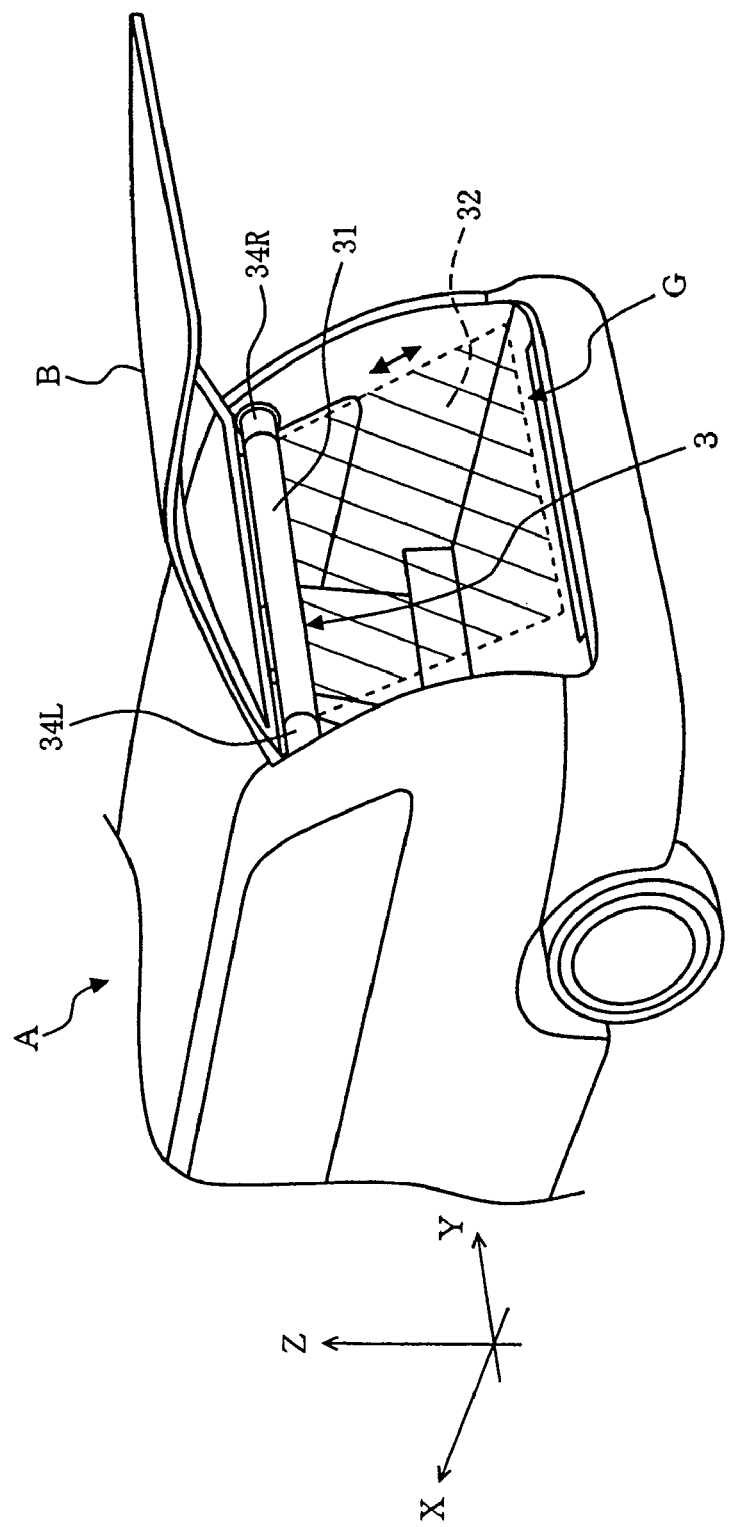
FIG. 4 is a schematic view of an exterior screen device 3 illustrated in FIG. 1 when not in use, viewed from the left rear angle of the vehicle A.
Figure 5:
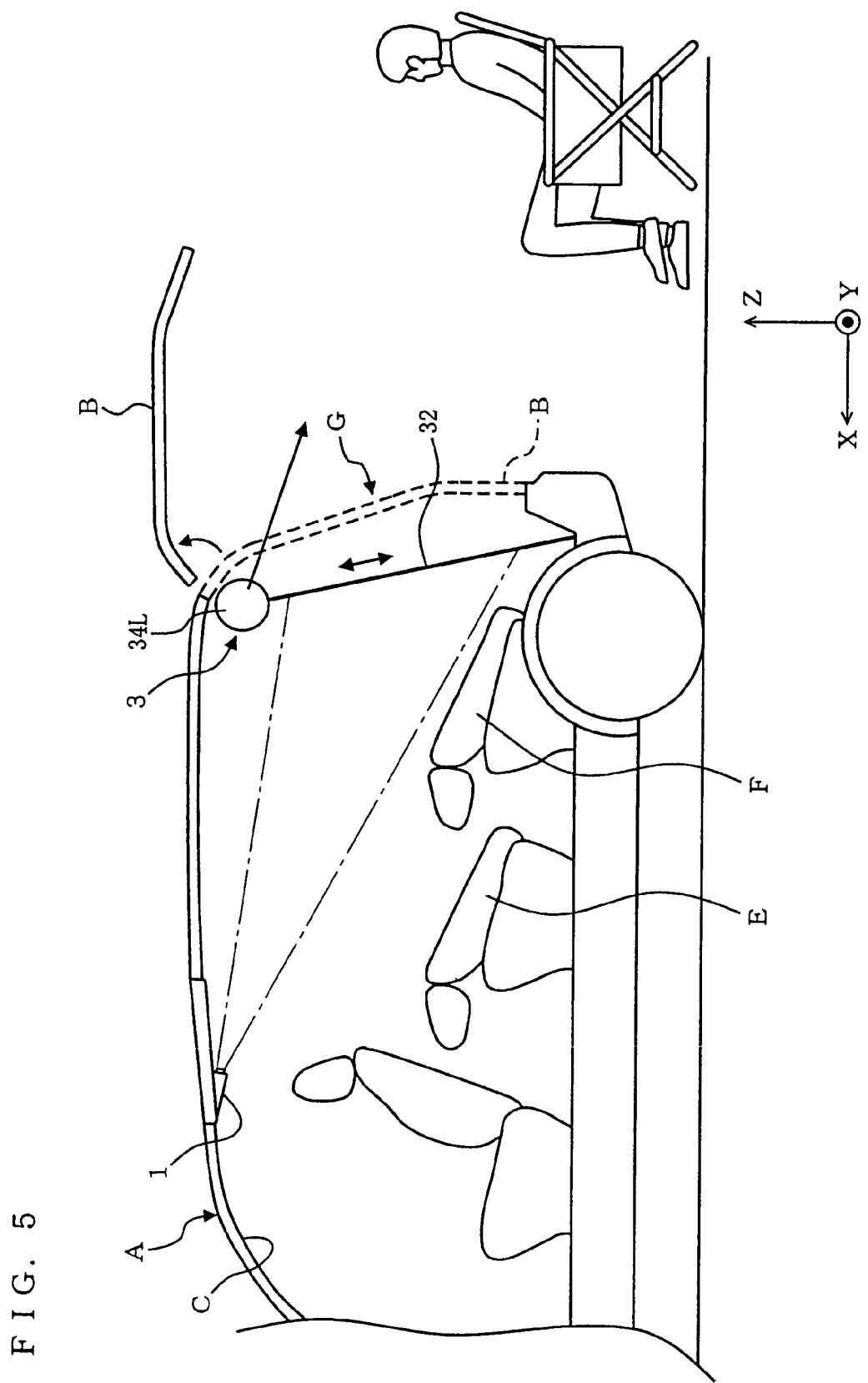
FIG. 5 is a schematic view of the display system illustrated in FIG. 1 when viewed from the left side of the vehicle A.

Next, the exterior screen device 3 is described below. FIG. 4 is a schematic view of the exterior screen device 3 when not in use, viewed from the left rear angle of the vehicle A. FIG. 5 is a schematic view of the interior of the vehicle A when viewed from the left side of the vehicle A.

As illustrated in FIGS. 4 and 5, and as has been described above, the vehicle A includes the back door B or the rear hatch B. When the back door B or the rear hatch B is open, an opening G is formed according to the size of the back door B or the rear hatch B. Furthermore, with the back rest of the rear seat E and/or a rear seat F being tilted toward the front, a space is formed (refer to one-dot chain lines in FIG. 5) for an optical path from the projection lens of the projector 1 to the opening G.

Also, the exterior screen device 3 is mounted inside the vehicle and near the opening G. In the present embodiment, by way of example only, the exterior screen device 3 is mounted at a position which is located near the upper end of the opening G so as not to obstruct an opening and closing of the back door B or the rear hatch B.

Figure 6A:
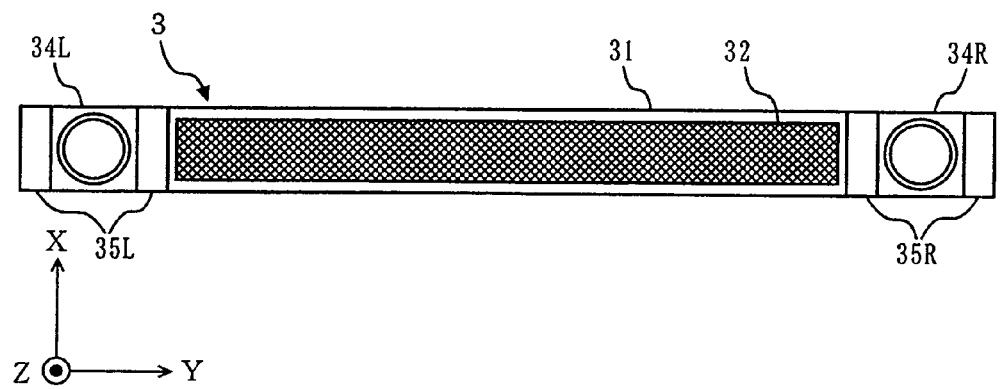
FIG. 6A is a bottom view of the exterior screen device 3 illustrated in FIG. 1 approximately vertically viewed from the bottom.
Figure 6B:
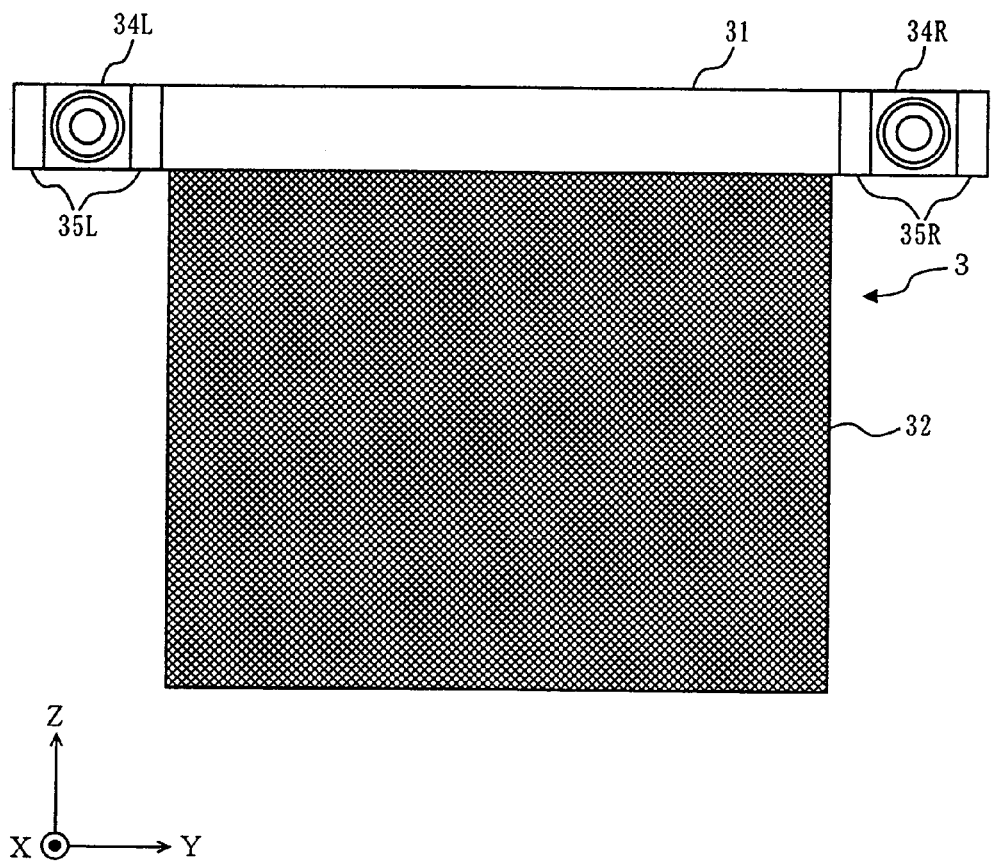
FIG. 6B is a front view of the exterior screen device 3 illustrated in FIG. 1 viewed from the front.
Figure 7A:
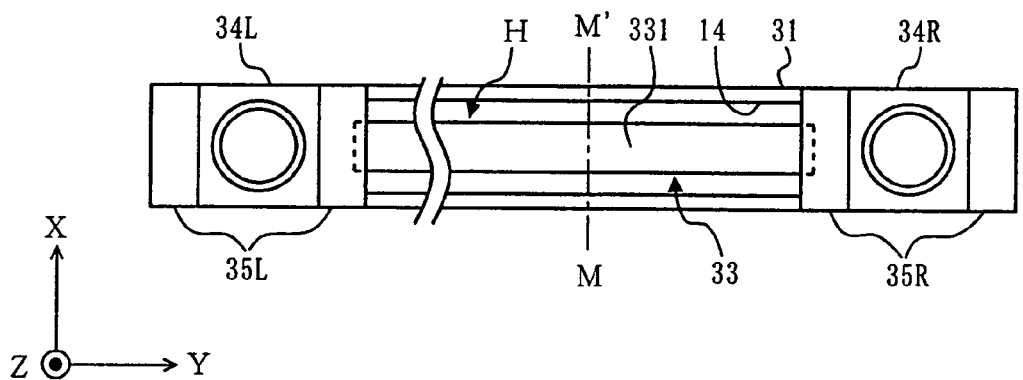
FIG. 7A is a bottom view of the exterior screen device 3 approximately vertically viewed from the bottom when an exterior screen 32 illustrated in FIGS. 6A and 6B is removed.
Figure 7B:
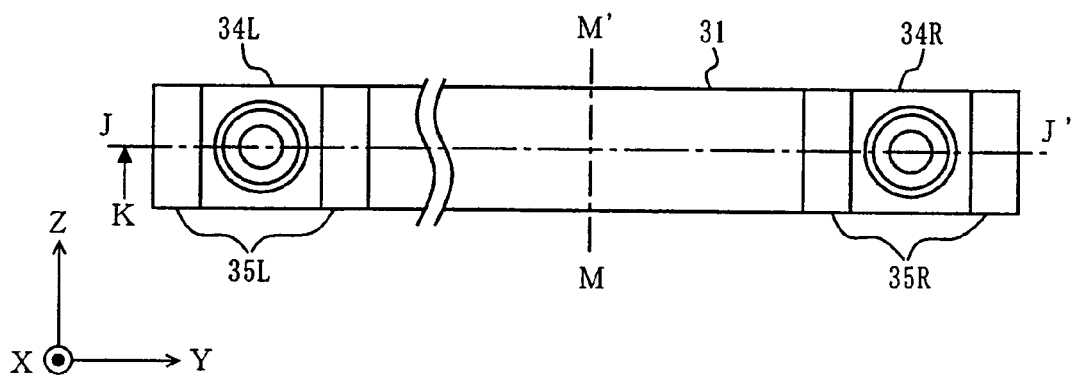
FIG. 7B is a front view of the exterior screen device 3 viewed from the front when the exterior screen 32 illustrated in FIGS. 6A and 6B is removed.
Figure 7C:
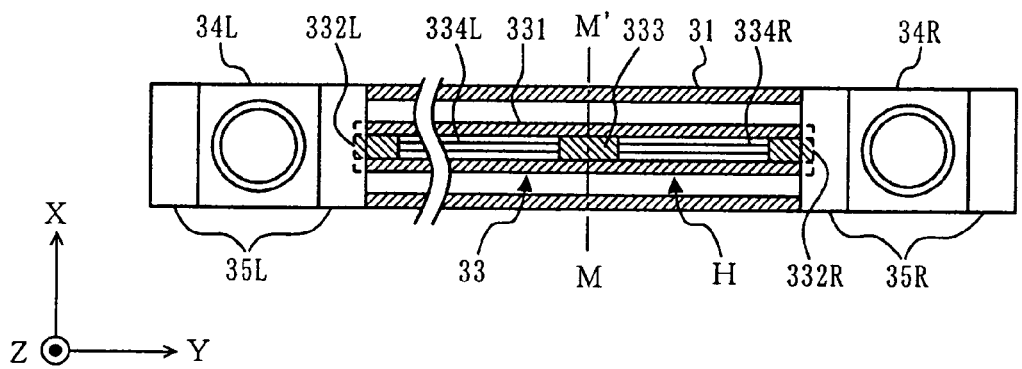
FIG. 7C is a partial section view of the exterior screen device 3 along a plane J-J' illustrated in FIG. 7B when viewed in a direction of an arrow K.

FIG. 6A is a bottom view of the exterior screen device 3 approximately vertically viewed from the bottom. FIG. 6B is a front view of the exterior screen device 3 from the front. FIG. 7A is a bottom view of the exterior screen device 3 viewed approximately vertically from the bottom when an exterior screen 32 of the exterior screen device 3 is removed. FIG. 7B is a front view of the exterior screen device 3 viewed from the front when the exterior screen 32 is removed. FIG. 7C is a partial section view of the exterior screen device 3 along a plane J-J' illustrated in FIG. 7B when viewed in a direction of an arrow K.

In these drawings, the exterior screen device 3 includes an exterior housing unit 31, the exterior screen 32, a screen winding mechanism 33, loudspeakers 34L and 34R, and rotating mechanisms 35L and 35R.

The exterior housing unit 31 has a cylindrical or box-like outer shape. Also, the exterior housing unit 31 has a space H formed therein for accommodating the exterior screen 32 and the screen winding mechanism 33 (particularly refer to FIGS. 7A and 7C). Here, two inner surfaces of the exterior housing unit 31 that are opposite to each other and orthogonal to the Y axis are parallel to each other. These two inner surfaces each have a hole thereon whose diameter is approximately equal to that of a supporting member 331, which will be described further below, so as to position the supporting member 331 between these two surfaces. The holes of these surfaces are symmetric with respect to a center plane M-M', which is located nearly equidistantly from the two surfaces and is parallel to the Z-X plane. Furthermore, the exterior housing unit 31 has an opening on the bottom surface externally oriented toward the negative direction of the Z axis in the exemplary case illustrated in FIG. 7A so that the exterior screen 32 can be extracted.

The exterior screen 32 is a translucent screen made of a material of low stiffness, fitting into the opening G of the vehicle A, and extractable along the opening G (particularly refer to FIGS. 4 and 5).

The screen winding mechanism 33 includes, as illustrated particularly in FIGS. 7A and 7C, a supporting member 331, two fixing members 332L and 332R, a connecting member 333, and two elastic members 334L and 334R.

The supporting member 331 has an approximately cylindrical shape with a hole penetrating therethrough. Here, the length of the supporting member 331 in the Y axis direction is slightly longer than the exterior screen 32, and is substantially equal to a distance between the two openings formed on both of the side surfaces of the exterior housing unit 31. Each end of the supporting member 331 is fitted into the relevant hole of the exterior housing unit 31, but is not fixed to the exterior housing unit 31. With this, the supporting member 331 is bridged between both side surfaces of the exterior housing unit 31, and is also rotatably supported by the exterior housing unit 31 for rotation about an axis of rotation of the supporting member 331. Furthermore, a portion near one side of the exterior screen 32 is fixed to the curved surface of the supporting member 331 so as to be parallel to the Y axis.

The fixing members 332L and 332R are identical in shape to each other, and have an approximately cylindrical shape. The outer diameter of the bottom surface of the fixing members 332L and 332R is substantially equal to the inner diameter of the supporting member 331 having an approximately cylindrical shape with a hollow. With the fixing member 332L being inserted in the penetrating hole of the supporting member 331, one base of the fixing member 332L is fixed to the relevant hole of the exterior housing unit 31. The fixing member 332R is fixed to a position symmetrical to the fixing member 332L with respect to the center plane M-M'.

Furthermore, the connecting member 333 has an approximately cylindrical shape, with its outer diameter being substantially equal to the inner diameter of the penetrating hole formed in the supporting member 331. The connecting member 333 is inserted in the penetrating hole of the supporting member 331 and is fixed to the inner curved surface of the supporting member 331 at a position so that a distance from one base of the connecting member 333 to one side surface of the exterior housing unit 31 located along the Y axis is equal to a distance from the other base of the connecting member 333 to the other side surface of the exterior housing unit 31.

The elastic members 334L and 334R are cord-like or stick-like members that are typically made of synthetic resin or natural resin. The elastic member 334L is placed so as to bridge between one base of the fixing member 332L and one base of the connecting portion 333 so that one end of the elastic member 334L is fixed to the fixing member 332L and the other end of the elastic member 334L is fixed to the connecting member 333. The elastic member 334R is placed symmetrically to the elastic member 334L with respect to the center plane M-M', with one end of the elastic member 334R being fixed to the fixing member 332R and the other end of the elastic member 334R being fixed to the connecting member 333.

Next, the loudspeakers 34L and 34R are described below. The loudspeaker 34L is rotatably mounted to one side surface of the exterior housing unit 31 via the rotating mechanism 35L, which will be described further below. Here, one surface of the loudspeaker 34L opposite to the exterior housing unit 31 has a hole having a predetermine shape so as to allow the loudspeaker 34L to rotate. This hole will be described further below together with the rotating mechanism 35L. Also, the loudspeaker 34R is symmetric in shape to the loudspeaker 34L with respect to the center plane M-M', and is rotatably mounted to a position symmetric to that of the loudspeaker 34L. These loudspeakers 34L and 34R each receive a sound signal generated by a device serving as a sound source, which is identical to the device serving as the video source. In each of the loudspeakers 34L and 34R, a signal processing circuit (not shown) incorporated therein performs a process, which is typified by a D/A converting process or an amplifying process, on the received sound signal, and then externally outputs the resultant signal.

Figure 8A:
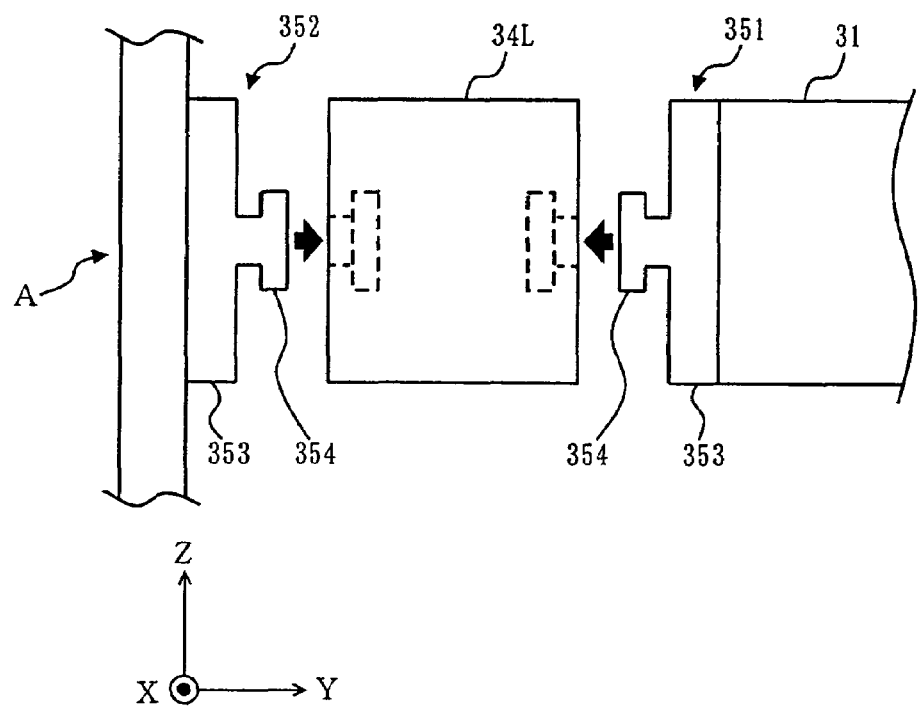
FIG. 8A is a schematic illustration around a rotating mechanism 35L illustrated in FIGS. 7A through 7C when viewed from the rear of the vehicle A.
Figure 8B:
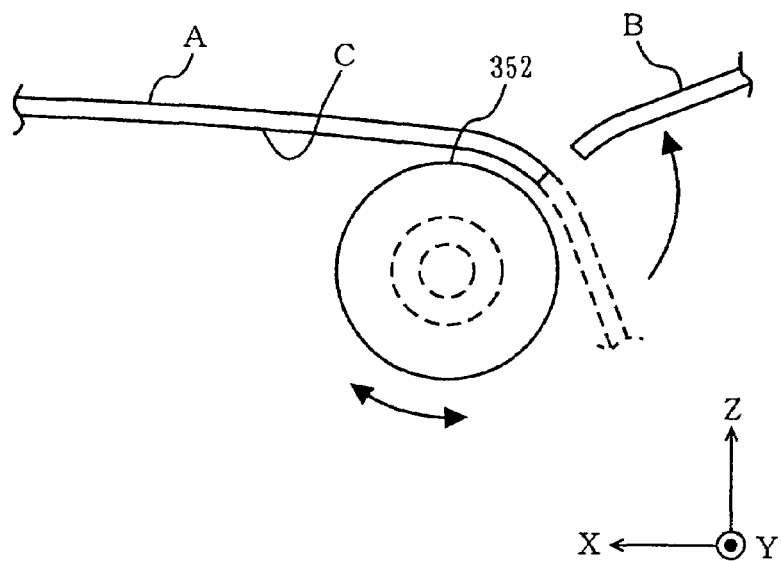
FIG. 8B is a schematic illustration around the rotating mechanism 35L illustrated in FIGS. 7A through 7C when viewed from the left of the vehicle A.

Next, the rotating mechanisms 35L and 35R are described below. FIG. 8A is a schematic illustration around the rotating mechanism 35L when viewed from the rear of the vehicle A. FIG. 8B is a schematic illustration around the rotating mechanism 35L when viewed from the left of the vehicle A.

In these drawings, the rotating mechanism 35L includes, for example, a first member 351 and a second member 352. The first member 351 and the second member 352 each includes a base 353 and a rotational shaft 354. The base 353 has a predetermined shape having a main surface and a rear surface which are approximately parallel to each other. The main surface of the base 353 has the rotational shaft 354 fixedly mounted thereon or formed thereon.

The rotational shaft 354 has two cylindrically-shaped members having different diameters but sharing the same center axis. The center axis of the rotational shaft 354 is perpendicular to the main surface of the base 353. Of these two members of the rotational shaft 354, the one more adjacent to the base 353 has a smaller diameter than that of the other member.

Here, the hole formed on the loudspeaker 34L is described below. In FIGS. 8A and 8B, both of the side surfaces of the loudspeaker 34L each have one hole having a shape which is identical to the outer shape of the rotational shaft 354. The two holes are formed so as to be opposite to each other. The rotational shaft 354 of the first member 351 fits into one hole formed on the loudspeaker 34L, while the rotational shaft 354 of the second member 352 fits into the other hole formed on the loud speaker 34L. However, each hole of the loudspeaker 34L and the relevant rotational shaft 354 are not fixed to each other. With this, as for the first member 351, the rear surface of the base 353 is fixed to one side surface of the exterior housing unit 31. As for the second member 352, the rear surface of the base 353 is fixed to the vehicle A. Here, in the present embodiment, the rear surface of the base 353 is fixed near a pillar of the vehicle A. With this, the loudspeaker 34L is rotatably supported by the rotating mechanism 35L for rotation about the rotational shaft 354.

The rotating mechanism 35R is substantially identical in shape to the rotating mechanism 35L, and is mounted symmetrically to the rotating mechanism 35L with respect to the center plane M–M' (refer to FIG. 7A, for example). With this, the loudspeaker 34R rotates in a manner similar to that of the loudspeaker 34L.

Next, the fixing member 4 is described. FIG. 9A is a schematic illustration showing the fixing member 4 in the course of extracting the exterior screen 32. FIG. 9B is a schematic illustration showing the fixing member 4 after the exterior screen 32 has been completely extracted. For the purpose of fixing the tip of the exterior screen 32 to the vehicle A, the fixing member 4 includes, by way of example only in the present embodiment, at least one pair (three pairs are shown in FIGS. 9A and 9B) of magnets 321 and 322 having different polarities. The magnet 321 is fixedly mounted to the tip of the exterior screen 32. The magnet 322 is, on the other hand, mounted to the vehicle A near the opening G. By way of example only, in the first embodiment, the magnet 322 is mounted to the vehicle A at the lower edge of the opening G. Also, the magnets 321 and 322 of one pair are preferably located at approximately the same position on the X axis and the Y axis. That is, these magnets 321 and 322 of one pair are preferably located on a line parallel to the Z axis.

With reference to the above-described drawings, the operation of the above-configured display system will now be described, particularly with regard to a case where a viewer sitting in the rear seat E of the vehicle A views images. The loudspeakers 34L and 34R are preferably directed so as to output sound inside the vehicle A. Furthermore, the interior screen 21 rotates about the axis of the supporting member 23 so as to come down out of the interior housing unit 22, and then stops moving at a point from which images can be provided to the viewer sitting in the rear seat E. Still further, the projector 1 performs various settings so as to appropriately project images to the interior screen 21 at rest. Upon completion of the above-described operation, as illustrated in FIG. 1, the projector 1 generates a light beam L based on the externally-supplied image signal, and then emits the light beam L to the interior screen 21. The emitted light beam L enters from the interior screen 21 from its rear surface opposite to the projection lens of the projector 1. The interior screen 21 allows the emitted light beam L to pass therethrough, and diffuses the emitted light beam L from the main surface. The loudspeakers 34L and 34R produce sound based on the externally-supplied sound signal to a viewer(s) inside the vehicle A. With this, the viewer(s) can view the images and listen to the sound simultaneously.

Next, a case is described where the viewer desires to view images outside the vehicle, typically, in a camping area. First, the viewer opens the back door B or the rear hatch B (refer to FIG. 4), and then pulls the exterior screen 32 out of the exterior housing unit 31 incorporated in the exterior screen device 3 from the bottom (refer to FIGS. 6A and 6B). In the course of this procedure, the supporting member 331 rotates inside the exterior housing unit 31, and further, the connecting member 333 also rotates similarly. Here, the two fixing members 332L and 332R are fixed to the vehicle A. Therefore, the elastic members 334L and 334R bridged between the connecting member 333 and the fixing members 332L and 332R are twisted in the rotational direction of the connecting member 333.

Figure 10:
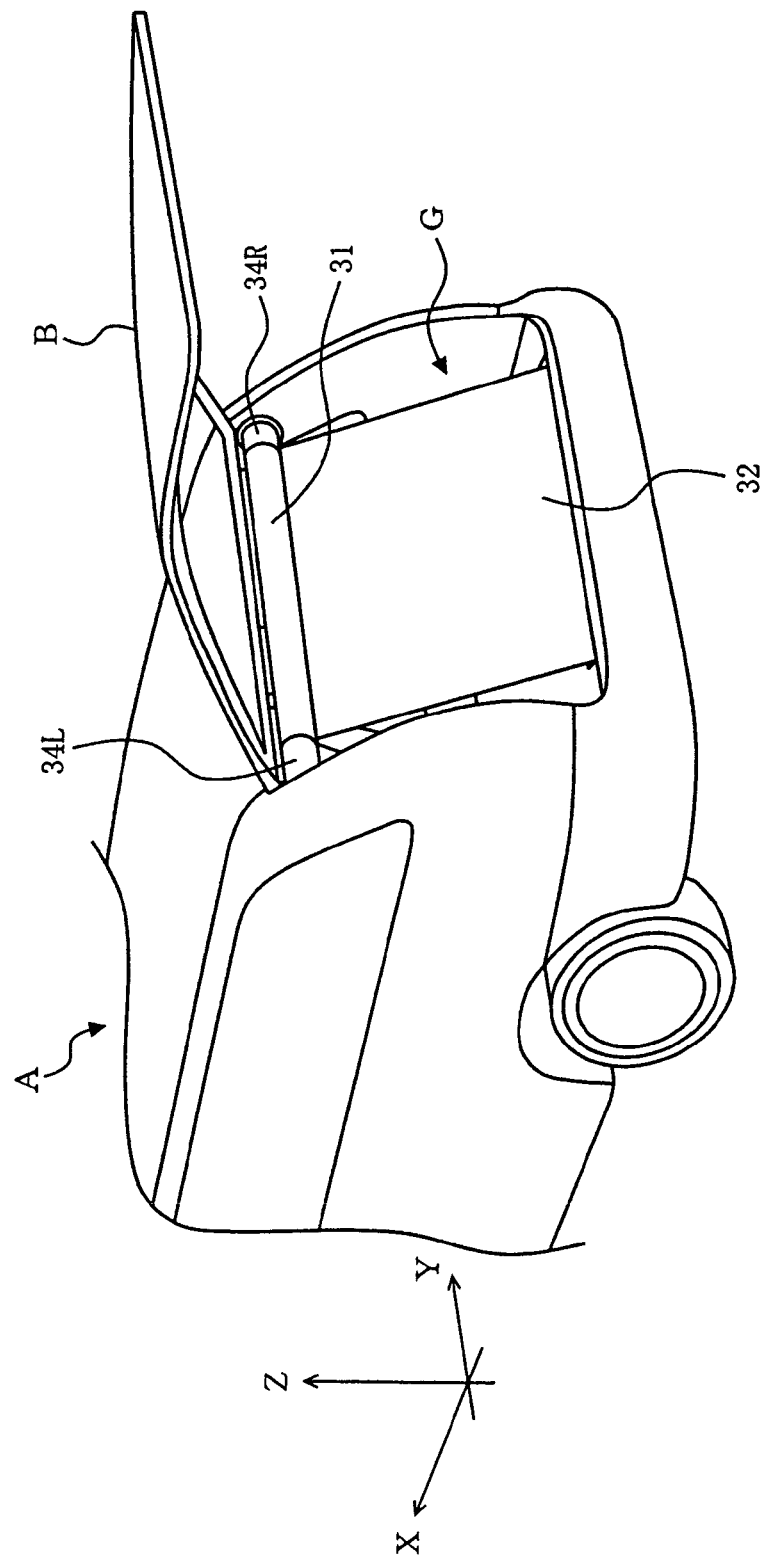
FIG. 10 is a schematic illustration showing a state after the exterior screen 32 illustrated in FIG. 5 has been completely extracted.

After pulling out and extending the exterior screen 32 at the opening G (refer to FIG. 5), the viewer uses the fixing member 4 to fix the tip of the exterior screen 32 to the vehicle. Specifically, the viewer unites a pair of the magnets 321 and 322 to each other. With these magnets 321 and 322 being attracted to each other, the exterior screen 32 is fixed. Here, the elastic members 334L and 334R are being twisted, thereby causing resilience. As a result, a force is exerted on the exterior screen 32 in the direction of the exterior housing unit 31. Furthermore, another (opposite) force is exerted in the direction of the fixing member 4. With this, the exterior screen 32 is tightly extended with no slacking, as illustrated in FIG. 10.

The loudspeakers 34L and 34R are directed preferably to a direction in which sound can be produced outside the vehicle. Furthermore, the projector 1 performs various settings so as to appropriately project images to the extended exterior screen 32. Upon completion of the above-described operation, as illustrated in FIG. 5, the projector 1 generates a light beam L based on the externally-supplied image signal, and then emits the light beam L toward the exterior screen 32. The emitted light beam L enters from the exterior screen 32 from its rear surface opposite to the projection lens of the projector 1. The exterior screen 32 allows the emitted light beam L to pass therethrough and diffuses the emitted light beam L from the main surface. The loudspeakers 34L and 34R produce sound based on the externally-supplied sound signal to a viewer(s) outside the vehicle A. With this, the viewer(s) can view the images and listen to the sound simultaneously.

Also, after viewing the images, the viewer separates the magnets 321 and 322 from each other, and then takes his or her hands off the exterior screen 32. In response, the force exerted in the direction of the fixing member 4 stops working, and therefore, resilience of the elastic members 334L and 334R takes effect. Consequently, the supporting member 331 of the exterior housing unit 31 rotates in a direction reverse to that at the time of extracting the exterior screen 32, thereby causing the exterior screen 32 to retract into the exterior housing unit 31.

As described above, according to the display device of the present invention, after opening the back door B or the rear hatch B of the vehicle A, all the viewer has to do is to extend the exterior screen 32 toward the opening G. This makes it possible to view images and videos in a manner easier than ever.

Also, in the present embodiment, the back door B or the rear hatch B can prevent part of the external ambient light from impinging on the exterior screen 32. That is, the back door B or the rear hatch B serves as a light shield. With this, the display device according to the present embodiment can provide images that are easier to view.

Furthermore, the display system according to the present invention includes the rotatable loudspeakers 34L and 34R. The orientations of these loudspeakers 34L and 34R can be changed depending on whether video is viewed inside or outside the vehicle. Therefore, it is possible to provide sounds that are easier for the viewer to listen to. Still further, with the orientations of these loudspeakers 34L and 34R being changed, people inside and outside can listen to the sounds output from these loudspeakers 34L and 34R even if the sound level is relatively low. This also makes it possible to suppress power consumption in the display system. If the loudspeakers 34L and 34R are not rotatable, depending on the directivity of each of the loudspeakers 34L and 34R, the sound level might have to be varied for a viewer outside or inside the vehicle.

Still further, the magnet 321 is provided at one edge of the exterior screen 32 so as to engage with the magnet 322 provided on the bottom surface of the vehicle A. With this, a large area formed at the back of the vehicle when the back door B or the rear hatch B is open can be securely and stably covered by the exterior screen 32, thereby achieving projection of large-screen images on the exterior screen 32.

Still further, in the present embodiment, the screen winding mechanism 33 is provided inside the supporting member 331 of the exterior housing unit 31. This screen winding mechanism 33 uses the resilience of the twisted elastic members 334L and 334R to accommodate the exterior screen 32 in the exterior housing unit 31. With this, it is possible to provide a display system that is easier to use than ever.

Still further, at the time of extracting the exterior screen 32, a portion near one side of the exterior screen 32 is fixed to the supporting member 331, while the other opposing side of the exterior screen 32 is fixed by the fixing member 4 to a portion located near the lower edge of the opening G. In the course of this extracting process, the resilience of the elastic members 334L and 334R can prevent slacking of the exterior screen 32.

Still further, in the present embodiment, a liquid crystal projector is exemplarily used as the projector 1. This is not meant to be restrictive. Alternatively, a three tube projector or a DPL (Digital Light Processing) projector can be used.

Furthermore, the projector 1 can be structured so as to be able to slide in the X axis direction along the ceiling C. With this, the size of the images displayed by the interior screen 21 or the exterior screen 32 can be easily changed. Still further, with the projector 1 being structured so as to be able to rotate about the Z axis, restrictions on the position of the interior screen device 2 can be reduced. Still further, the projector 1 can be placed outside the vehicle. In this case, however, the exterior screen 32 has to be a reflective-type screen.

Figure 11:
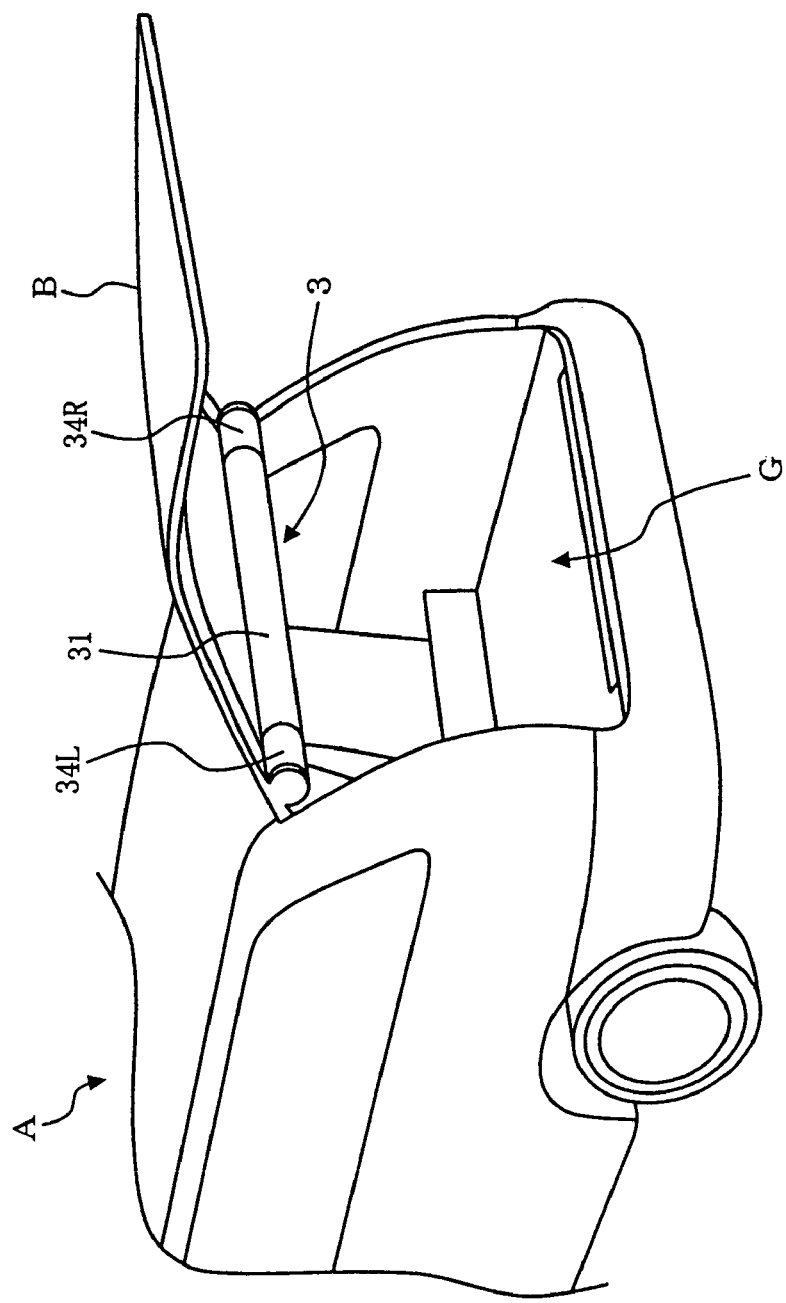
FIG. 11 is a schematic illustration showing a first exemplary modification of the exterior screen device 3 illustrated in FIG. 1.
Figure 12:
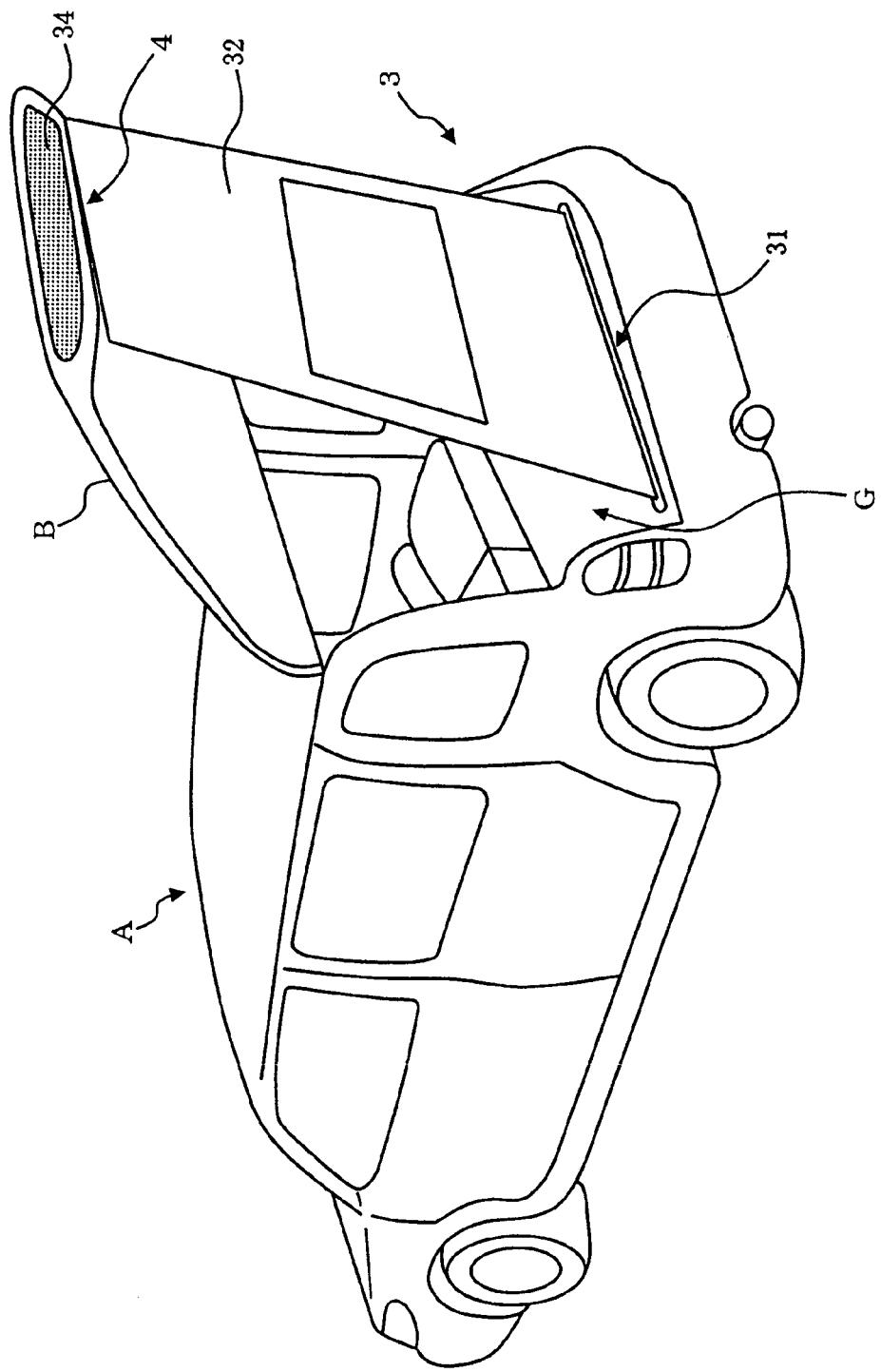
FIG. 12 is a schematic illustration showing a second exemplary modification of the exterior screen device 3 illustrated in FIG. 1.

Still further, in the present invention, the exterior screen device 3 is placed so as to be bridged between the right and left pillars of the vehicle A. This is not meant to be restrictive. As illustrated in FIG. 11, the exterior screen device 3 can be placed near a hinge attached to the rear hatch B or the back door B. Also, as illustrated in FIG. 12, the exterior screen device 3 can be accommodated in the lower edge portion of the opening G inside the vehicle. In this case, the exterior screen 32 is fixed in advance to the tip of the rear hatch B or the back door B. When the rear hatch B or the back door B opens upwardly, the exterior screen 32 is pulled out accordingly. Also, the loudspeakers 34 can be mounted anywhere as long as they can produce sound to the viewer outside the vehicle. In an example illustrated in FIG. 12, the loudspeakers 34 are mounted at one end of the back door B or the rear hatch B.

Still further, in the exterior screen device 3, the exterior screen 32 is preferably perforated with many small holes for the purpose of suppressing fluttering of the screen due to wind. Also, the exterior screen 32 can be folded for accommodation in the exterior housing unit 31, instead of being wound up.

Figure 13A:
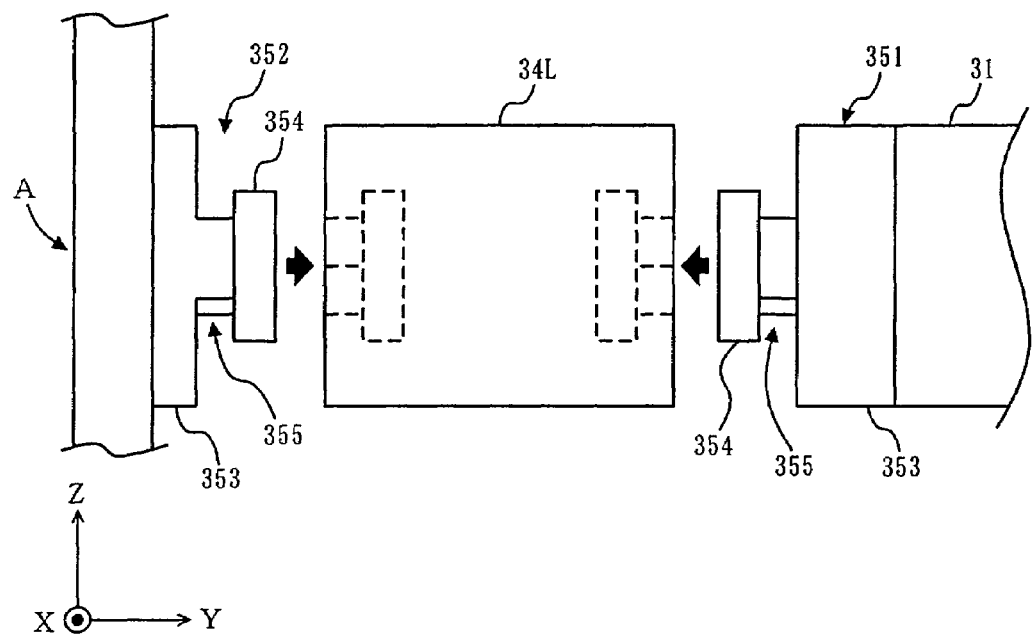
FIG. 13A is a schematic illustration showing another exemplary structure of the rotating mechanism 35L illustrated in FIGS. 8A and 8B.
Figure 13B:
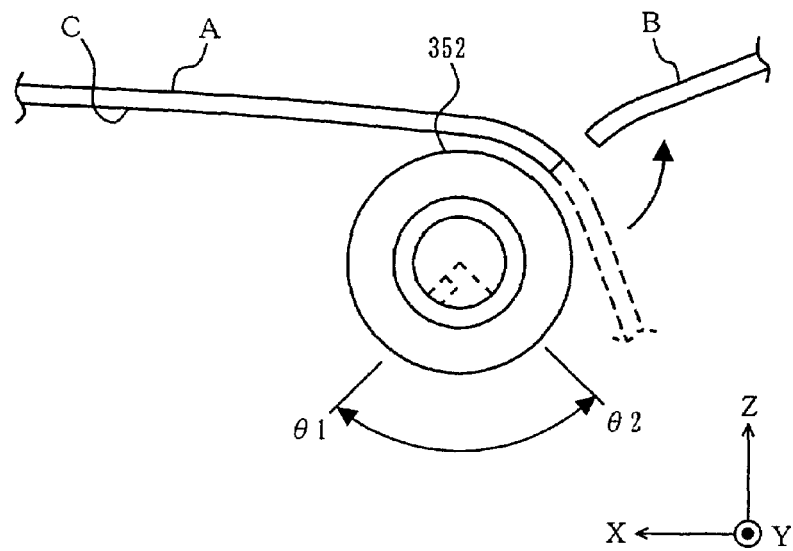
FIG. 13B is a schematic illustration around the rotating mechanism 35L illustrated in FIG. 13A when viewed from the left of the vehicle A.

Still further, in the present embodiment, the rotating mechanisms 35L and 35R are structured so as to be able to rotate 360 degrees. Preferably, the rotating mechanisms 35L and 35R are structured so as to be able to rotate at angles from an angle $\theta 1$ up to an angle $\theta 2$. Here, the angle $\theta 1$ is selected so as to allow the loudspeakers 34L and 34R to be oriented to the inside of the vehicle A, while the angle $\theta 2$ is selected so as to allow the loudspeakers 34L and 34R to be oriented to the outside of the vehicle A. FIG. 13A is a schematic illustration showing another exemplary structure of the rotating mechanism 35L viewed from the back of the vehicle A when the range of rotation is restricted. FIG. 13B is a schematic illustration around the rotating mechanism 35L viewed from the left of the vehicle A.

In FIGS. 13A and 13B, the rotating mechanism 35L includes a first member 351 and a second member 352. The first member 351 and the second member 352 are similar to those illustrated in FIGS. 8A and 8B except that each member further includes a stopper 355. Therefore, in FIGS. 13A and 13B, components corresponding to those illustrated in FIGS. 8A and 8B are provided with the same reference numerals, and are not described herein.

Each stopper 355 has a partial-ring shape, for example, and is fixed to the curved surface of the rotational shaft 354 with a center axis of the stopper 355 and the axis of the rotational shaft 354 matching each other. In the illustrated example, the center angle of the stopper 355 is approximately 90 degrees.

Here, the holes formed on the loudspeaker 34L are described below. In FIG. 13A and FIG. 13B, both of the side surfaces of the loudspeaker 34L each have one hole formed thereon having a shape identical to the outer shape of the rotational shaft 354. The two holes are formed so as to be opposite to each other. Furthermore, the side surfaces of the loudspeaker 34L each have another hole formed thereon whose center axis and outer diameter approximately match with the axis of and the outer diameter of the rotational shaft 354 and which has a partial-ring shape and a center angle larger than that of the stopper 355. Here, the center angle of the hole of the loudspeaker 34L is defined based on a maximum angle of rotation of the loudspeaker 34L. For example, in order to make the maximum angle of rotation of the loudspeaker 34L 90 degrees under a condition where the center angle of the stopper 355 is 90 degrees, the center angle of the hole of the loudspeaker 34L has to be 180 degrees.

The first member 351 fits into one hole formed on the above-structured loudspeaker 34L, and the second member 352 fits into the other hole formed thereon. However, these holes on the loudspeaker 34L and the first and second members 351 and 352 are not fixed to each other. With this, the rear surface of the base 353 of the first member 351 is fixed to the side surface of the interior housing unit 31, while that of the second member 352 is fixed to the vehicle A. Here, in the present embodiment, the rear surface of each base 353 is fixed to a position near the pillar of the vehicle A. Therefore, the loudspeaker 34L is rotatably supported by the rotating mechanism 35L for rotation about the rotational shaft 354 at angles up to the predetermined maximum angle.

As described above, the rotating mechanism 35R is identical in shape to the rotating mechanism 35L, and is mounted symmetrically to the rotating mechanism 35L with respect to the center plane M-M' (refer to FIG. 7A, for example).

The rotating mechanisms for rotating the loudspeakers 34L and 34R are not restricted to the above-described rotating mechanisms 35L and 35R, but can have other various structures and modifications. For example, since the supporting member 331 rotates until the exterior screen 32 is completely extracted and is then positioned by the fixing member 4, a force caused by the rotation of the supporting member 331 may be transferred to the loudspeakers 34L and 34R for rotation. Also, since the supporting member 331 rotates for accommodation of the exterior screen 32, the rotating mechanism 35L and 35R may use a force caused by the rotation of the supporting member 331 to rotate the loudspeakers 34L and 34R so as to orient these loudspeakers toward the inside of the vehicle.

Alternatively, in accordance with the amount of rotation of the supporting member 331 detected by a sensor not shown, the rotating mechanisms 35L and 35R may rotate the exterior screen 32 so as to orient the exterior screen 32 toward the outside or inside of the vehicle.

Still further, in the present embodiment, the fixing member 4 includes the magnets 321 and 322 of different polarities. This is not meant to be restrictive. The fixing member 4 may include a pair of hooks or rings, one being attached to a position near the tip of the exterior screen 32 and the other being attached to the lower edge of the opening G or to the ground. Alternatively, the fixing member 4 can be a stake. In this case, a portion near the tip of the exterior screen 32 is fixed to the ground with the stake.

Still further, in the present embodiment, when viewing the images outside the vehicle, the viewer views them from the back of the vehicle A. Therefore, while the exterior screen 32 is in use, the muffler of the vehicle A is preferably directed toward the Y axis direction.

Still further, in the present embodiment, while the exterior screen 32 is in use, it is preferable to prohibit the instrumental panel of the vehicle A from displaying any warnings and to prevent the interior light from turning on. This can prevent interference of light from the instrumental panel and the interior light with respect to the light beam L emitted from the projector 1.

In the present embodiment, depending on whether to use the interior screen 21 or the exterior screen 32, it is required to change the focal point of the projector 1 and the size or orientation of images. However, if the position of the interior screen 21 and that of the exterior screen 32 are always constant when in use, the focal point or the size or orientation of images can be predetermined for each screen accordingly. Therefore, it is preferable to set values representing such predetermined focal point or the size or orientation as preset values in the projector 1. By using appropriate preset values depending on which screen is to be used for image presentation, the projector 1 processes image signals, and then emits the light beam L.

Still further, in the present embodiment, the exterior screen 32 is extended toward the opening G at the back of the vehicle A. This is not meant to be restrictive. Alternatively, the exterior screen device 3 can be mounted so that the exterior screen 32 is extended toward an opening formed by opening a side door of the vehicle A.

(First Exemplary Modification)

Figure 14A:
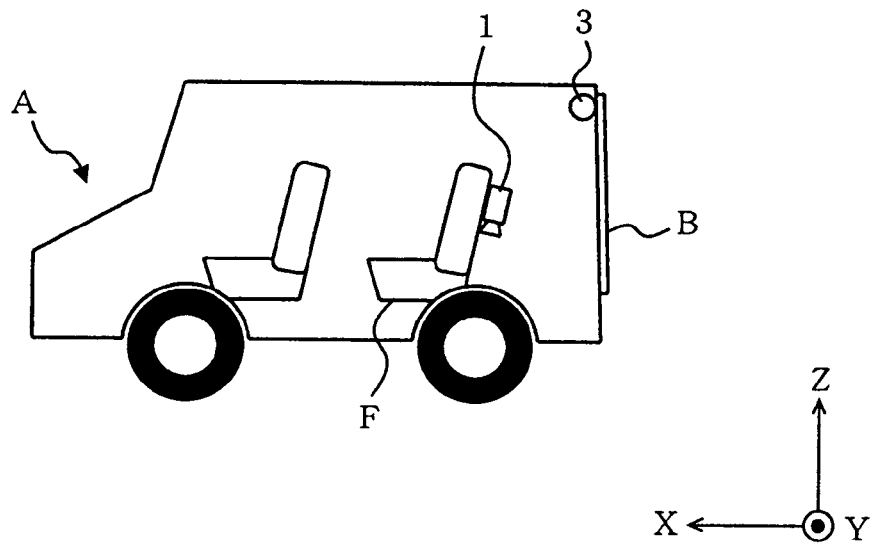
FIG. 14A is a schematic illustration of the entire configuration of a display system according to a first exemplary modification of the first embodiment.

FIG. 14A is a schematic illustration of the entire configuration of a display system according to a first exemplary modification of the first embodiment. FIG. 14A also shows the orthogonal coordinate system as illustrated in FIG. 1 for the sake of convenience of description. The display system of FIG. 14A is similar to that of FIG. 1A except that the projector 1 is mounted at a different position and that the inside screen device 2 is not provided. Therefore, in FIG. 14A, components corresponding to those illustrated in FIG. 1A are provided with the same reference numerals, and are not described herein.

Figure 14B:
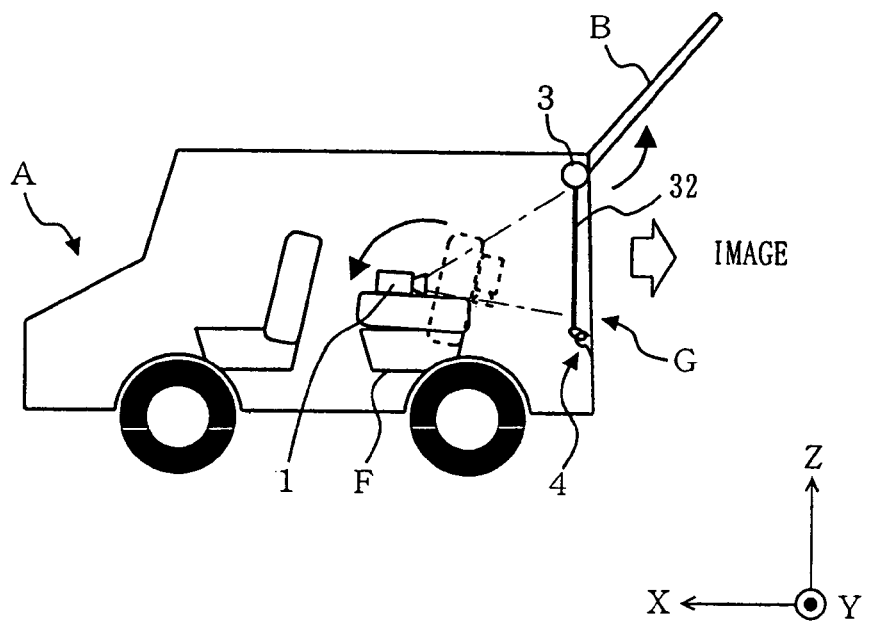
FIG. 14B is a schematic illustration showing a state in which a projector 1 illustrated in FIG. 14A is in use.

As has been described above, in the vehicle A in which the present display system can be mounted, the back rest of the rear seat F can be tilted forward, that is, in the X axis direction. In the present exemplary modification, the projector 1 is fixed at the rear surface of the back rest. Specifically, as illustrated in FIG. 14B, the projector 1 is mounted so that its projection lens is oriented to the extended exterior screen 32 with the back rest of the rear seat F being tilted forward. Therefore, the projector 1 cannot be seen by the driver or fellow passengers when they are inside the vehicle A. Therefore, the projector 1 does not obstruct the driver and/or the fellow passengers when getting on or off the vehicle A.

Figure 15A:
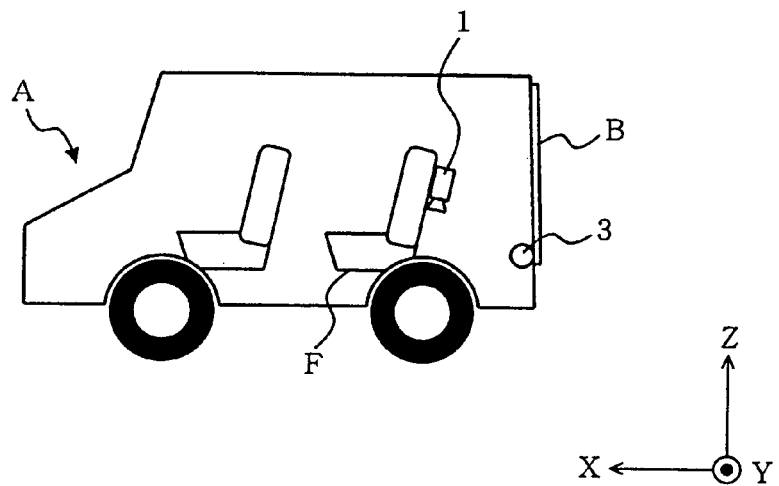
FIGS. 15A and 15B are schematic illustrations showing other installation examples of the exterior screen device 3 illustrated in FIG. 14A.
Figure 15B:
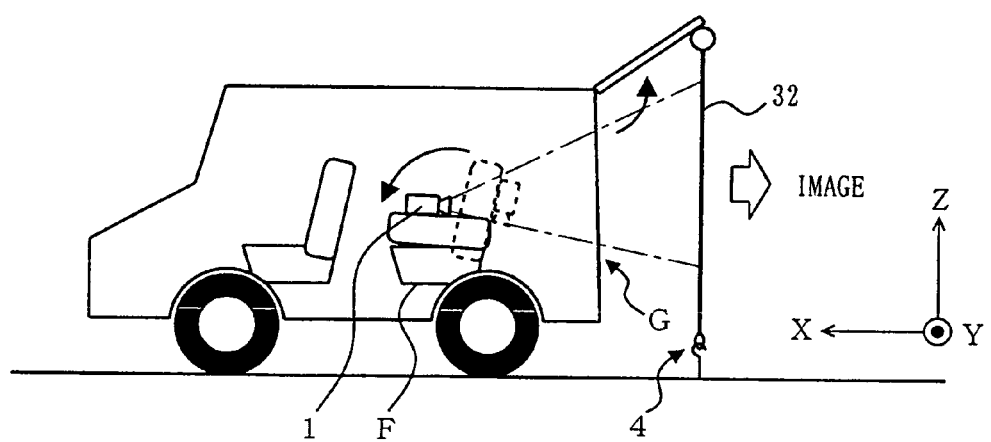

In the present exemplary modification, a case has been described where the exterior screen device 3 is mounted at the same position as that of the exterior screen device according to the first embodiment. This is not meant to be restrictive. Alternatively, as illustrated in FIGS. 15A and 15B, in a case of the rear hatch B, the exterior screen device 3 can be mounted at the tip of the rear hatch B so that the exterior screen 32 can be pulled down from the exterior screen device 3 to the ground when the rear hatch B is open.

Also, in the present exemplary modification, the projection lens of the projector 1 is oriented to the opening G when in use. This is not meant to be restrictive. Alternatively, the projector 1 can be mounted so as to be oriented to a side door of the vehicle A, and the exterior screen device 3 can also be mounted directly above the side door. In this case, the viewer extends the exterior screen 32 toward an opening formed by opening the side door for viewing images.

(Second Exemplary Modification)

Figure 16A:
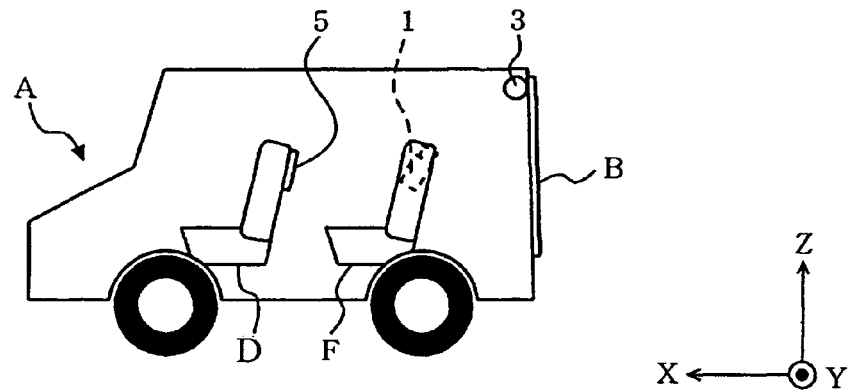
FIG. 16A is a schematic illustration showing the entire configuration of a display system according to a second exemplary modification of the first embodiment.

FIG. 16A is a schematic illustration showing the entire configuration of a display system according to a second exemplary modification of the first embodiment. FIG. 16A also shows the orthogonal coordinate system as illustrated in FIG. 1 for the sake of convenience of description. The display system of FIG. 16A is similar to that of FIG. 14A except that the projector 1 is mounted at a different position and that a reflecting unit 5 is further provided. Therefore, in FIG. 16A, components corresponding to those illustrated in FIG. 1A are provided with the same reference numerals, and are not described herein.

The reflecting unit 5 typically includes a total reflection mirror, and is mounted at a position from which the light beam L emitted from the projector 1 is reflected to the exterior screen 32 extended toward the opening G. An example of a typical mounting position of the reflecting unit 5 is the midpoint between two front seats D aligned along the Y axis in the vehicle A. Alternatively, the reflecting unit can be mounted near a center console or on the ceiling C.

Figure 16B:
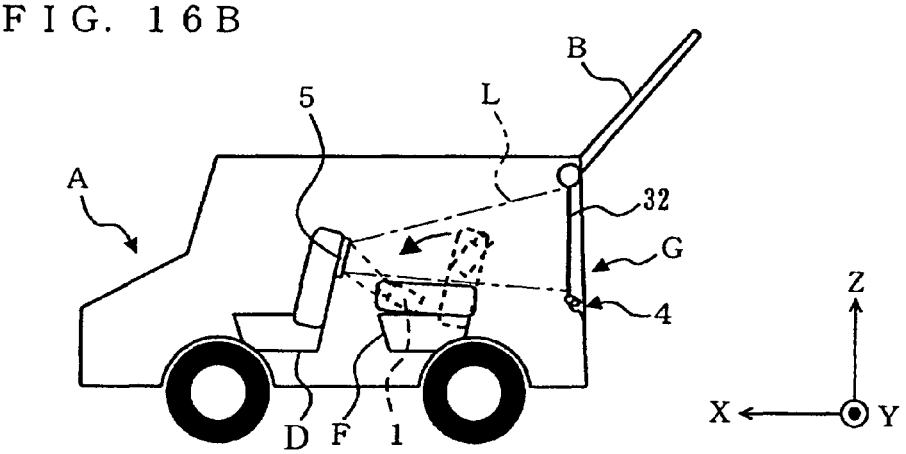
FIG. 16B is a schematic illustration showing a projector 1 illustrated in FIG. 16A in use.

In the present exemplary modification, the projector 1 is fixed on the rear surface of the back rest or inside the back rest of the rear seat F. Specifically, as illustrated in FIG. 16B, the projector 1 is mounted so that its projection lens is oriented to the reflecting unit 5 when the back rest of the rear seat F is tilted forward. With this, the light beam L emitted from the projector 1 is reflected by the reflecting unit 5, and is then directed onto the exterior screen 32.

As described above, according to the second exemplary modification, as with the first exemplary modification, the projector 1 does not obstruct the driver and/or a fellow passenger(s) when getting on and off the vehicle A.

Furthermore, in the second exemplary modification, the reflecting unit 5 reflects the light beam L toward the exterior screen extended to the opening G. This is not meant to be restrictive. Alternatively, the reflecting unit 5 can be structured so as to reflect the light beam L toward an opening formed by opening a side door of the vehicle A for extending the exterior screen 32.

Still further, in the second exemplary modification, the display system may include the inside screen device 2 as described in the first embodiment. In this case, preferably, the projector 1 emits the light beam L toward the interior screen 21 included in the interior screen device 2 after controlling an optical system for emitting the light beam L, being changed in position.

(Third Exemplary Modification)

Figure 17:
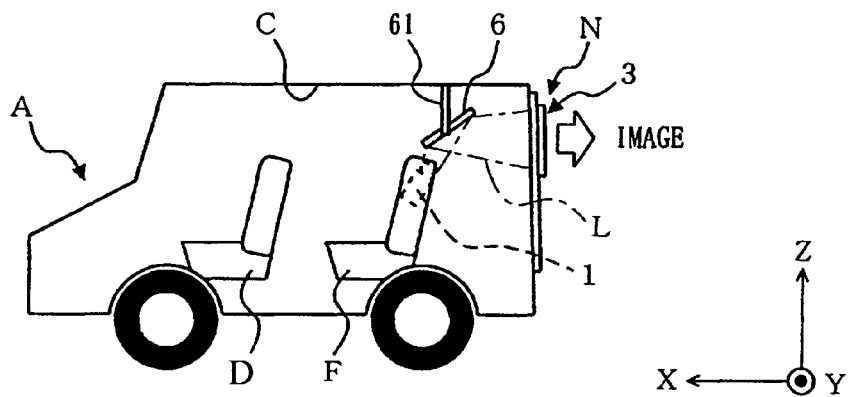
FIG. 17 is a schematic illustration showing the entire configuration of a display system according to a third exemplary modification of the first embodiment.

FIG. 17 is a schematic illustration showing the entire configuration of a display system according to a third exemplary modification of the first embodiment. FIG. 17 also shows the orthogonal coordinate system as illustrated in FIG. 1 for the sake of convenience of description. The display system of FIG. 17 is similar to that of FIG. 14A except that that a reflecting unit 6 is further provided, that the projector 1 is mounted at a different position, and that the exterior screen device 3 has a different structure and different functions. Therefore, in FIG. 17, components corresponding to those illustrated in FIG. 14A are provided with the same reference numerals, and are not described herein.

The reflecting unit 6 typically includes a total reflection mirror, and is mounted at a position from which the light beam L emitted from the projector 1 is reflected to a rear window N of the vehicle A. An example of a typical mounting position of the reflecting unit 6 is a position between the rear seat F and the ceiling C of the vehicle A. In order to mount the reflecting unit 6, the reflecting unit 6 and the ceiling C are preferably connected by a connecting member 61. Furthermore, the reflecting unit 6 is rotatably supported by the connecting member 61 for rotation about the Y axis.

In the present exemplary modification, the projector 1 is fixed inside the back rest of the rear seat F. Specifically, as illustrated in FIG. 17, the projector 1 is mounted inside the rear seat F so that the projection lens of the projector 1 is oriented to the reflecting unit 6. Here, preferably, the projection lens is exposed at the back rest of the rear seat F in order to secure an optical path from the projection lens to the reflecting unit 6.

The exterior screen device 3 includes a translucent screen which also serves as the rear window N. Here, transmittance of visible light at such a translucent screen is restricted by relevant laws and regulations.

In the above-structured display system, the light beans L emitted from the projector 1 is reflected by the reflecting unit 6, and is then projected to the translucent screen of the exterior screen device 3. The translucent screen allows the light beam L to pass therethrough and diffuses the light beam L, thereby displaying images toward the back of the vehicle A. Note that, owing to translucency, the translucent screen of the exterior screen device 3 does not obstruct the rear visibility of the driver and the fellow passengers.

As described above, according to the third exemplary modification, as with the first exemplary modification, the projector 1 does not obstruct the driver and/or the fellow passengers when getting on or off the vehicle A.

(Fourth Exemplary Modification)

Figure 18:
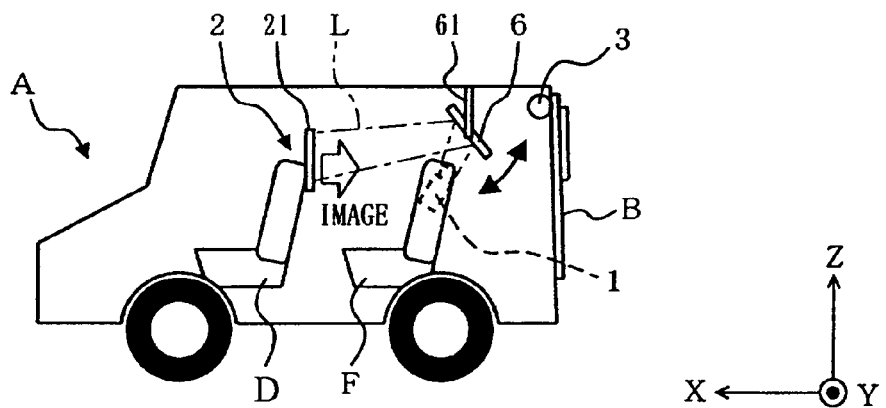
FIG. 18 is a schematic illustration showing the entire configuration of a display system according to a forth exemplary modification of the first embodiment.

FIG. 18 is a schematic illustration showing the entire configuration of a display system according to a forth exemplary modification of the first embodiment. FIG. 18 also shows the orthogonal coordinate system as illustrated in FIG. 1 for the sake of convenience of description. The display system of FIG. 18 is similar to that of FIG. 17 except that the interior screen device 2 has a different structure and different functions. Therefore, in FIG. 18, components corresponding to those illustrated in FIG. 17 are provided with the same reference numerals, and are not described herein.

The interior screen device 2 includes the interior screen 21 which is typically a reflective screen and is mounted so as to be able to reflect the emitted light beam L toward the rear seat F. An example of a typical mounting position is the midpoint between two front seats D aligned along the Y axis. The mounting position of the interior screen device 2 is not restricted to the above, and can be appropriately determined for image display depending on the seat where the viewer is sitting.

In the above-structured display system, before the projector 1 emits the light beam L toward the interior screen 21, the reflecting unit 6 is set at a position allowing reflection of the light beam L toward the interior screen 21. Then, the projector 1 emits the light beam L. The emitted light beam L is reflected by the reflecting unit 6 toward the interior screen 21. By being a reflective screen, the interior screen 21 reflects and diffuses the incident light beam L, thereby displaying images to the viewer sitting in the rear seat F.

A case where the projector 1 emits the light beam L toward the exterior screen 32 is similar to the case in the third exemplary modification, and therefore is not described herein.

According to the fourth exemplary modification, by changing the position of the reflecting unit 6, switching is made in the display system between the interior screen 21 and the exterior screen 32 for image display with the light beam L emitted from the projector 1. Alternatively, such switching can be made by controlling the optical system in the projector 1 to control the direction of emitting the light beam L. In this case, the reflecting unit 6 is not required. Furthermore, flexibility in the mounting position of the projector 1 can be increased.

(Fifth Exemplary Modification)

Figure 19A:
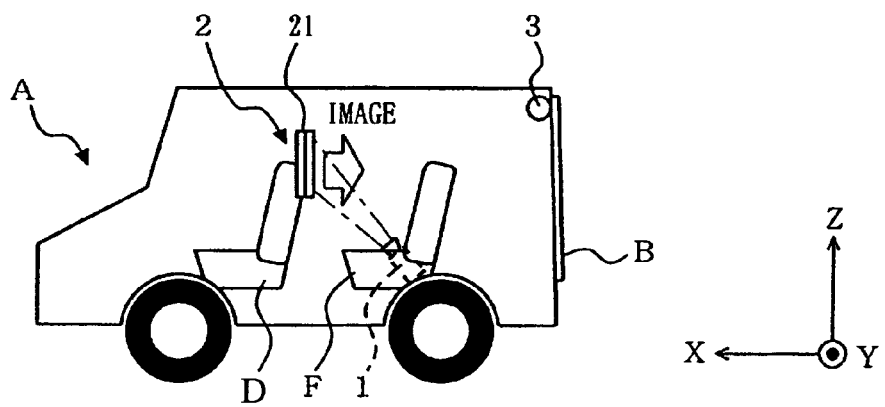
FIGS. 19A and 19B are schematic illustrations showing the entire configuration of a display system according to a fifth exemplary modification of the first embodiment.
Figure 19B:
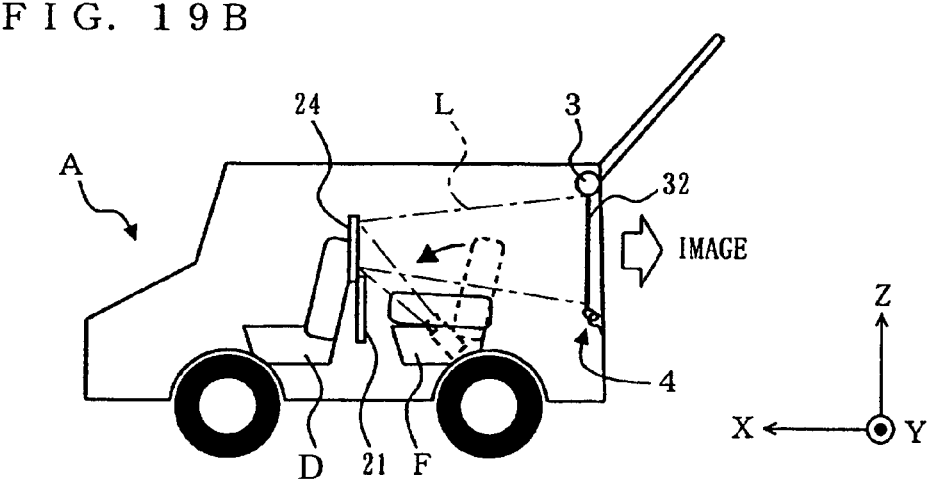

FIGS. 19A and 19B are schematic illustrations showing the entire configuration of a display system according to a fifth exemplary modification of the first embodiment. FIGS. 19A and 19B also show the orthogonal coordinate system as illustrated in FIG. 1 for the sake of convenience of description. The display system of FIGS. 19A and 19B is similar to that of FIG. 1A except that the projector 1 is mounted at a different position and that the interior screen device 2 has a different structure and different functions. Therefore, in FIG. 19A, components corresponding to those illustrated in FIG. 1A are provided with the same reference numerals, and are not described herein.

The projector 1 is mounted between two rear seats F aligned along the Y axis in the vehicle A so that the projection lens is oriented to the interior screen device 2. Preferably, the projector 1 is mounted at a position so as not to obstruct a viewer when getting on and off the vehicle, such as inside the arm rest in or besides the rear seat F.

In the fifth exemplary modification, the interior screen device 2 is mounted at a position which is assumed to allow the viewer sitting in the rear seat F to easily view images (hereinafter referred to as a home position), for example, between two front seats D aligned along the Y direction in the vehicle A. The interior screen device 2 includes the interior screen 21 and a reflecting member 24.

The interior screen 21 is a reflective screen having a size defined by design specifications, and is rotatably supported by the reflecting member 24 for rotation about the X or Y axis.

The reflecting member 24 typically includes a total reflection mirror, and is mounted to a position so as to reflect the light beam L emitted from the projector 1 toward the exterior screen 32 extended toward the opening G. Specifically, the reflecting member 24 is mounted so as to allow an optical path from the reflecting member 24 to the exterior screen 32 to be secured with the back rest of the rear seat F being tilted. Also, in the fifth exemplary modification, the reflecting member 24 is mounted on the rear surface of the interior screen 21, that is, in the positive direction on the X axis, for supporting the interior screen 21.

Next, the operation of the above-structured display system is described below. First, a case is described where the viewer sitting in the rear seat F of the vehicle A is going to view images. With the interior screen 21 being located at the home position, the projector 1 performs various settings so as to appropriately project images to the interior screen 21. Upon completion of this operation, as described in the first embodiment, the projector 1 generates a light beam L based on an externally-supplied image signal, and then emits the light beam L toward the interior screen 21. The emitted light beam L is reflected and diffused by the interior screen 21 (refer to FIG. 19A). With this, the viewer can view the images.

Next, a case is described where the viewer desires to view images outside the vehicle, typically, in a camping area. First, the viewer opens the back door B or the rear hatch B of the vehicle A (refer to FIG. 19B), and then extends the exterior screen 32 in the manner as described in the first embodiment. Then, the interior screen 21 is moved from the home position, thereby causing the reflecting member 24 to be exposed. In this state, the projector 1 generates the light beam L based on an externally-supplied image signal, and then emits the light beam L toward the reflecting member 24.

The emitted light beam L is then totally reflected by the reflecting member 24 and, consequently, is directed to the rear surface of the exterior screen 32. The exterior screen 32 allows the incident light beam L to pass therethrough and diffuses the light beam L, thereby displaying images (refer to FIG. 19B). With this, the viewer can view the images even outside the vehicle A.

In the fifth exemplary modification, in order to make the reflecting member 24 be exposed, the reflective interior screen 21 can rotate around the X or Y axis. This is not meant to be restrictive. Alternatively, the interior screen 21 may be slidable in any one of the X axis, the Y axis, and the Z axis, or the interior screen 21 may be removable.

Furthermore, the interior screen 21 may be fixed to the reflecting member 24. Here, if the reflecting member 24 is fixed to the rear surface of the interior screen 21, the interior screen 21 is required to switch between a characteristic of transmitting incident light and a characteristic of reflecting incident light in response to an externally-supplied electrical signal.

Still further, in the fifth exemplary modification, the reflecting member 24 is mounted on the rear surface of the interior screen 21. This is not meant to be restrictive. Alternatively, the interior screen 21 may be mounted on the rear surface of the reflecting member 24.

Second Embodiment

Figure 20:
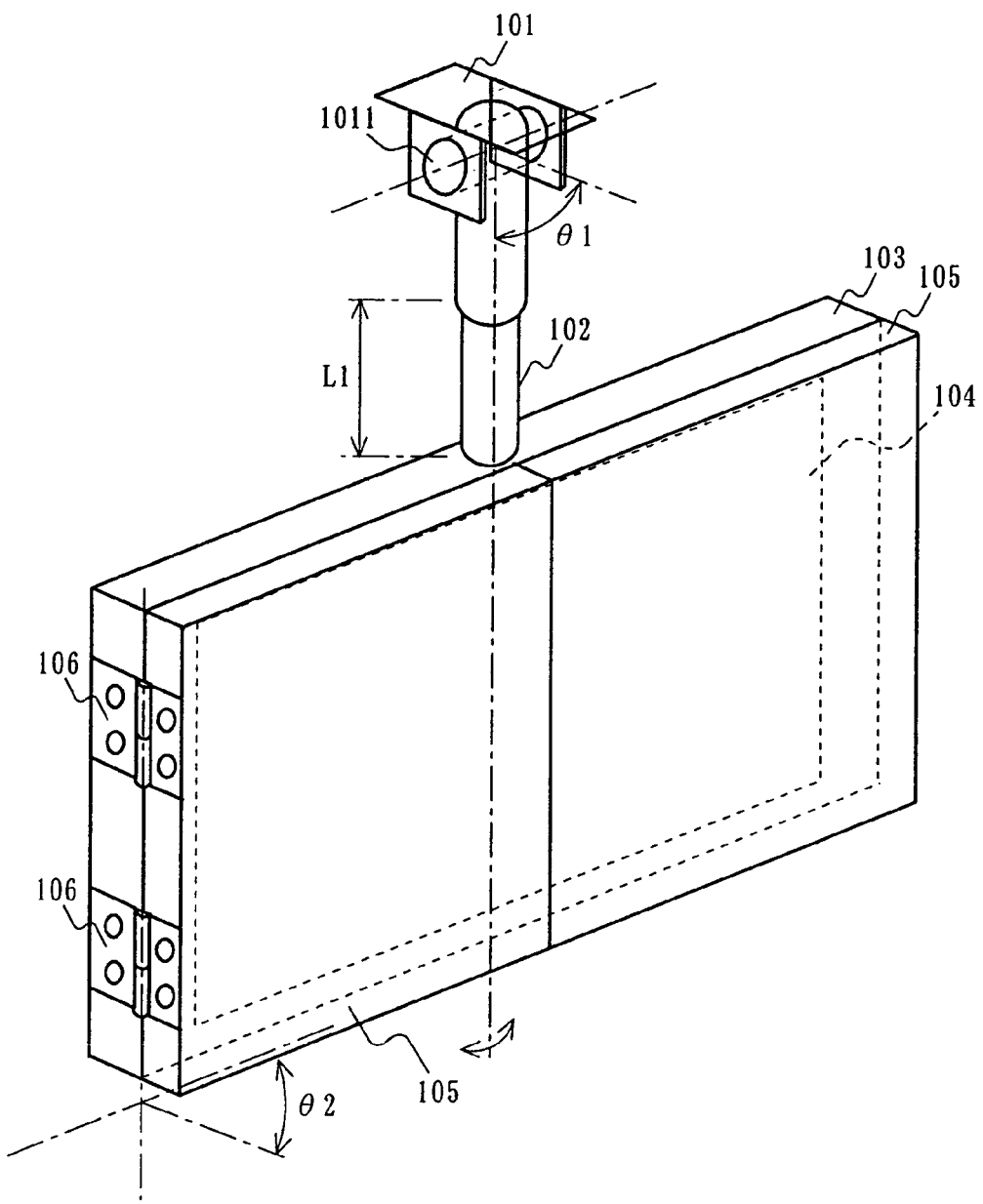
FIG. 20 is a schematic diagram illustrating the entire structure of a screen device according to a second embodiment of the present invention.

FIG. 20 is a schematic diagram illustrating the entire structure of a screen device according to a second embodiment of the present invention. In FIG. 20, the screen device can be applied to a display system mounted on a vehicle, and the screen device includes a mounting member 101, a supporting member 102, a body 103, a screen 104, and a light shield (preferably, two light shields as shown in FIG. 20) 105, and several (two in FIG. 20) hinges 106.

The mounting member 101 is structured so as to be mountable on the ceiling inside a vehicle. Unlike the first embodiment, in the second embodiment, the vehicle can be of any type. The mounting member 101 further includes a rotational shaft 1011 for rotating the supporting member 102 about its longitudinal axis. The rotational shaft 1011 rotates in a vertical plane at angles up to a predetermined angle θ.

The supporting member 102 has a rod-like shape, and is structured so as to be able to extend and retract within a range of a predetermined length L1. The above-structured supporting member 102 the rotational shaft 1011 mounted at one of its ends and the body 103 mounted at its other end.

The body 103 is preferably a box having adequate stiffness. The upper surface of the body 103 is mounted on the supporting member 102. The body 103 may be fixed to the supporting member, but is preferably rotatably mounted on the supporting member 102 for rotation about a vertical axis from a force exerted by the viewer.

The screen 104 typically has a rectangular shape. Images that are projected by a projector (not shown) are displayed on the screen 104. The screen 104 is formed or laminated on a main surface of the body 103.

Each light shield 105 is a board member having an outer surface which is capable of absorbing or reflecting light, and is mounted on the body 103 via the hinges 106 which allow opening and closing. Specifically, one wing of each hinge 106 is fixed to a side surface of the light shield 105, and the other wing thereof is fixed to a side surface of the body 103. Each hinge 106 allows the wing fixed to the light shield 105 to rotate about a rotation axis of the hinge 106 at angles up to a predetermined angle θ2. With this, the light shield 105 rotates at angles up to the predetermined angle θ2 with respect to the screen 104. Here, the angle θ2 preferably satisfies 0 degrees <θ2<180 degrees.

The operation of the above-structured screen device is described below. Prior to operation, as illustrated in FIG. 21, with each light shield 105 being closed and the supporting member 102 being retracted at the maximum length, the main surface of the body 103 is located at a position which allows an intimate contact with the ceiling inside the vehicle. In the following description, such a position is referred to as a home position.

Figure 21A:
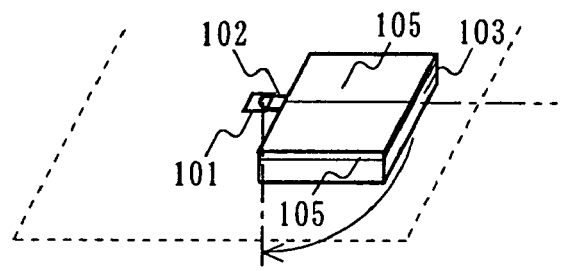
FIGS. 21A through 21D are schematic illustrations showing an operation of the screen device according to the second embodiment.
Figure 21B:
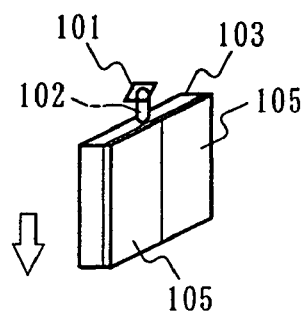
Figure 21C:
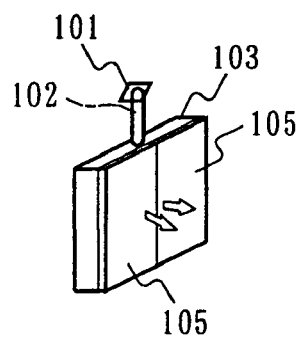
Figure 21D:
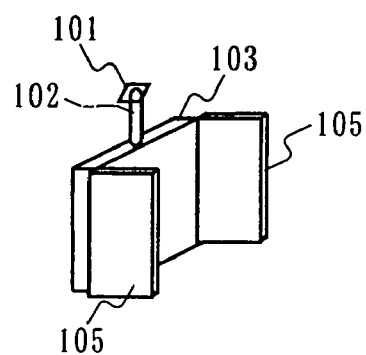

In order to view images, the viewer rotates the rotational shaft 1011 by the angle θ1, as illustrated in FIG. 21A. The viewer then extends the supporting member 102 by the length L1, as illustrated in FIG. 21B. The viewer then rotates each light shield 105 about the axis of the relevant hinge 106 by the angle θ2, as illustrated in FIGS. 21C and 21D. With this, each light shield 105 stands still at a position where each light shield 105 and the screen 104 approximately form the angle θ2, as illustrated in FIG. 21D. Thus, the outer surface of each light shield 105 is oriented to the outside of the vehicle.

After viewing, the viewer performs an operation in reverse to the operation described above with reference to FIGS. 21A through 21D. Thus, the screen device is moved back to the home position.

Through the above-described operation illustrated in FIGS. 21A through 21D, the viewer can view images displayed on the screen 104. Also, the outer surface of each light shield 105 can shield external ambient light. Furthermore, with the screen 104 being formed or laminated on the main surface of the body 103, flapping of the screen 104 due to vibrations of the vehicle and/or the wind can be prevented. Thus, the screen device can provide images that are easy for the viewer to view.

Furthermore, when the screen device is at the home position, each light shield 105 is closed, thereby protecting the screen 104. Furthermore, at the home position, the body 103 is intimately contacted with the ceiling inside the vehicle. This prevents the visibility of the driver from being obstructed when viewing the back of the vehicle with the room (rearview) mirror. Still further, by appropriately determining the length L1 of the supporting member 102, even while the viewer is viewing images, it is possible to prevent the visibility of the driver from being obstructed when viewing the back of the vehicle with the room mirror.

In the second embodiment, two light shields 105 are provided to cover the entire screen 104. This is not meant to be restrictive. Alternatively, a single light shield 105 is provided with its one side surface being fixed to one side surface of the body 103. In this case, the light shield 105 is preferably provided to the body 103 on a side closer to a vehicle window.

Still further, when the viewer rotates the rotational shaft 1011 by the angle θ1, the screen device may allow the viewer to feel clicks. The same goes when the viewer opens or closes the light shields 105.

Still further, in the second embodiment, the screen device is changed manually by the viewer from the state shown in FIG. 21A to the state shown in FIG. 21D. This is not meant to be restrictive. Alternatively, first through third driving mechanisms may be incorporated in the screen device. In this case, when the power voltage is turned on, the first driving mechanism automatically rotates the rotational shaft 1011 by the angle θ1. The second driving mechanism then automatically extends the supporting member 102 by the length L1. The third driving mechanism then automatically rotates (each) light shield 105 about the axis of the relevant hinge 106 by the angle θ2.

Still further, in the second embodiment, the screen device has the body 103 having adequate stiffness and the light shields 105. This is not meant to be restrictive. Alternatively, either one of these can achieve a screen device which can provide images that are easy for the viewer to view.

(First Exemplary Modification)

Figure 22A:
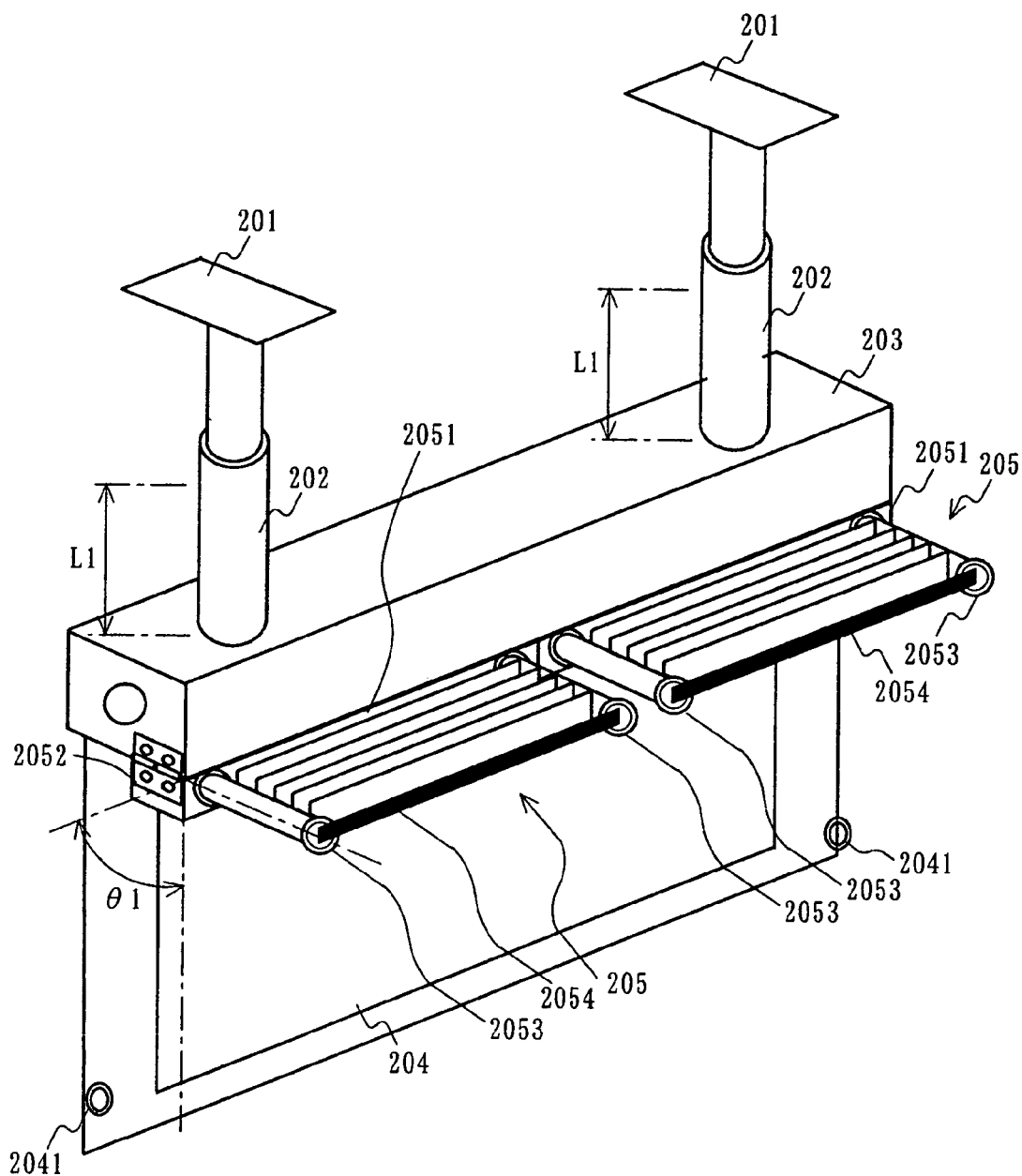
FIGS. 22A and 22B are schematic illustrations showing the structure of a screen device according to a first exemplary modification of the second embodiment.
Figure 22B:
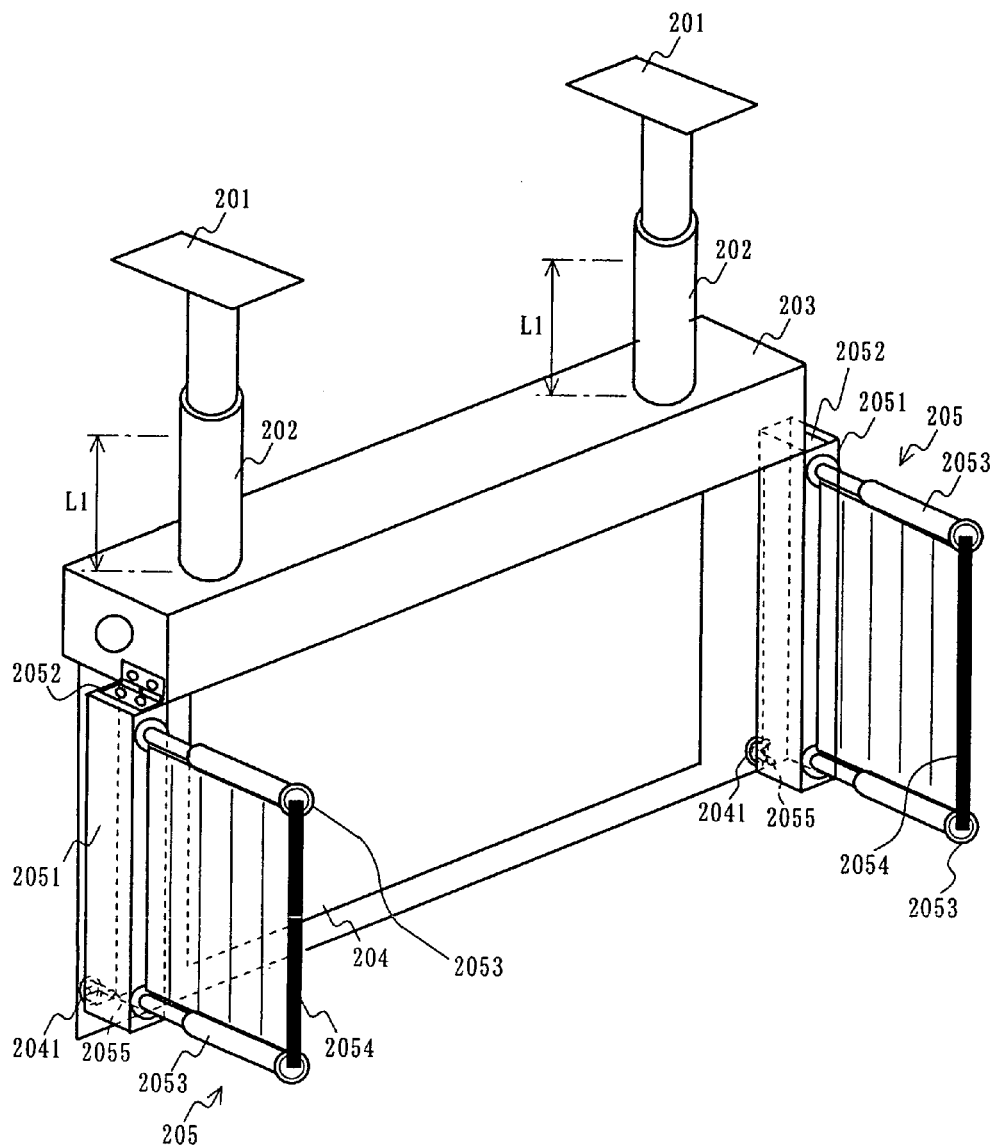

FIGS. 22A and 22B is schematic illustrations showing the structure of a screen device according to a first exemplary modification of the second embodiment. In FIGS. 22A and 22B, the screen device includes two mounting members 201, two main supporting members 202, a housing unit 203, a screen 204, and a light shielding unit (preferably, two light shielding units as shown in FIG. 22A) 205.

Each mounting member 201 is typically structured so as to be mountable on the ceiling inside the vehicle. Also, each mounting member 201 is structured so as to be mountable on one of the main supporting members 202.

Each main supporting member 202 has a rod-like shape, and is structured so as to be extendable within a range of a predetermined length L1. The above-structured main supporting member 102 has the mounting member 201 mounted on one of its ends and the housing unit 230 mounted on the other end.

The housing unit 230 includes a spring (not shown) for winding and moving up and down the screen 204.

The screen 204 is typically a rectangular cloth screen on which images that are projected by a projector (not shown) are displayed. Also, the screen 204 is accommodated in the housing unit 203 as being wound up in a roll shape. Furthermore, the screen 204 has a ring 2041 at each of the two lower corners.

Each light shielding unit 205 has a shield supporting member 2051, at least one hinge 2052, two extendable members 2053, a light shield 2054, and a hook (shown only in FIG. 22B) 2055.

The shield supporting member 2051 is mounted on the bottom surface of the housing unit 203 via the hinge 2052 which allows opening and closing. Specifically, one wing of the hinge 2052 is fixed to an external side surface of the shield supporting member 2051, and the other wing thereof is fixed to a side surface of the housing unit 203. The hinge 2052 allows the wing fixed to the shield supporting member 2051 to rotate about a rotation axis of the hinge 2052 at angles up to a predetermined angle θ1. With this, the shield supporting member 251 rotates at angles up to the predetermined angle θ1.

Each of extendable members 2053 has a rod-like shape, and is structured so as to be able to extend and retract within a range of a predetermined length L2. The above-structured extendable member 2053 is mounted at its one end on the front surface of the supporting member 2051. Here, each supporting member 202 has two extendable members 2053 mounted thereon that are spaced apart from each other by a length which is approximately equal to the length of one side of the light shield 2054.

The light shield 2054 has an outer surface which is capable of absorbing or reflecting light, and the light shield 2054 can be folded. This light shield 2054 has one side fixed to the shield supporting member 2051 and the other side opposite thereto fixed to the other ends of the extendable members 2053. The light shield 2054 can be folded or unfolded in accordance with the extension or retraction of the extendable members 2053. As with the light shield 105 in the second embodiment, the light shield 2054 when unfolded and the screen 204 form an angle that is larger than 0 degrees and is smaller than 180 degrees.

The hook 2055 is mounted on a portion near the inner side surface of the shield supporting member 2051 to engage in the ring 2041 of the screen 204.

Figure 23A:
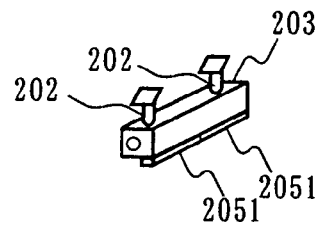
FIGS. 23A through 23E are schematic illustrations showing an operation of the screen device illustrated in FIGS. 22A and 22B.

The operation of the above-structured screen device is described below. Prior to operation, as illustrated in FIG. 23A, the screen device is in a state where each of the main supporting members 202 is retracted at the maximum length and the screen 204 is wound up for accommodation in the housing unit 203. Also, the shield supporting members 2051 are closed and are located at a position which allows an intimate contact with the bottom surface of the housing unit 203. In the following description, such a position is referred to as a home position.

Figure 23B:
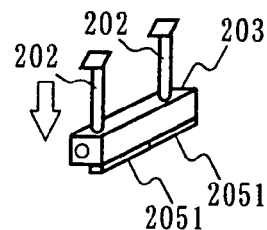
Figure 23C:
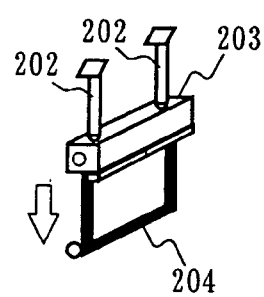
Figure 23D:
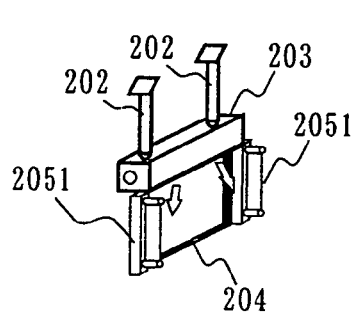
Figure 23E:
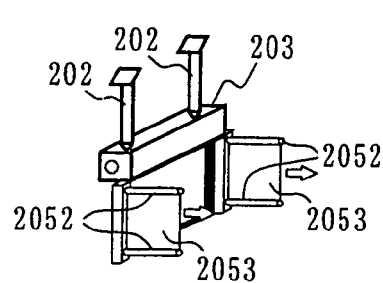

In order to view images, as illustrated in FIG. 23B, the viewer pulls down the housing unit 203, thereby extending the main supporting members 202. The viewer semi-fixes the housing unit 203 at a desired position. Then, as illustrated in FIG. 23C, the viewer pulls down the screen 204 from the housing unit 203 and fixes the screen 204. Furthermore, as illustrated in FIG. 23D, the viewer rotates each of the shield supporting members 2051 about by the angle θ1. At this time, although not shown in FIG. 23D, the viewer engages each hook 2005 to the relevant ring 2041. Furthermore, as illustrated in FIG. 23E, the viewer pulls either of the extendable members 2053 and the light shields 2054 to the extendable members 2053, thereby opening each of the light shields 2054. Consequently, the outer surface of each of the light shields 2054 is oriented to the outside of the vehicle. After viewing, the viewer performs an operation in reverse to the operation described above with reference to FIGS. 23A through 23E. Thus, the screen device is moved back to the home position.

Through the above-described operation illustrated in FIGS. 23A through 23E, the viewer can view images displayed on the screen 204. Also, the outer surface of each light shield 2054 can shield external ambient light. Furthermore, with the combination of the hooks 2055 and the rings 2041, the screen 204 is supported by the shield supporting members 2051. Therefore, flapping of the screen 204 due to vibrations of the vehicle and/or the wind can be prevented. Thus, the screen device can provide images that are easy for the viewer to view.

Furthermore, when the screen device is at the home position, the housing unit 203 accommodates the screen 204, thereby protecting the screen 204. Furthermore, at the home position, the main supporting members 202 are at the minimum length. This prevents the visibility of the driver from being obstructed when viewing the back of the vehicle with the room (rearview)mirror. Still further, by appropriately determining the length L1 of the main supporting members 202, even while the viewer is viewing images, it is possible to prevent the visibility of the driver from being obstructed when viewing the back of the vehicle with the room mirror.

In the first exemplary modification, the light shielding units 205 are provided to cover the entire screen 204. This is not meant to be restrictive. Alternatively, as with the second embodiment, a single light shielding unit 205 is provided with one side of the screen 204.

Still further, when the viewer rotates each of the shield supporting members 2051 by the angle θ1, the screen device may allow the viewer to feel clicks.

Also, in the first exemplary modification, the state of the screen device is changed manually by the viewer from the state illustrated in FIG. 23A to the state illustrated in FIG. 23D. This is not meant to be restrictive. Alternatively, as with the second embodiment, the state of the screen device may be automatically changed from the state illustrated in FIG. 23E to that illustrated in FIG. 23E.

(Second Exemplary Modification)

Figure 24A:
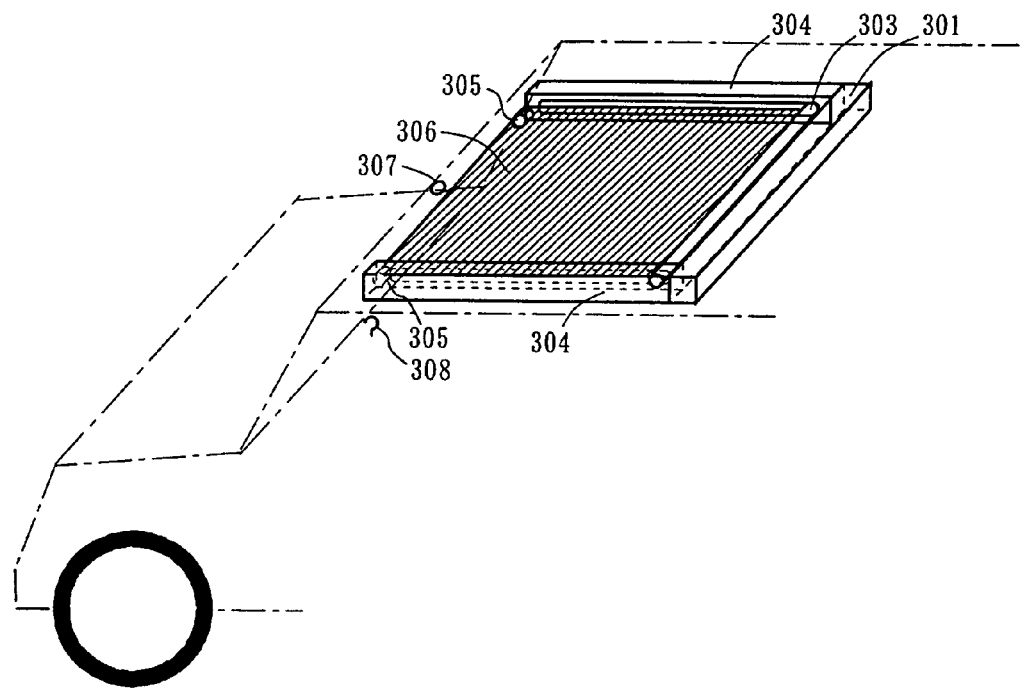
FIGS. 24A and 24B are schematic illustrations showing the structure of a screen device according to a second exemplary modification of the second embodiment.
Figure 24B:
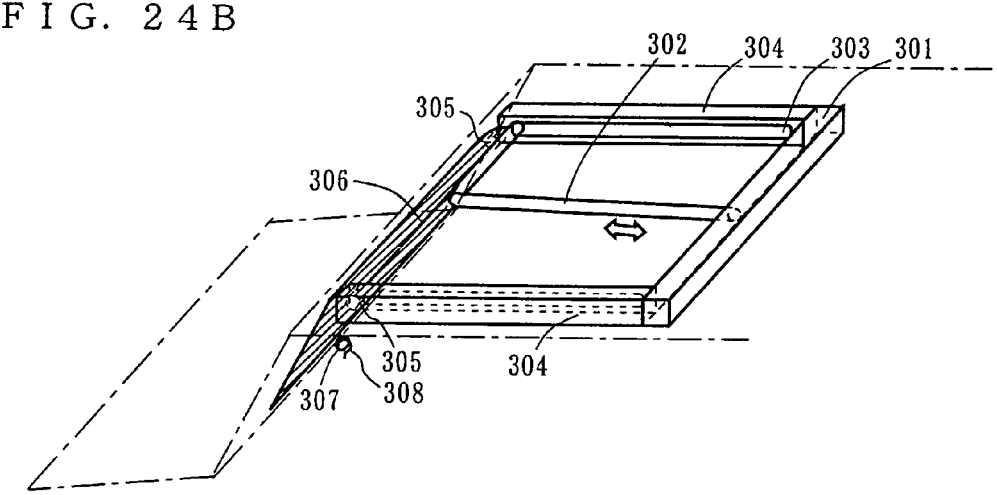

FIGS. 24A and 24B are schematic illustrations showing the structure of a screen device according to a second exemplary modification of the second embodiment. In FIGS. 24A and 24B, the screen device is typically structured so as to be able to be accommodated in the ceiling of the vehicle. The screen device includes a mounting member 301, a tension control member 302 (shown only in FIG. 24B), a supporting member 303, two slide guide members 304, at least one (two in FIGS. 24A and 24B) roller 305, a screen 306 (refer to a hatched portion), and a ring 307. For the ring 307, a hook 308 is mounted on a portion near the dashboard of the vehicle.

The mounting member 301 is mounted inside the ceiling of the vehicle for supporting at least one end of the tension control member 302.

The tension control member 302 is extendable as a spring, for example. As described above, one end of the tension control member 302 is fixed to the mounting member 301. The other end of the tension member 302 is fixed to the supporting member 303.

The supporting member 303 has a stick-like shape, and is mounted to the upper side of the screen 306. Both ends of the supporting member are inserted in one of the slide guide members 304, which will be described further below. The supporting member 303 is structured so as to be able to move along the slide guide members 304 with tension being applied by the tension control member 302 or the viewer.

Each of the slide guide members 304 is mounted inside the ceiling of the vehicle, extending from the mounting member 301 along the direction of travel of the vehicle. The length of each of the slide guide members 304 is equal to or longer than the length of the screen 306. Each of the slide guide members 304 has a groove formed thereon where the end of the supporting member 303 can slidably move. The slide guide members 304 are mounted inside the ceiling and are positioned apart from each other by a space corresponding to the length of the supporting member 303.

The rollers 305 are provided at a place near a boundary between the ceiling and the front glass of the vehicle. Each of the rollers 305 rotates about its axis, there by assisting the movement of the screen 306.

The screen 306 is typically a rectangular cloth screen on which images projected by a projector (not shown) are displayed. The screen 306 has the ring 307 at its lower side.

The operation of the above-structured screen device is described below. Prior to operation, as illustrated in FIG. 24A, the screen 306 is accommodated in the ceiling. Specifically, the screen 306 is in a position of being accommodated between the slide guide members 304. This position is here in after referred to as a home position. The screen 306 at the home position is under tension of the tension control member 302 in a direction of the mounting member 301.

In order to view images, the viewer pulls down a lower end portion of the screen 306 from the ceiling to the dashboard. At this time, the supporting member 303 moves along the groove of each of the slide guide members 304, and the roller 305 forwards the screen 306 from the ceiling to the dashboard. Then, as illustrated in FIG. 24B, the viewer engages the ring 307 in the hook 308. After viewing the images, the viewer removes the ring 307 from the hook 308, and then moves his or her hands off the screen 306. With this, the tension control member 302 strains the supporting member 303 and, as a result, the screen 306 retracts into the ceiling.

With the above-described operation, the viewer can view images displayed on the screen 306. Also, with the ring 307 being engaged in the hook 308, the screen 306 is pulled from the tension control member 302. Therefore, flapping of the screen 306 due to vibrations of the vehicle and/or the wind can be prevented. Thus, the screen device can provide images that are easy for the viewer to view. Furthermore, according to the present second exemplary modification, the size of the screen 306 can be increased. Still further, the entire screen device can be accommodated in the ceiling, thereby simplifying the inside of the vehicle.

Still further, the screen 306 is strained by the tension control member 302 even at the home position. Therefore, by reclining the front seat to the back of the vehicle, the viewer can view images while lying down on the front seat.

In the present exemplary modification, the screen 306 is fixed in position by the ring 307 and the hook 308. This is not meant to be restrictive. Alternatively, members other than the ring 307 and the hook 308 can be used as long as they can fix the screen 306.

Still further, the screen device preferably includes a stopper provided at a position near the end of the slide guide member 304 so as to prevent the screen 306 from coming down to the dashboard when not in use.

Still further, in the present second exemplary modification, the projector is mounted typically between the driver seat and the passenger seat. Also, all or part of the optical system of the projector for projecting images is preferably accommodated in a portion where the side brake is located. With this, the mounting space of the projector can be reduced.

Still further, the screen 306 may include the light shield(s) 105 as described in the second embodiment. With this, the screen device can shield external ambient light.

Still further, in view of the vehicle's interior design, a cover may be provided inside the vehicle to make the screen 306 at the home position invisible.

Still further, in the present second exemplary modification, the state of the screen device is changed manually by the viewer from the state illustrated in FIG. 24A to the state illustrated in FIG. 24B. This is not meant to be restrictive. Alternatively, as with the second embodiment, the state of the screen device may be automatically changed from the state illustrated in FIG. 24A to that illustrated in FIG. 24B.

Still further, in the present exemplary modification, the screen 306 is structured so as to be pulled down to the front glass side (front windshield). This is not meant to be restrictive. Alternatively, the screen 306 may be structured so as to be pulled down to the rear glass side (rear windshield).

(Third Exemplary Modification)

Figure 25A:
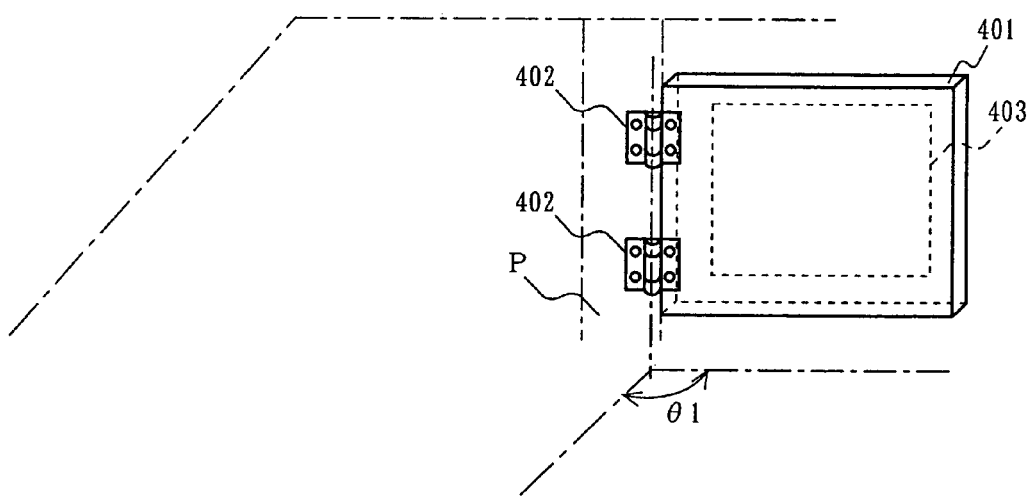
FIGS. 25A and 25B are schematic illustrations showing the structure of a screen device according to a third exemplary modification of the second embodiment.
Figure 25B:
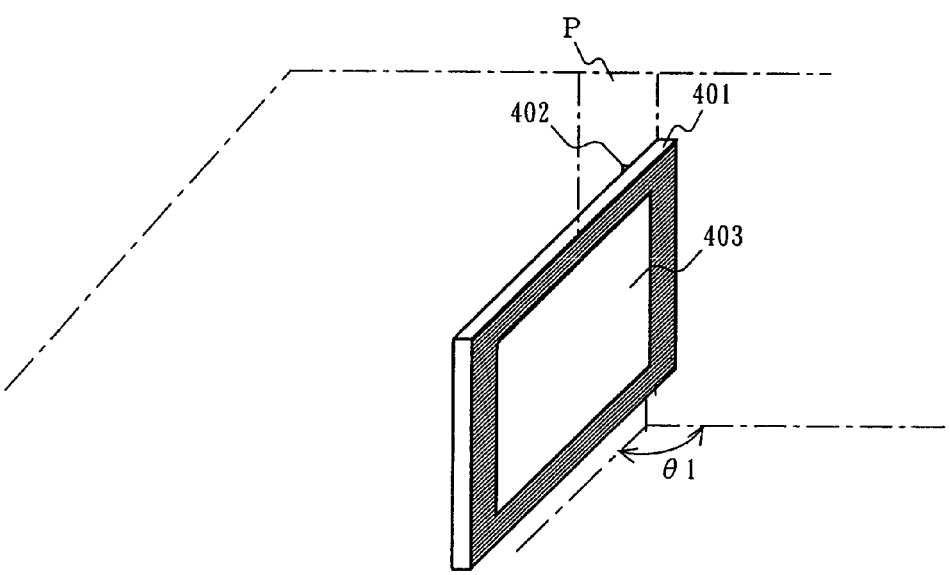

FIGS. 25A and 25B are schematic illustrations showing the structure of a screen device according to a third exemplary modification of the second embodiment. In FIGS. 25A and 25B, the screen device includes a body 401, several (two, in FIG. 25A) hinges 402, and a screen 403. FIGS. 25A and 25B also illustrate one center pillar P of a vehicle with regard to the screen device.

The body 401 is preferably a board having adequate stiffness, and is mounted on the center pillar P of the vehicle via the hinges 402 that allow opening and closing. Specifically, one wing of each hinge 402 is fixed to the rear surface of the body 401, and the other wing thereof is fixed to the center pillar P. Each hinge 402 allows the wing fixed to the body 401 to rotate about a rotation axis of the hinge 402 at angles up to a predetermined angle θ1. With this, the body 401 rotates at angles up to the predetermined angle θ1.

The screen 403 typically has a rectangular shape. Images projected by a projector (not shown) are displayed on the screen 403. The screen 403 is formed or laminated on a main surface of the body 401.

The operation of the above-structured screen device is described below. Prior to operation, as illustrated in FIG. 25A, with the body 401 being closed, the rear surface of the body 401 is located at a position which allows an intimate contact with the vehicle. With this, the screen device can prevent external ambient light from the outside of the vehicle. In the following description, such a position is referred to as a home position. In order to view images, the viewer rotates the body 401 and then stops the movement of the body 401 at a position which allows the viewer to easily view the screen 403. With this, the viewer can view the images displayed on the screen 403. In the present third exemplary modification, the projector is mounted on a side of the head rest of the rear seat or directly above the rear seat on the ceiling. After image viewing, the viewer brings the body 401 back to the home position.

As described above, according to the present third exemplary modification, with the screen 403 being formed or laminated on the main surface of the body 401, flapping of the screen 403 due to vibrations of the vehicle and/or the wind can be prevented. Thus, the screen device can provide images that are easy for the viewer to view.

In the present exemplary modification, the screen device prevents flapping of the screen 403 by the body 401 having adequate stiffness. This is not meant to be restrictive. Alternatively, the body 401 may have low stiffness. However, in view of preventing flapping of the screen 403, hook-and-loop fasteners or magnets are preferably attached to portions near the two corners of the screen on the side where the hinges 402 are not provided. In this case, the required number of hook-and-loop fasteners or magnets have to be further provided on the rear surface of the front seat or that of the head rest of the front seat in the vehicle.

Also, the body 401 has the light shield(s) 105 mounted thereon as described in the second embodiment. With this, the screen device can shield external ambient light.

Furthermore, when the viewer rotates the body 401 by the angle θ1, the screen device may allow the viewer to feel clicks.

Also, in the present exemplary modification, the state of the screen device is changed by a force exerted by the viewer from the state illustrated in FIG. 25A to the state illustrated in FIG. 25B. This is not meant to be restrictive. Alternatively, the state of the screen device may be automatically changed from the state illustrated in FIG. 25A to that illustrated in FIG. 25B.

(Fourth Exemplary Modification)

Figure 26:
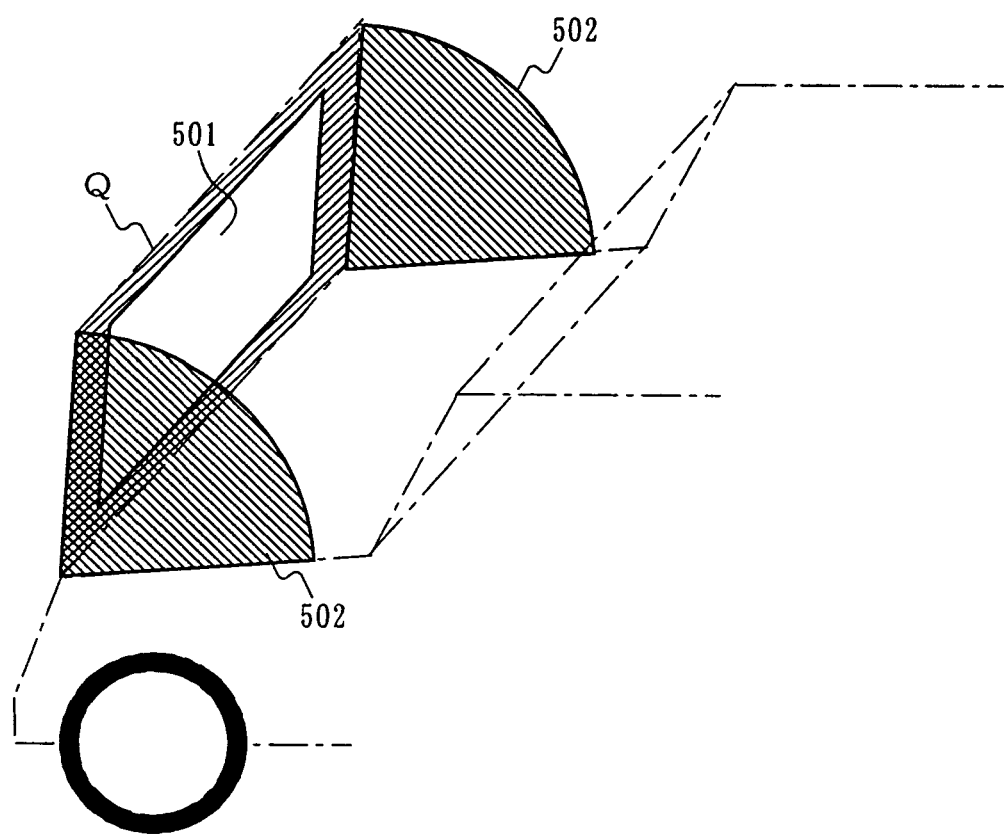
FIG. 26 is a schematic illustration showing the structure of a screen device according to a fourth exemplary modification of the second embodiment.

FIG. 26 is a schematic illustration showing the structure of a screen device according to a fourth exemplary modification of the second embodiment. In FIG. 26, the screen device includes a screen 501 and preferably two light shields 502. FIG. 26 also illustrates a hood Q of a vehicle with regard to the screen device.

The screen 501 typically has a rectangular shape. Images projected by a projector (not shown) are displayed on the screen 501. The screen 501 is fixedly or removably mounted on the rear surface of the hood Q of the vehicle.

The light shields 502 are typically fan-shaped board members. Preferably, the light shields 502 are removably mounted on the right and left sides of the rear surface of the hood Q. Here, each of the light shields 502 is mounted so as to form an angle larger than 0 degrees and smaller than 180 degrees with respect to the screen 501. Also, if mounted on the hood Q, each of the light shields 502 rotates about an axis of the hood Q in accordance with opening and closing of the hood Q. When maintenance of the engine room (compartment) of the vehicle is performed, these light shields 502 are removed.

The operation of the above-structured screen device is described below. Prior to operation, the screen device is accommodated in the engine room of the vehicle. In order to view images, as illustrated in FIG. 26, the viewer opens the hood Q. With this, the screen 501 appears ahead of the front seat of the vehicle, and the light shields 502 are spread out. Then, when the viewer fixes the light shields 502 with the hood Q open, each of the light shields 502 forms the predetermined angle with respect to the screen 501. With the above operation, the viewer can view images displayed on the screen 501. Note that, in the present exemplary modification, the projector is typically mounted ahead of the front window. After viewing, the viewer closes the hood Q.

As described above, according to the present exemplary modification, the screen 501 is mounted on the rear surface of the hood Q having adequate stiffness. Therefore, flapping of the screen 501 due to vibrations of the vehicle and/or the wind can be prevented. Also, the light shields 502 shield light. Therefore, the screen device can provide images that are easy for the viewer to view.

(Fifth Exemplary Modification)

Figure 27A:
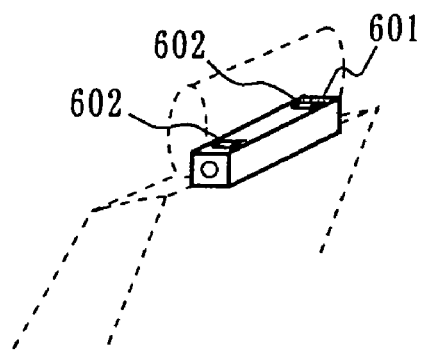
FIGS. 27A through 27D are schematic illustrations showing the structure of a screen device according to a fifth exemplary modification of the second embodiment.

FIGS. 27A through 27D are schematic illustrations showing the structure of a screen device according to a fifth exemplary modification of the second embodiment. In FIGS. 27A through 27D, the screen device includes a housing unit 601, two supporting members 602, and a screen 603. Only FIG. 27A illustrates the front seat of a vehicle with regard to the screen device.

The housing unit 601 is typically fixed to the rear surface of the front seat, and includes a spring (not shown) for winding and moving up and down the screen 603.

Each of the supporting members 602 has a rod-like shape, and is structured so as to extend and retract through a hole formed on the upper surface of the housing unit 601 within a range of a length L so as to approximately reach the ceiling of the vehicle. Also, the supporting members 602 can standstill. Furthermore, both of the upper ends of the screen 603 are fixed at predetermined positions on the supporting members 602. Here, the predetermined positions are determined according to the visibility of the viewer. That is, the predetermined positions are determined so as to allow the viewer to easily view the screen 603.

The screen 603 is typically a rectangular cloth screen on which images projected by a projector (not shown) are displayed. Also, the screen 603 is accommodated in the housing unit 601 as being wound up in a roll shape.

The operation of the above-structured screen device is described below. Prior to operation, as illustrated in FIG. 27A, the screen device is in a position such that the supporting members 602 are retracted at the maximum length and the screen 603 is wound up for accommodation in the housing unit 601. Such a position is hereinafter referred to as a home position.

Figure 27B:
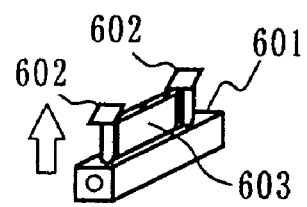
Figure 27C:
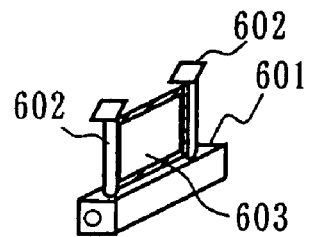
Figure 27D:
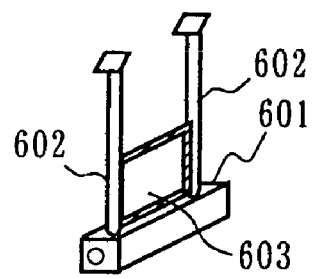

In order to view images, as illustrated in FIG. 27B, the viewer pulls out both of the supporting members 602 or the upper edge of the screen 603, thereby causing the supporting members 602 to extend. Also, after the screen 603 is completely exposed, as illustrated in FIG. 27C, the viewer further extends the supporting members 602 so that the upper edges thereof abut on the ceiling, as illustrated in FIG. 27D. With this, the viewer can view images. Note that, in the present exemplary modification, the projector is mounted typically on a side of the head rest of the rear seat or at a position approximately above the rear seat on the ceiling. After viewing, the viewer performs an operation in reverse to the operation described above with reference to FIGS. 27A through 27D. Thus, the screen device is moved back to the home position.

With the above-described operation illustrated in FIGS. 27A through 27D, the viewer can view images displayed on the screen 603. Also, with the screen 603 being fixed to the supporting members 602, flapping of the screen 603 due to vibrations of the vehicle and/or the wind can be prevented. Furthermore, with the supporting members 602 abutting the ceiling, vibrations of the vehicle toward the supporting members 602 can be isolated. This can also prevent flapping of the screen 603. Thus, the screen device can provide images that are easy for the viewer to view.

Also, at the home position, the housing unit 601 accommodates the screen 603, thereby protecting the screen 603. Furthermore, at the home position, the supporting members 602 are of the minimum length. This prevents the visibility of the driver from being obstructed when viewing the back of the vehicle with the room (rearview) mirror.

In the present exemplary modification, the screen device may be provided with the light shields 205 described in the first exemplary modification so as to be positioned on either one or both of the sides of the screen 603.

Furthermore, in the present exemplary modification, the state of the screen device is changed manually by the viewer from the state illustrated in FIG. 27A to the state illustrated in FIG. 27D. This is not meant to be restrictive. Alternatively, as with the first exemplary modification, the state of the screen device may be automatically changed from the state illustrated in FIG. 27A to that illustrated in FIG. 27D.

Still further, in the present exemplary modification, the supporting members 602 and the screen 603 are accommodated in the housing unit 601. This is not meant to be restrictive. Alternatively, these components can be embedded in the rear surface of the front seat of the vehicle.

Still further, in the present exemplary modification, after the screen 603 is completely exposed, the supporting members 602 further extend to abut on the ceiling. This is not meant to be restrictive. Alternatively, the supporting members 602 may first extend to abut on the ceiling before the screen 603 spreads up.

(Sixth Exemplary Modification)

Figure 28A:
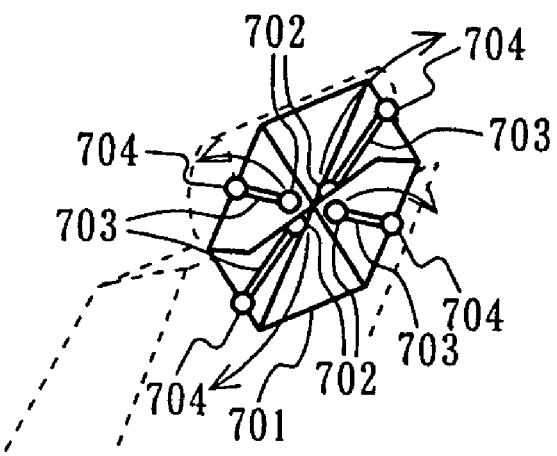
FIGS. 28A and 28B are schematic illustrations showing the structure of a screen device according to a sixth exemplary modification of the second embodiment.
Figure 28B:
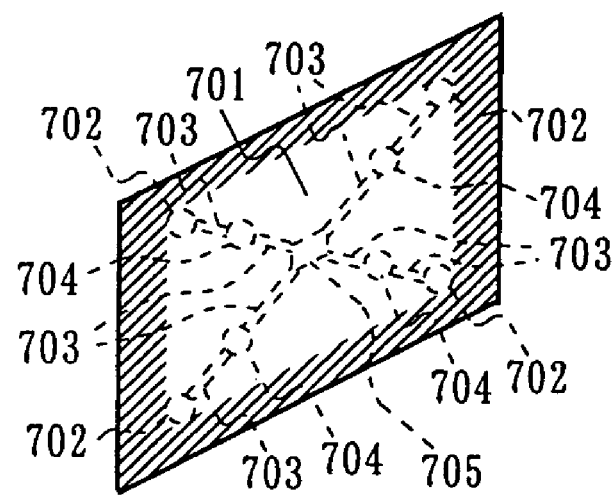

FIGS. 28A and 28B are schematic illustrations showing the structure of a screen device according to a sixth exemplary modification of the second embodiment. In FIGS. 28A and 28B, the screen device includes a screen 701, several (four in FIGS. 28A and 28B) supporting members 702, several (eight in FIGS. 28A and 28B) connecting members 703, several (four in FIGS. 28A and 28B) movable connecting members 704, and a mounting member 705. Only FIG. 28A illustrates a front seat (refer to a dotted portion) of a vehicle with regard to the screen device.

The screen 701 typically has a rectangular shape, and is typically made of material, such as a cloth, that can be folded. Images projected by a projector (not shown) are displayed on the screen 701.

The supporting members 702 are mounted on the corners of the rear surface of the screen 701 (that is, the rear surface of an image display surface). Furthermore, the supporting members 702 are structured so as to fixedly or removably connect at least one of the connecting members 703.

Each of the connecting members 703 is typically a metal rod. Each of the connecting members 703 has its one end connected to one supporting member 702 or one movable joint member 704 and the other end mounted to one movable joint member 704 or the mounting member 705.

Each of the movable joint members 704 is structured so as to be able to joint two connecting members 703 together. Also, the movable joint member 704 has a mechanism which allows one of the connecting members 703 jointed together to freely rotate at angles up to a predetermined angle. The movable joint member 703 also has a mechanism for locking the rotation of the connecting member 703 when the two connecting members 703 form an angle of substantially 180 degrees.

The mounting member 705 is typically structured so as to be mountable on the front seat. Furthermore, the mounting member 705 is structured so as to fixedly or removably connect the four connecting members 703.

The operation of the above-structured screen device is described below. Prior to operation, as illustrated in FIG. 28A, the screen 701 is in a state of being folded. Specifically, each of the connecting members 703 connected to the relevant supporting member 702 stands still at a position so as to form a relatively small angle close to 0 degrees with respect to the relevant connecting member 703 connected to the mounting member 705 by taking the relevant movable joint member 704 as a point of support.

In order to view images, the viewer spreads out the screen 701, as illustrated in FIG. 28B. With a force exerted by the viewer, each of the connecting members 703 connected to the relevant supporting member 702 rotates to a position so as to form a relatively large angle close to 180 degrees with respect to the relevant connecting member 703 connected to the mounting member 705 by taking the relevant movable joint member 704 as a point of support, and is then locked. With this, the viewer can view images. Note that, in the present exemplary modification, the projector is mounted typically on a side of the head rest of the rear seat or at a position directly above the rear seat on the ceiling. After image viewing, the viewer performs an operation in reverse to the operation described above with reference to FIGS. 28A through 28B. Thus, the screen 701 is returned to its folded state.

According to the present exemplary modification, when the screen 701 is spread out, the lock mechanism of the movable joint member 704 locks the two connecting members 703 connected to the movable joint member 704. Furthermore, since the screen 701 is supported by the four supporting members 702, flapping of the screen 701 due to vibrations of the vehicle and/or the wind can be prevented. Thus, the screen device can provide images that are easy for the viewer to view. Furthermore, according to the present exemplary modification, the screen 701 can be folded to be reduced in size. This prevents the visibility of the driver from being obstructed when viewing the back of the vehicle with the room mirror.

Figure 29A:
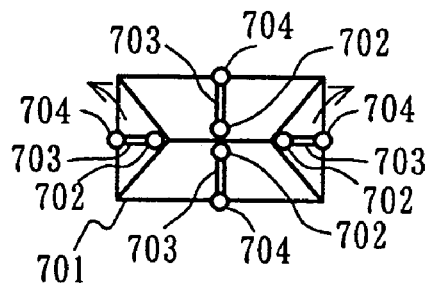
FIGS. 29A through 29D are schematic illustrations showing other exemplary structures of the screen device illustrated in FIGS. 28A and 28B.
Figure 29B:
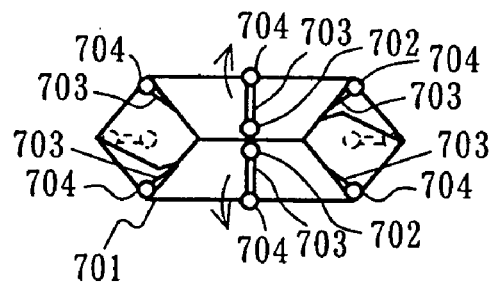

In order to fold the screen 701 for further reduction in size, the number of supporting members 702, movable joint members 704, and connecting members 703 are increased. For example, as illustrated in FIGS. 29A through 29B, with eight supporting members 702, eight movable joint members 704, and sixteen connecting members 703 being provided to the screen device, the screen 701 can be folded to be reduced in size. Prior to the operation of the screen device, as illustrated in FIG. 29, each of the connecting members 703 connected to the relevant supporting member 702 stand still so as to form a relatively small angle close to 0 degrees with respect to the relevant connecting member 703 connected to the mounting member 705 by taking the relevant movable joint member 704 as a point of support.

Figure 29C:
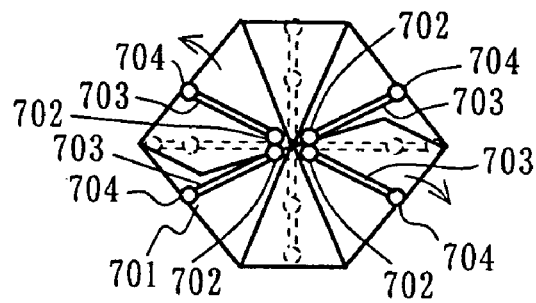
Figure 29D:
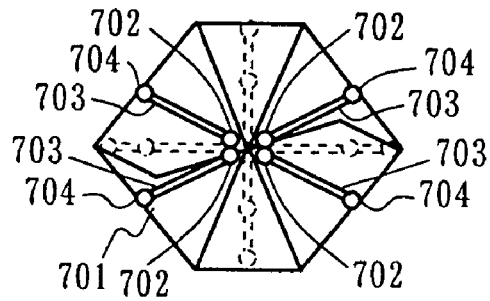

In order to view images, the viewer extends two connecting members 703 connected along a horizontal direction, as illustrated in FIG. 29A. Then, as illustrated in FIG. 29B, the viewer extends two connecting members 703 connected along a vertical direction. Further, as illustrated in FIGS. 29C and 29D, the viewer extends the connecting members 703 connected along the diagonal lines of the screen 701. Thereafter, the screen 701 is spread out in the manner as described with reference to FIGS. 28A and 29B. Also, the extended connecting member 703 are fixed by the locking mechanism of the movable joint members 704. With this, the viewer can view images.

(Seventh Exemplary Modification)

Figure 30A:
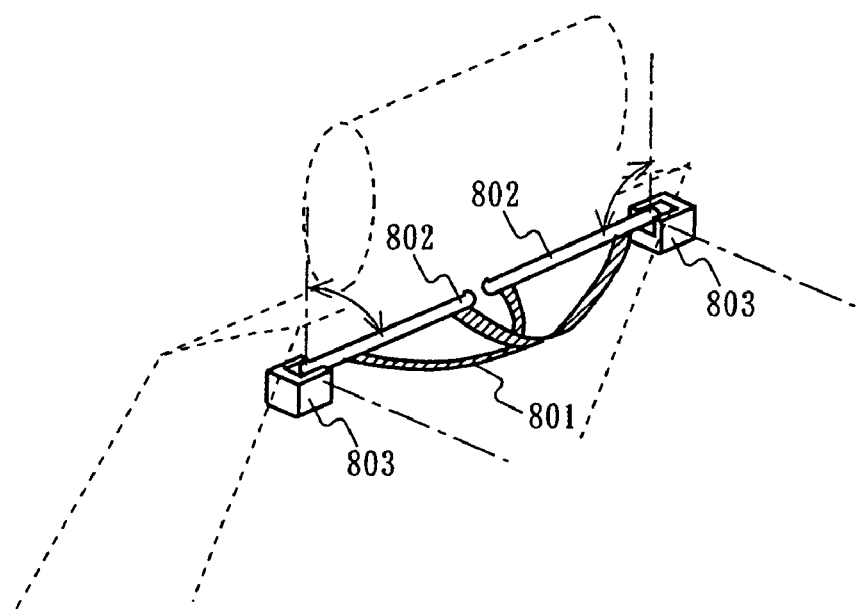
FIGS. 30A and 30B are schematic illustrations showing the structure of a screen device according to a seventh exemplary modification of the second embodiment.
Figure 30B:
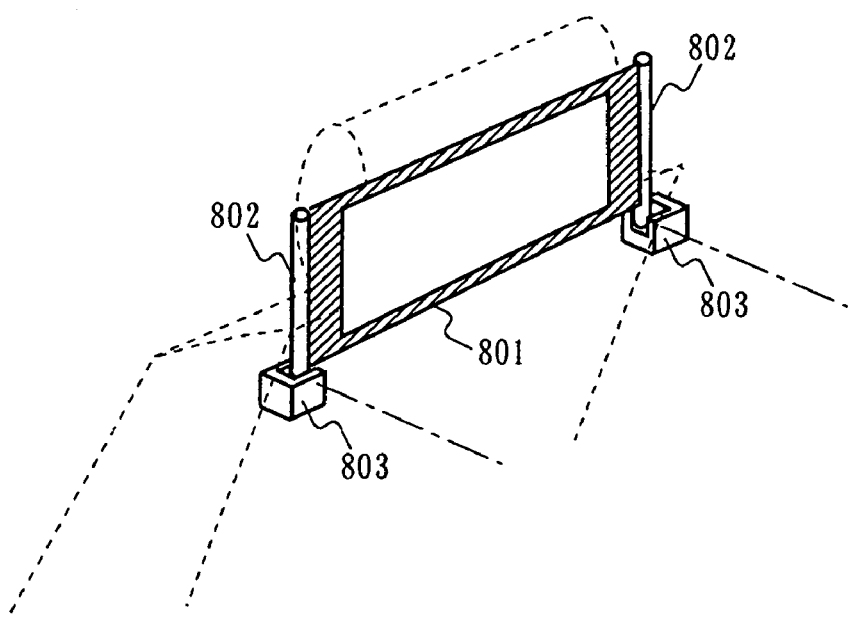

FIGS. 30A and 30B are schematic illustrations showing the structure of a screen device according to a seventh exemplary modification of the second embodiment. In FIGS. 30A and 30B, the screen device includes a screen 801, at least two supporting members 802, and at least two mounting members 803. FIGS. 30A and 30B also illustrate a front seat (refer to a dotted portion) of a vehicle with regard to the screen device.

The screen 801 has a rectangular shape, and is typically made of a soft material, such as a cloth. Images projected by a projector (not shown) are displayed on the screen 801.

Each of the supporting members 802 is typically a metal rod, and has the entire or part of the vertical sides of the screen 801 fixed thereto.

Each of the mounting members 803 is structured so as to be mountable on the front seat. Furthermore, each of the mounting members 803 supports one end of the relevant supporting member 802 so that the supporting member 802 can rotate at angles up to a predetermined angle. Here, the angles are from an angle at which the axis of the supporting member 802 is in an approximately horizontal position to an angle at which the axis is in an approximately vertical position. Also, each of the supporting members 803 has a mechanism for locking the movement of the relevant supporting member 802 when the supporting member 802 stands upright along the vertical axis. The above-structured supporting members 803 are mounted on both sides of the front seat so that the supporting members 802 can tilt toward each other.

The operation of the above-structured screen device is described below. Prior to operation, as illustrated in FIG. 30A, the supporting members 802 tilt toward each other, with the screen 801 hanging therefrom.

In order to view images, the viewer makes the supporting members 802 stand, as illustrated in FIG. 30B. Consequently, the axes of the supporting members 802 become approximately parallel to each other in the vertical direction, and the screen 801 is extended. With this, the viewer can view images. Note that, in the present exemplary modification, the projector is mounted typically on a side of the head rest of the rear seat or at a position approximately above the rear seat on the ceiling. After viewing, the viewer performs an operation in reverse to the operation described above with reference to FIGS. 30A and 30B. Thus, the screen device is moved back to the position before image viewing.

As described above, according to the present exemplary modification, the screen 801 is extended by the locked supporting members 802 when opened by the viewer. Therefore, flapping of the screen 801 due to vibrations of the vehicle and/or the wind can be prevented. Thus, the screen device can provide images that are easy for the viewer to view.

Furthermore, the screen 801 hangs over the rear surface of the front seat when not in use. This prevents the visibility of the driver from being obstructed when viewing the back of the vehicle with the room mirror.

Still further, in the present exemplary modification, the supporting members 802 are rotatably structured. This is not meant to be restrictive. Alternatively, the supporting members 802 may be fixed to the front seat so as to stand upright.

Still further, in the present exemplary modification, the screen device is changed manually by the viewer from the state shown in FIG. 30A to the state shown in FIG. 30B. This is not meant to be restrictive. Alternatively, the state of the screen device may be automatically changed from the state illustrated in FIG. 30A to that illustrated in FIG. 30B.

(Eighth Exemplary Modification)

Figure 31A:
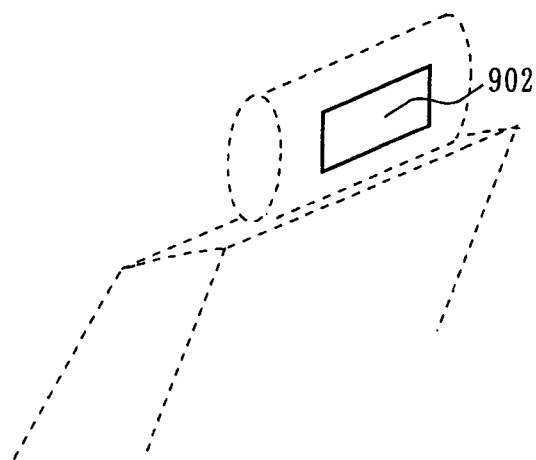
FIGS. 31A through 31C are schematic illustrations showing the structure of a screen device according to an eighth exemplary modification of the second embodiment.
Figure 31B:
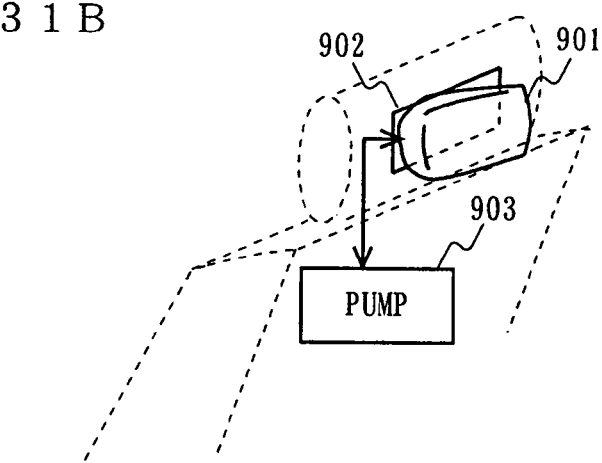
Figure 31C:
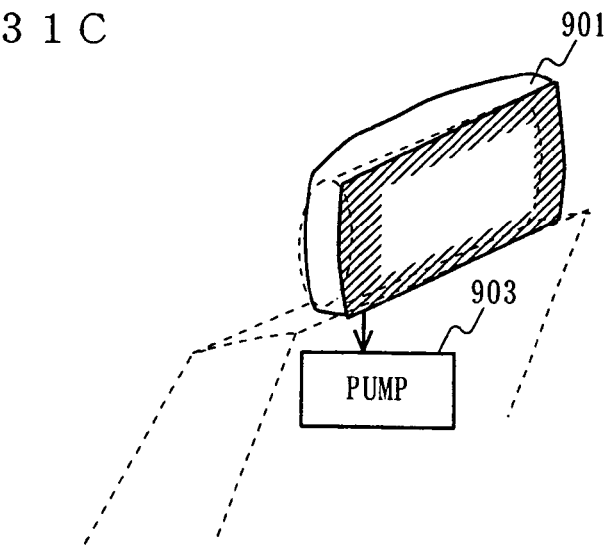

FIGS. 31A through 31C are schematic illustrations showing the structure of a screen device according to an eighth exemplary modification of the second embodiment. In FIGS. 31A through 31C, the screen device includes an inflatable screen 901, a housing unit 902, and a pump 903. FIGS. 22A and 22C also illustrate a front seat (refer to a dotted portion) of a vehicle with regard to the screen device.

The inflatable screen 901 is made of a material that is deformable when filled with gas, such as a balloon or an air bag. The screen 901 is designed so that a main surface of the inflatable screen 901 becomes a rectangular shape when filled with a predetermined amount of gas. Images projected by a projector (not shown) are displayed on this rectangular shape of the screen 901.

The housing unit 902 is mounted on the rear surface of a head rest of the front seat, for example, for accommodating the inflatable screen 901.

In response to an operation by the viewer, the pump 903 fills the inflatable screen 901 with gas or deflates the inflatable screen 901.

The operation of the above-structured screen device is described below. Prior to operation, as illustrated in FIG. 31A, the inflatable screen 901 is accommodated in the housing unit 902. In order to view images, the viewer operates the pump 903 to start filling the inflatable screen 901 with gas for inflation, as illustrated in FIG. 31B. With the predetermined amount of gas being filled in the screen 901, the main surface of the inflatable screen 901 typically becomes a rectangular shape. With this, the viewer can view images. Note that, in the present exemplary modification, the projector is typically mounted on a side of the head rest of the rear seat or at a position approximately above the rear seat on the ceiling. After viewing, in response to an operation by the viewer, the pump 903 deflates the inflatable screen 901. Then, the viewer puts the deflated inflatable screen 901 back in the housing unit 902. With this, the inflatable screen 901 is moved back to the state before image viewing.

As described above, according to the present exemplary modification, since the inflatable screen 901 is inflated with gas for image viewing, flapping of the main surface of the screen 901 due to vibrations of the vehicle and/or the wind can be prevented. Thus, the screen device can provide images that are easy for the viewer to view. Also, according to the present exemplary modification, the screen 901 can be accommodated in the housing unit 902. This prevents the visibility of the driver from being obstructed when viewing the back of the vehicle with the room mirror. Furthermore, according to the present exemplary modification, the inflatable screen 901 becomes elastic after being filled with gas. Therefore, as with an air bag system for vehicles, serious injury can be avoided even if the viewer's head hits the inflatable screen 901 in a vehicle accident.

Still further, in the screen device, the rear surface of the inflatable screen 901 is preferably provided with the supporting members 702, the movable joint members 704, and the connecting members 703 as described in the sixth exemplary modification. With this, flapping of the main surface of the screen 901 can be further prevented. Alternatively, several strings may be fixed at one end to points near the main surface of the inflatable screen 901 and at the other end to the rear surface of the head rest. In this case, with the tension of the strings, flapping of the main surface of the screen 901 can be prevented.

(Ninth Exemplary Modification)

Figure 32A:
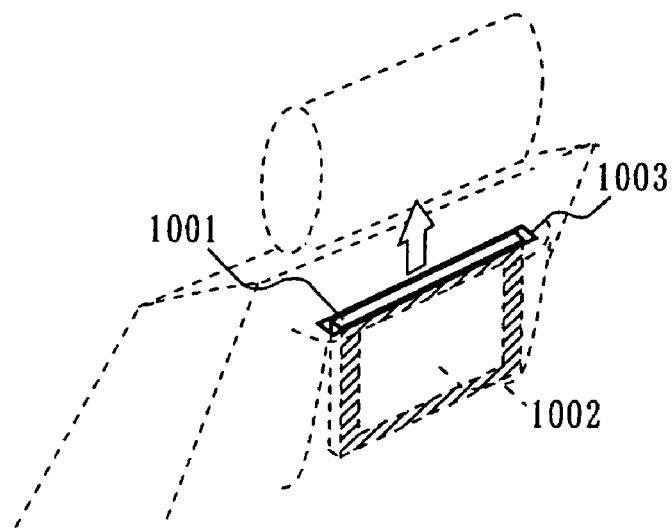
FIGS. 32A and 32B are schematic illustrations showing the structure of a screen device according to a ninth exemplary modification of the second embodiment.
Figure 32B:
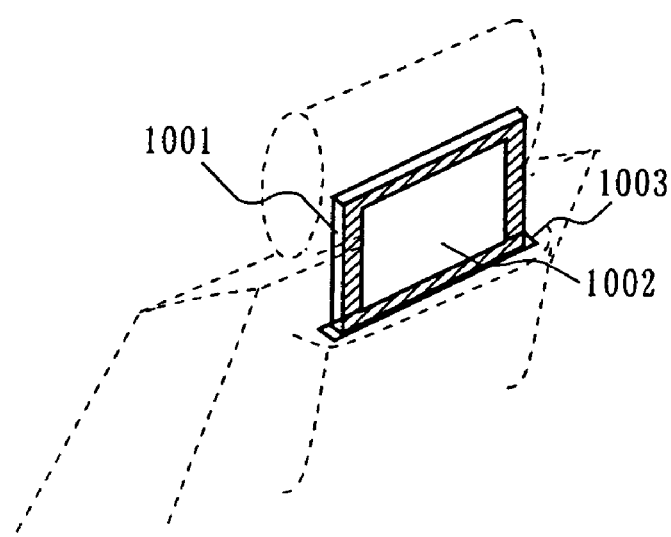

FIGS. 32A and 32B are schematic illustrations showing the structure of a screen device according to a ninth exemplary modification of the second embodiment. In FIGS. 32A and 32B, the screen device includes a supporting member 1001, a screen 1002, a housing unit 1003. FIGS. 32A and 32B also illustrate a front seat (refer to a dotted portion) of a vehicle with regard to the screen device.

The supporting member 1001 is a board-like member having adequate stiffness. The supporting member 1001 is preferably made of a material that is easy to break upon impact, such as styrofoam.

The screen 1002 typically has a rectangular shape. Images projected by a projector (not shown) are displayed on the screen 1002. The screen 1002 is formed or laminated on a main surface of the supporting member 1001.

The housing unit 1003 accommodates the supporting member 1001. Also, the housing unit 1003 has an opening from which the viewer can pull out the supporting member 1001. Furthermore, the housing unit 1003 has a mechanism for locking the screen 1002 when being exposed to a predetermined position.

The operation of the above-structured screen device is described below. Prior to operation, the supporting member 1001 is accommodated in the housing unit 1003, as illustrated in FIG. 32A. In order to view images, the viewer pulls out the supporting member 1001, as illustrated in FIG. 32B. When the supporting member 1001 is pulled out to the predetermined position, the locking mechanism of the housing unit 1003 works, thereby fixing the supporting member 1001. With this, the viewer can view images. Note that, in the present exemplary modification, the projector is mounted typically on a side of the head rest of the rear seat or at a position approximately above the rear seat on the ceiling. After viewing, the viewer performs an operation in reverse to the operation described above with reference to FIGS. 32A and 32B. Thus, the screen 1002 is moved back to the position before image viewing.

As described above, according to the present exemplary modification, since the screen 1002 is formed or laminated on the supporting member 1001 having adequate stiffness, flapping of the main surface of the screen 1002 due to vibrations of the vehicle and/or the wind can be prevented. Thus, the screen device can provide images that are easy for the viewer to view. Also, the supporting member 1001 is made of a material that is easy to break upon impact. Therefore, serious injury can be avoided even if the viewer's head hits the screen 1002 in a vehicle accident. Furthermore, the screen 1002 is pulled out only when viewing images. This prevents the visibility of the driver from being obstructed when viewing the back of the vehicle with the room mirror.

Still further, the supporting member 1001 may be provided with the light shields 105 described in the second embodiment or the light shielding units 205 described in the first exemplary modification.

(Tenth Exemplary Modification)

Figure 33A:
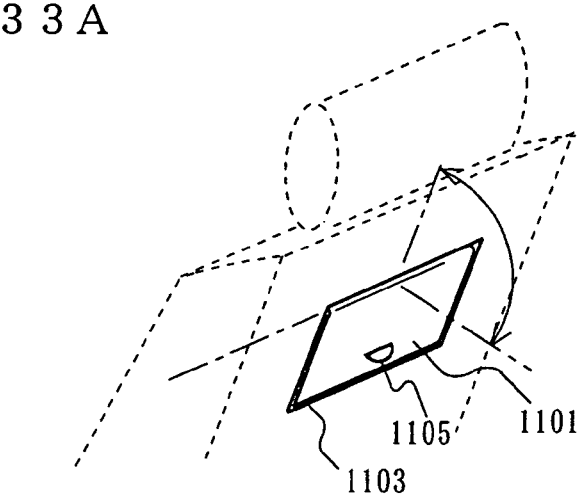
FIGS. 33A through 33C are schematic illustrations showing the structure of a screen device according to a tenth exemplary modification of the second embodiment.
Figure 33B:
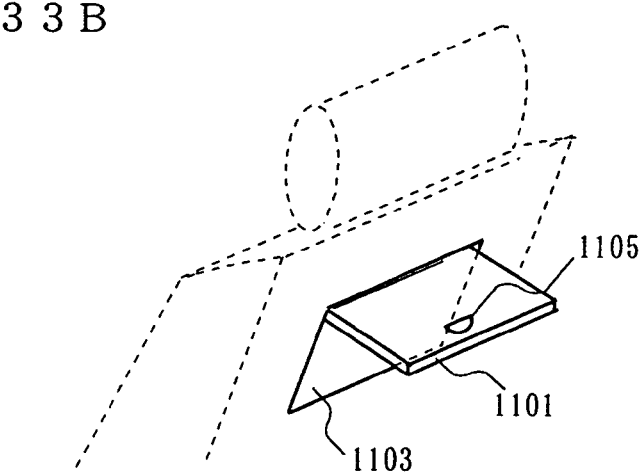
Figure 33C:
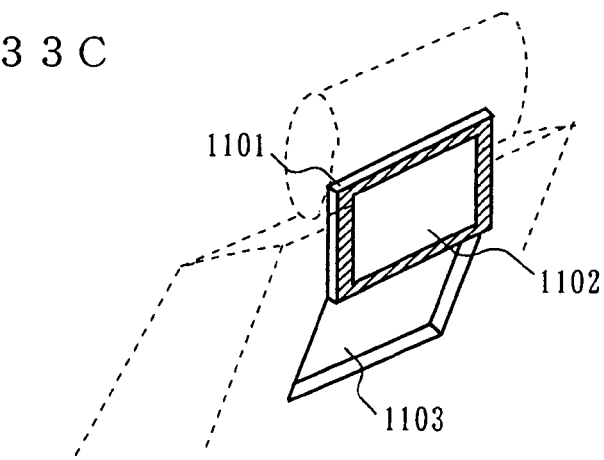

FIGS. 33A through 33C are schematic illustrations showing the structure of a screen device according to a tenth exemplary modification of the second embodiment. In FIGS. 33A through 33C, the screen device includes a supporting member 1101, a screen 1102, and a housing unit 1103. FIGS. 33A through 33C also illustrate a front seat (refer to a dotted portion) of a vehicle with regard to the screen device.

As with the above-described supporting member 1001, the supporting member 1101 is a board-like member having adequate stiffness, and is preferably made of a material that is easy to break upon impact. Furthermore, the supporting member 1101 has a pull 1105 formed or laminated on a surface opposite to the screen 1102.

As with the above-described screen 1002, the screen 1102 typically has a rectangular shape. Images projected by a projector (not shown) are displayed on the screen 1102.

The housing unit 1103 is formed on the rear surface of the front seat to accommodate the supporting member 1101. Also, the housing unit 1103 has a mechanism for rotating the supporting member 1101 at angles within a predetermined range. Here, the predetermined range is from an angle that is formed when the screen 1102 is accommodated in the housing unit 1103 to an angle that is formed while the screen 1102 is appropriately directed to the viewer. Also, the housing unit 1103 has a mechanism for locking the screen 1102 when being exposed to a predetermined position.

The operation of the above-structured screen device is described below. Prior to operation, the supporting member 1101 is accommodated in the housing unit 1103 so that the screen 1102 abuts on the housing unit 1103. In order to view images, the viewer grabs the pull 1105 to open the supporting member 1101, as illustrated in FIG. 33A. With this, as illustrated in FIG. 33B, the supporting member 1101 rotates about an axis of rotation of the rotating mechanism of the housing unit 1103. Then, the viewer rotates the supporting member 1101 until the locking mechanism of the housing unit 1103 starts working. With the locking mechanism working for locking the supporting member 1101, the viewer can view images. Note that, in the present exemplary modification, the projector is mounted typically on a side of the head rest of the rear seat or at a position approximately above the rear seat on the ceiling. After viewing, the viewer performs an operation in reverse to the operation described above with reference to FIGS. 33A through 33C. Thus, the supporting member 1101 is accommodated in the housing unit 1103, thereby bringing the screen device back to the position before image viewing.

As described above, according to the present exemplary modification, since the screen 1102 is formed or laminated on the supporting member 1101 having adequate stiffness, flapping of the screen 1102 due to vibrations of the vehicle and/or the wind can be prevented. Thus, the screen device can provide images that are easy for the viewer to view. Also, the supporting member 1101 is made of a material that is easy to break upon impact. Therefore, serious injury can be avoided even if the viewer's head hits the screen 1102 in a vehicle accident. Furthermore, the screen 1102 is taken out from the housing unit 1103 only when viewing images. This prevents the visibility of the driver from being obstructed when viewing the back of the vehicle with the room mirror.

Still further, the supporting member 1101 may be provided with the light shields 105 described in the second embodiment or the light shielding units 205 described in the first exemplary modification.

(Eleventh Exemplary Modification)

Figure 34A:
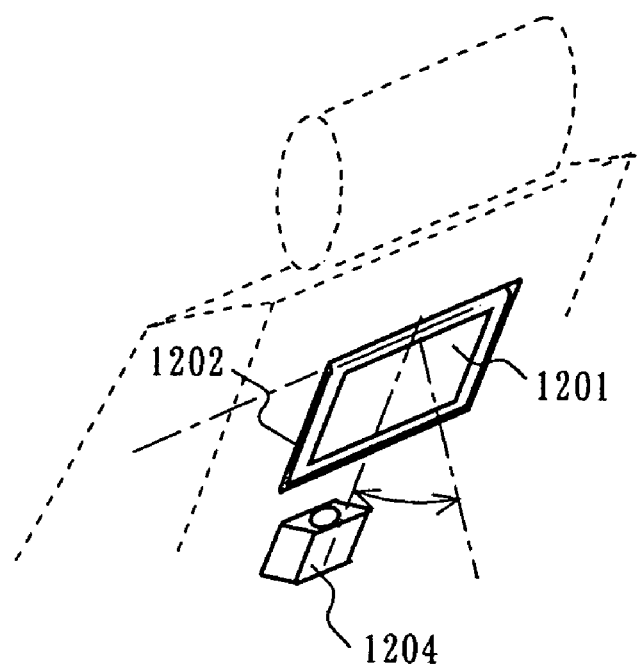
FIGS. 34A and 34B are schematic illustrations showing the structure of a screen device according to an eleventh exemplary modification of the second embodiment.
Figure 34B:
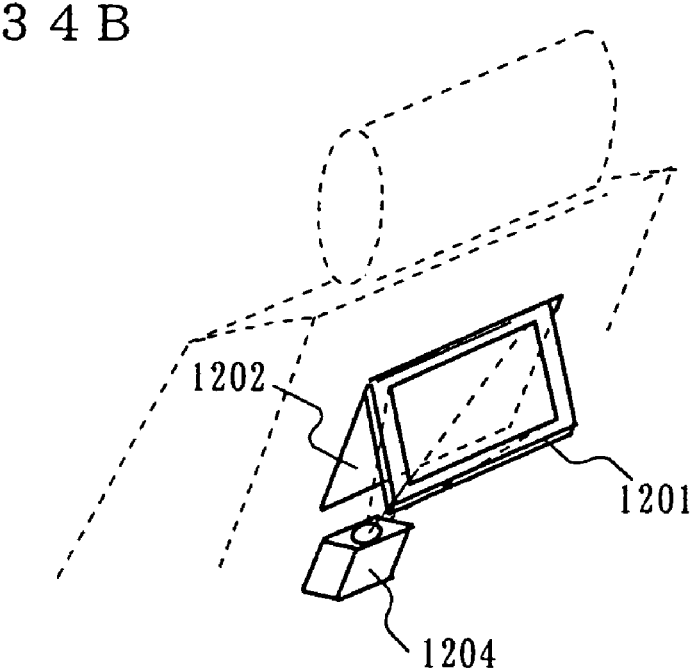

FIGS. 34A and 34B are schematic illustrations showing the structure of a screen device according to an eleventh exemplary modification of the second embodiment. In FIGS. 34A and 34B, the screen device includes a translucent screen 1201 and a housing unit 1202. FIGS. 34A and 34B also illustrate a front seat (refer to a dotted portion) of a vehicle and a projector 1204 with regard to the screen device.

The translucent screen 1201 is a surface which allows light to pass therethrough for displaying images that are projected by the projector 1204. The translucent screen 1201 has adequate stiffness itself, or is surrounded by a frame having adequate stiffness.

The housing unit 1202 is mounted on the rear surface of the front seat to accommodate the translucent screen 1201. Also, the housing unit 1202 has a mechanism for rotating the translucent screen 1201 at angles within a predetermined range. Here, the predetermined range is from an angle that is formed when the screen 1201 is accommodated in the housing unit 1202 to an angle that is formed while the screen 1201 is appropriately directed to the viewer. Also, the housing unit 1202 has a mechanism for locking the screen 1201 when being exposed to a predetermined position.

The operation of the above-structured screen device is described below. Prior to operation, the translucent screen 1201 is accommodated in the housing unit 1202, as illustrated in FIG. 34A. In order to view images, the viewer takes out the translucent screen 1201 from the housing unit 1202, as illustrated in FIG. 34B. When the translucent screen 1201 is pulled out to the predetermined position, the locking mechanism of the housing unit 1202 starts working, thereby fixing the translucent screen 1201. With this, the viewer can view images. Note that, in the present exemplary modification, the projector 1204 is mounted typically on a position near a lower portion of the rear surface of the front seat. After viewing, the viewer performs an operation in reverse to the operation described above with reference to FIGS. 34A and 34B. Thus, the translucent screen 1201 is moved back to the position before image viewing.

As described above, according to the present exemplary modification, since the translucent screen 1201 has adequate stiffness, flapping of the translucent screen 1201 due to vibrations of the vehicle and/or the wind can be prevented. Also, since the projector 1204 is mounted on the back of the translucent screen 1201, images of relatively high contrast can be provided even if external ambient light enters between the viewer and the translucent screen 1201. Thus, the screen device can provide images that are easy for the viewer to view.

Furthermore, by adopting the translucent screen 1201, the amount of rotation of the screen can be reduced as compared with that of the screen in the tenth exemplary modification. This can prevent the visibility of the driver from being obstructed when viewing the back of the vehicle with the room mirror.

Figure 35A:
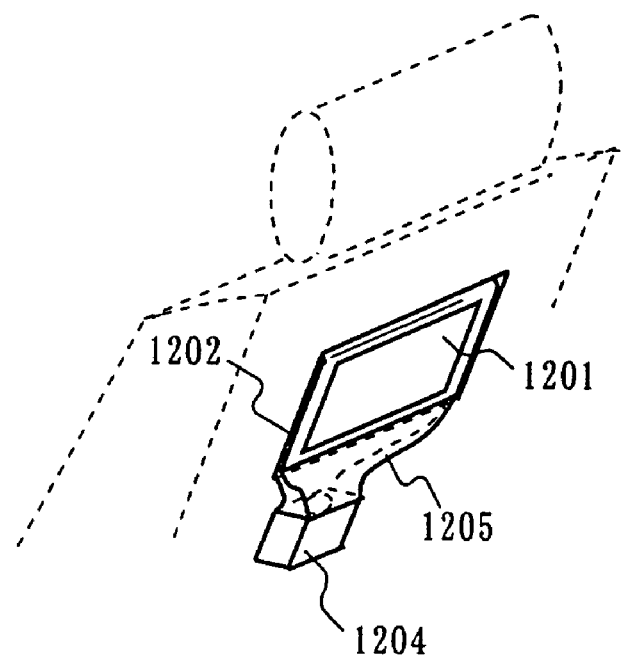
FIGS. 35A and 35B are schematic illustrations showing other exemplary structures of the screen device illustrated in FIGS. 34A and 34B.
Figure 35B:
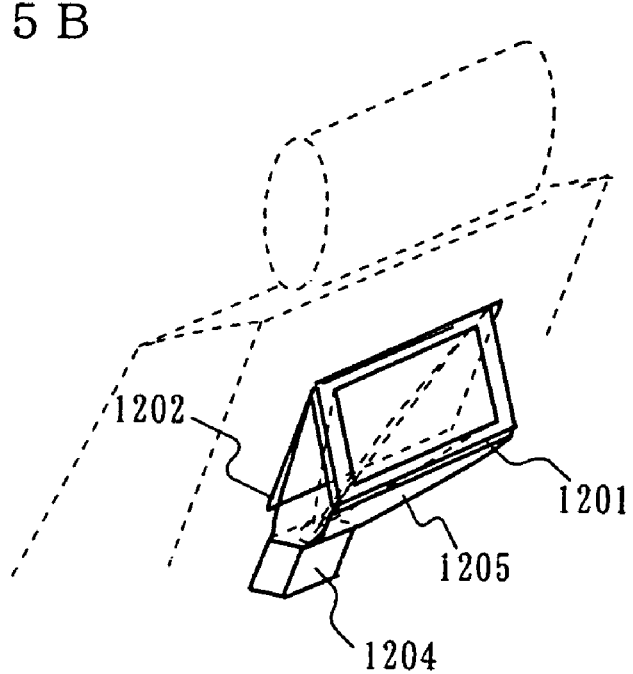

Still further, as illustrated in FIGS. 35A and 35B, a cover 1205 may be provided for shielding external ambient light by covering an optical path from the projector 1204 to the translucent screen 1201. The cover 1205 is preferably formed of a black cloth, and is unfolded in accordance with the rotation of the translucent screen 1201. With the optical path of the projector 1204 being covered by the above-described cover 1205 from external ambient light, images of relatively high contrast can be provided. Still further, the translucent screen 1201 may be provided with the light shields 105 described in the second embodiment or the light shielding units 205 described in the first exemplary modification.

(Twelfth Exemplary Modification)

Figure 36A:
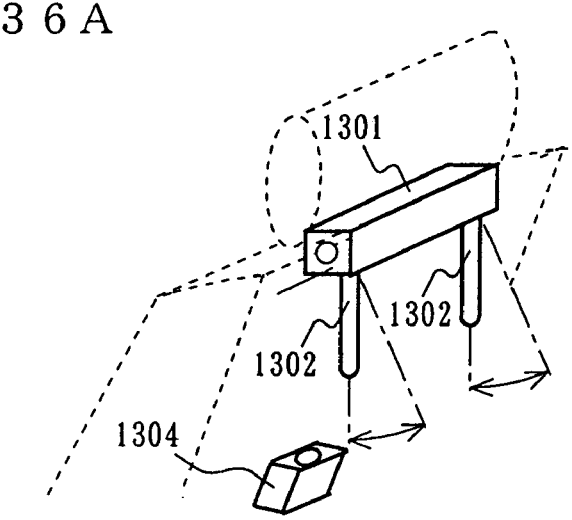
FIGS. 36A through 36C are schematic illustrations showing the structure of a screen device according to a twelfth exemplary modification of the second embodiment.
Figure 36B:
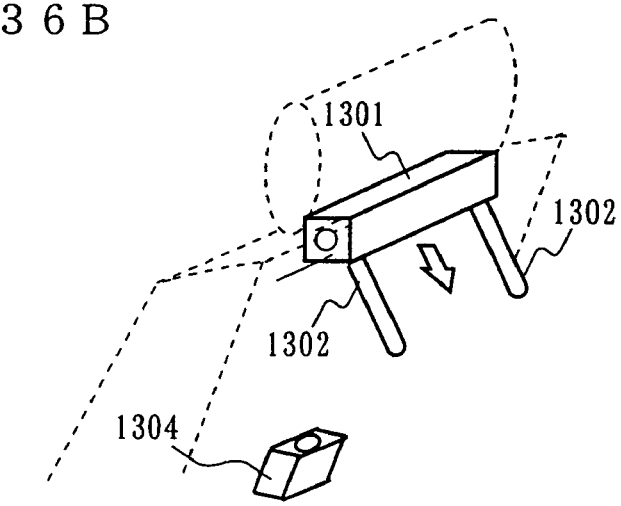
Figure 36C:
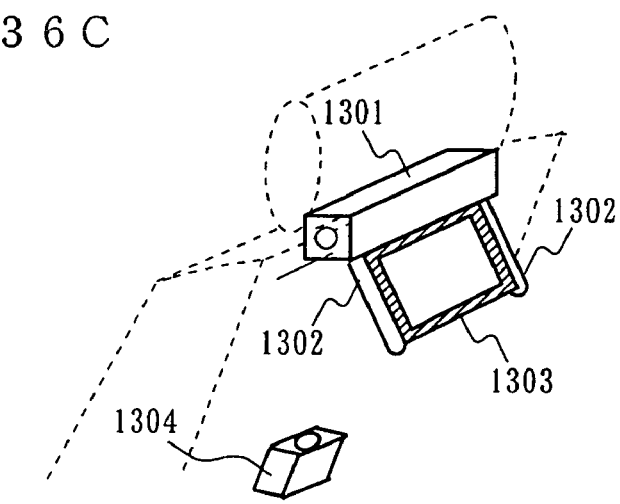

FIGS. 36A through 36C are schematic illustrations showing the structure of a screen device according to a twelfth exemplary modification of the second embodiment. In FIGS. 36A through 36C, the screen device includes a housing unit 1301, two supporting members 1302, and a translucent screen 1303. FIGS. 36A through 36C also illustrate a front seat (refer to a dotted portion) of a vehicle and a projector 1304 with regard to the screen device.

The housing unit 1301 has a slit (not shown) for allowing the viewer to pull out the housing unit 1301. Also, the housing unit 1301 has a spring (not shown) for winding and moving up and down the translucent screen 1303. The above-structured housing unit 1301 is typically fixedly mounted on the rear surface of the front seat so that the slit is oriented downward.

Each of the supporting members 1302 is typically a metal rod, and has a length that is at least longer than the side length of the translucent screen 1303. These supporting members 1302 are mounted on positions near both ends of the slit of the housing unit 1301. Also, each of the supporting members 1302 rotates at angles in a predetermined range by a rotating mechanism (not shown) mounted on the housing unit 1301. Here, the predetermined range is from approximately an angle that is formed when the supporting members 1302 are along the rear surface of the front seat to approximately an angle that is formed when the supporting members 1302 are horizontal to each other. Also, the supporting members 1302 stay still at a position in their predetermined moving range by a locking mechanism (not shown) mounted on the housing unit 130.

The translucent screen 1303 allows light to pass therethrough, thereby displaying images thereon that are projected by the projector 1304. The translucent screen 1303 is made of a deformable material.

The operation of the above-structured screen device is described above. Prior to operation, as illustrated in FIG. 36A, the supporting members 1302 stand still along the rear surface of the front seat. Also, the translucent screen 1303 is wound up for accommodation.

In order to view images, the viewer pulls up the supporting members 1302 as illustrated in FIG. 36B, and causes the supporting members 1302 to stand still at a predetermined position within the predetermined range of rotation. The viewer then pulls the translucent screen 1303 out of the housing unit 1301. Then, as illustrated in FIG. 36C, the viewer fixes the both ends of the lower side of the translucent screen 1303 to the edge of the supporting members 1302 by using hooks (not shown), for example. With this, the viewer can view images. Note that, in the present exemplary modification, the projector is typically mounted on a position near a lower portion of the rear surface of the front seat. After viewing, the translucent screen 1303 is accommodated in the housing unit 1301, and the supporting members 1302 are back to the initial position.

As described above, according to the present exemplary modification, since the translucent screen 1303 is fixed to the supporting members having adequate stiffness, flapping of the translucent screen 1303 due to vibrations of the vehicle and/or the wind can be prevented. Also, since the projector 1304 is mounted on the back of the translucent screen 1303, images of relatively high contrast can be provided even if external ambient light enters between the viewer and the translucent screen 1303. Thus, the screen device can provide images that are easy for the viewer to view.

Also, with the translucent screen 1303 being pulled downward from the housing unit 1301, the visibility of the driver can be prevented from being obstructed when the driver views the back of the vehicle with the room mirror.

Still further, the screen device is provided with a cover as described with reference to FIGS. 35A and 35B. Still further, the supporting members 1302 may be provided with the light shields 105 described in the second embodiment or the light shielding units 205 described in the first exemplary modification.

Still further, in the present exemplary modification, the translucent screen 1303 is fixed to the ends of the supporting members 1302. This is not meant to be restrictive. Alternatively, the translucent screen 1303 may be fixed to the midpoints of the supporting members 1302.

Still further, in the present exemplary modification, the supporting members 1302 may be extendable. Still further, the housing unit 1301 may be mounted inside the front seat.

(Thirteenth Exemplary Modification)

Figure 37A:
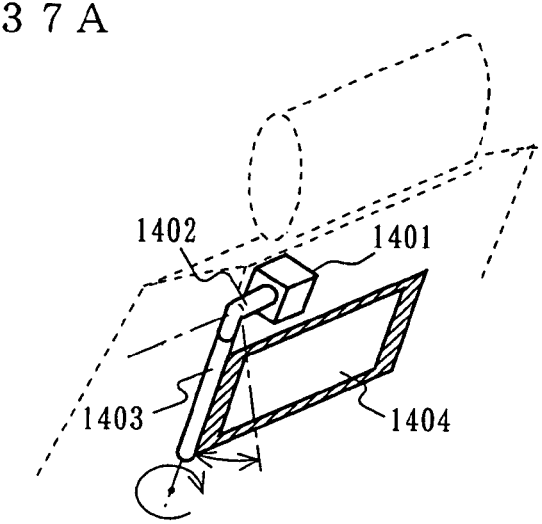
FIGS. 37A through 37C are schematic illustrations showing the structure of a screen device according to a thirteenth exemplary modification of the second embodiment.
Figure 37B:
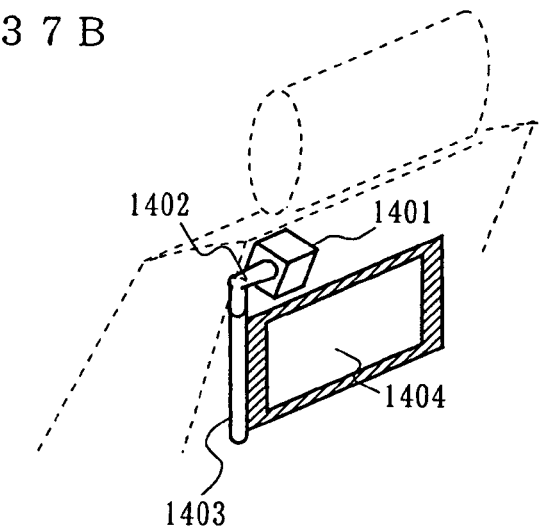
Figure 37C:
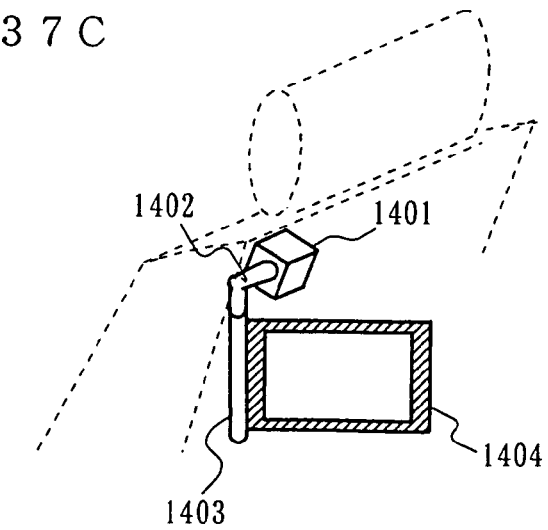

FIGS. 37A through 37C are schematic illustrations showing the structure of a screen device according to a thirteenth exemplary modification of the second embodiment. In FIGS. 37A through 37C, the screen device includes a mounting member 1401, a connecting member 1402, a supporting member 1403, and a screen 1404. FIGS. 37A through 37C also illustrate a front seat (refer to a dotted portion) of a vehicle and a projector (not shown) with regard to the screen device.

The mounting member 1401 is typically structured so as to be mounted on the rear surface of the front seat. The mounting member 1401 further includes a bearing (not shown) for allowing the connecting member 1402 to rotate on a vertical plane.

The connecting member 1402 is typically a member that is formed by two cylindrical members which are jointed so as to form approximately a right angle. The connecting member 1402 has one end received in the bearing of the mounting member 1401 and has a bearing on the other end surface for allowing rotation of the supporting member 1403 about the normal of the other end surface.

The supporting member 1403 is typically a metal rod, and has a length that is slightly longer than the vertical side of the screen 1404. The supporting member 1403 has its end received in the bearing of the connecting member 1402.

The screen 1404 is formed or laminated on aboard-like member having adequate stiffness, and typically has a rectangular shape. The screen 1404 has one vertical side fixed to the supporting member 1403. Images projected by a projector (not shown) are displayed on the screen 1404.

The operation of the above-structured screen device is described below. Prior to operation, as illustrated in FIG. 37A, the screen 1404 stands still at a position so as to make an intimate contact with the rear surface of the front seat.

In order to view images, the viewer grabs the screen 1404 with his or her hand(s) to move the screen 1404 to a desired position. At this time, in accordance with the movement of the viewer's hand(s), the supporting member 1403 rotates on the vertical plane, as illustrated in FIGS. 37A and 37B, and also rotates about the normal of the end surface of the connecting member 1403. In this manner, the viewer positions the screen 1404 so as to view images. Note that, in the present exemplary modification, the projector is typically mounted at a position which is on the ceiling of the vehicle and is above and behind the rear seat. After viewing, the viewer performs an operation in reverse to the operation described above with reference to FIGS. 37A and 37B to bring the screen 1404 back to the position before image viewing.

As described above, according to the present exemplary modification, since the screen 1404 is formed or laminated on the member having adequate stiffness, flapping of the screen 1404 due to vibrations of the vehicle and/or the wind can be prevented.

Also, with the above-described two bearings, the screen 1404 can be oriented to both of the right and left rear seats. For example, when the screen device is mounted on the rear surface of the right front seat, it is also possible to provide images to a viewer sitting in the left rear seat. In this case, the viewer views image from a farther distance, as compared with a case where the screen device is mounted on the rear surface of the left front seat. That is, the viewer focuses on the screen 1404 from a distance for viewing images, which causes less eye strain.

Third Embodiment

Figure 38:
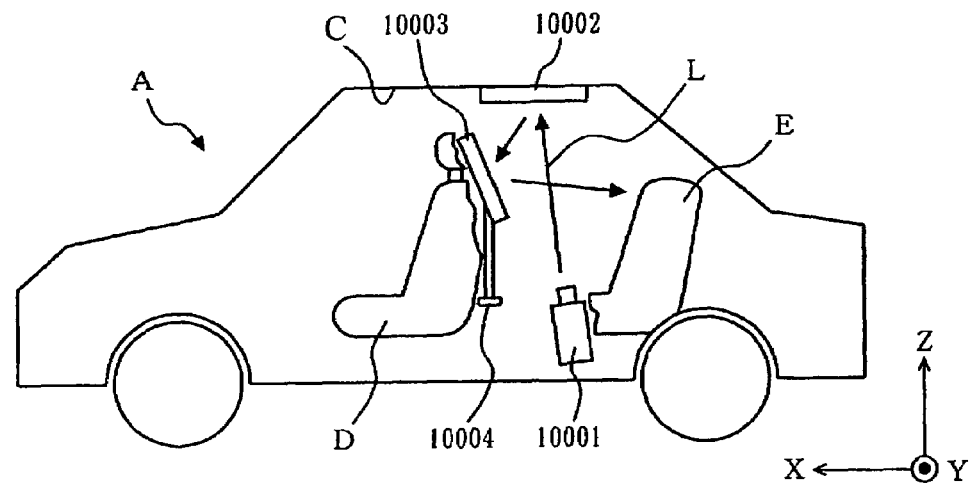
FIG. 38 is a schematic illustration showing the entire configuration of a display system according to a third embodiment of the present invention.
Figure 39:
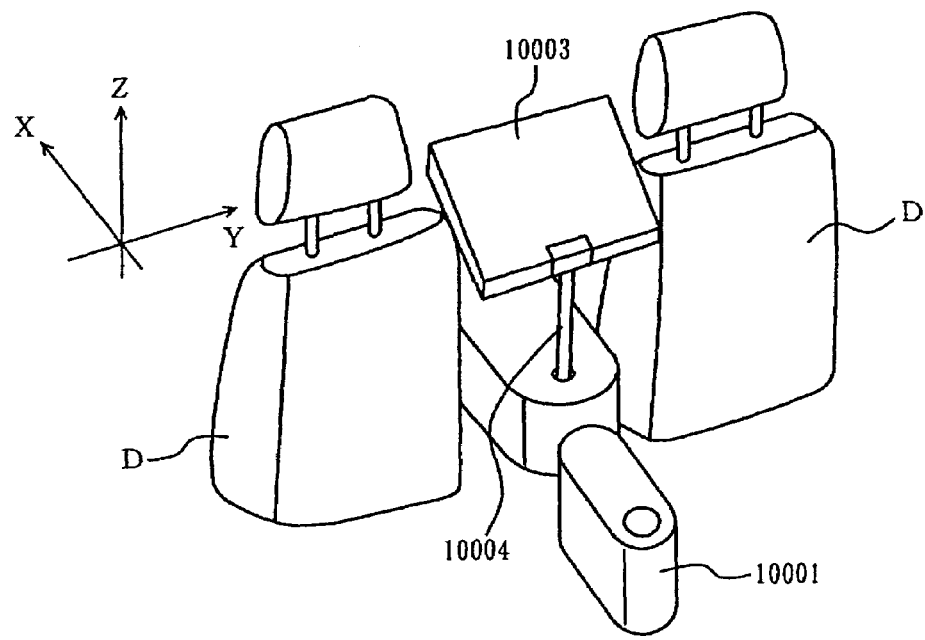
FIG. 39 is a perspective view of a part of the display system illustrated in FIG. 38 when viewed from the left rear angle of a vehicle A.

FIG. 38 is a schematic illustration showing the entire configuration of a display system according to a third embodiment of the present invention. FIG. 39 is a perspective view of a part of the display system illustrated in FIG. 38 when viewed from the left rear angle of a vehicle A. For the sake of convenience of description, each of FIGS. 37 and 38 also shows an orthogonal coordinate system having an X axis, a Y axis, and a Z axis.

In FIGS. 37 and 38, the display system is typically mounted on the vehicle A. In the present embodiment, the vehicle A is not restricted to the types of vehicle described in the first embodiment, but may be any type of vehicle. This display system includes a projector 10001, a screen 10002 (not shown in FIG. 39), a reflecting member 10003, and a supporting member 10004.

The projector 10001 is mounted typically between front seats D and rear seats E on the floor of the vehicle so as to be able to emit a light beam L generated by the projector 10001 toward the screen 10002 mounted on a ceiling C of the vehicle. Also, preferably, the projector 10001 is mounted at a position so as not to obstruct, for example, the movement of passengers of the rear seats E when getting on or off the vehicle A.

The screen 10002 is typically a reflective screen, and is mounted on the ceiling C so as to allow the light beam L emitted from the projector 10001 to enter and to reflect the entire or part of the light beam L toward the reflecting member 10003. In the present embodiment, the screen 10002 is exemplarily mounted on the ceiling C at a position approximately directly above a midpoint between the front seats D and the rear seats E.

The reflecting member 10003 is mounted at a position which is assumed to allow viewers sitting in the rear seats E to easily view the reflecting member 10003. In the present embodiment, the reflecting member 10003 is exemplarily mounted between the two front seats D along the Y axis. The reflecting member 10003 is preferably a half mirror. When the light beam L reflected by the screen 10002 enters the reflecting member 10003 reflects the light beam L toward the viewer. Here, the reason why a half mirror is used as the reflecting member 10003 is that the driver sitting in one of the front seats D has to view behind with his or her own eyes. Note that, if the reflecting member 10003 is mounted at a position so as not to obstruct the driver in checking behind, a total reflection mirror is preferably used as the reflecting member 10003. With this, the viewers sitting in the rear seats E can view high quality images.

The supporting member 10004 is mounted on the vehicle A to rotatably support the reflecting member 10003 for rotation about the three axes of the X, Y, and Z axes, for example. Alternatively, the supporting member 10004 can be structured so as to be able to change the position of the reflecting member 10003 in a three-dimensional space specified by the X, Y, and Z axes. Such a position-changeable structure allows the reflecting member 10003 to stand still at a position so as not to obstruct the driver's view to the rear even if a total reflection mirror is used as the reflecting member 10003.

The operation of the above-structured display system is described below. First, the projector 10001 performs image processing on a first image (video) signal which is indicative of an original image given from a video source (not shown) so as to generate a second image (video) signal which is indicative of an image obtained by rotating the original image around the vertical axis by 180 degrees. Furthermore, based on the second image (video) signal, the projector 10001 generates a light beam L. At the time of generating the light beam L, the projector 10001 changes, as required, the intensity or brightness of the light beam L to be projected therefrom. The projector 10001 then emits the light beam L generated in the above manner from a projection lens included in the projector 10001 toward the screen 10002.

The screen 10002 displays images represented by the light beam L. At this time, the screen 10002 displays images not in a direction of the viewer but in a direction of the reflecting member 10003. That is, the screen 10002 reflects the incident light beam L toward the reflecting member 10003.

The reflecting member 10103 reflects the light beam L entering via the screen 10002 toward the direction of the viewer. That is, through the reflecting member 10003, the viewer views the images generated by the video source (not shown) and displayed on the screen 10002.

As described above, according to the present embodiment, the viewer views virtual images on the reflecting member 10003 to recognize the images generated by the video source. While viewing, the viewer's eyes are focusing not on the reflecting member 10003 but on a point farther away from the reflecting member 10003, which causes less eye strain.

Furthermore, the present display device allows the viewer's eyes to focus on a point located farther, thereby preventing eye strain of the viewer even when images of a large size are displayed on the screen 10002.

Still further, when a half mirror is used as the reflecting member 10003, the driver can view the back of the vehicle with the half mirror even if the reflecting member 10003 is large. Therefore, the display system according to the present embodiment can provide images of a larger size to the viewer.

In the present embodiment, the projector 10001 is exemplarily mounted between the front seats D and the rear seats E on the floor of the vehicle. This is not meant to be restrictive. Alternatively, the projector 10001 may be mounted inside the armrest positioned between the two rear seats E along the Y axis. Still alternatively, the projector 10001 may be mounted anywhere between those rear seats E or inside either one of the rear seats E. When the projector 10001 is mounted inside the arm rest or the rear seats E, for the purpose of protecting the projection lens of the projector 10001, a protective cover is preferably provided so as to cover an optical path of the light beam L when the projector 10001 is not in use.

Also, in the present embodiment, the screen 10002 displays an image based on the light beam L that is emitted from the projector 10001. This is not meant to be restrictive. Alternatively, a display device, such as a liquid crystal display, may be provided at the same position of the screen 10002.

Furthermore, in the present embodiment, the reflecting member 10003 is supported by the supporting member 10004 extending from the floor side of the vehicle A. This is not meant to be restrictive. Alternatively, the supporting member 10004 may be extended from the ceiling C to the floor of the vehicle A to support the reflecting member 10003 at its end portion.

Still further, in the present embodiment, the projector 10001, the screen 10002, and the reflecting member 10003 are arranged along the vertical center plane of the vehicle A based on the assumption of viewers sitting in the two rear seats E. Alternatively, these components may be arranged on a right or left side with respect to the vertical center plane based on the assumption of only a viewer sitting in either one of the right and left rear seats E.

Still further, in the present embodiment, the display system includes one projector 10001, one screen 10002, and one reflecting member 10003. This is not meant to be restrictive. Alternatively, the number of sets of the projector 10001, the screen 10002, and the reflecting member 10003 can be two or more depending on the number of rear seats E.

Figure 40:
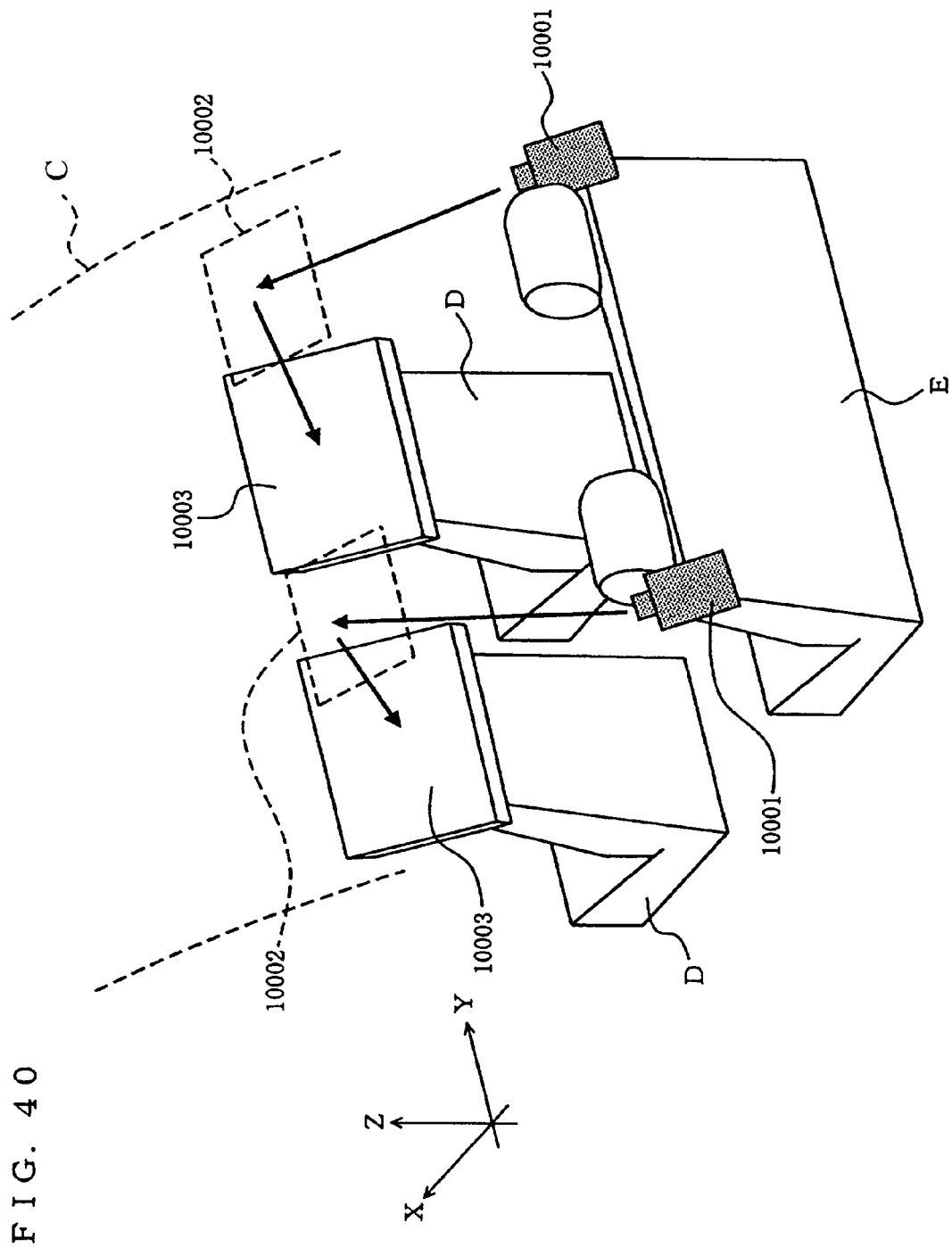
FIGS. 40 through 42 are schematic illustrations showing other exemplary structures of the display system illustrated in FIG. 38.
Figure 41:
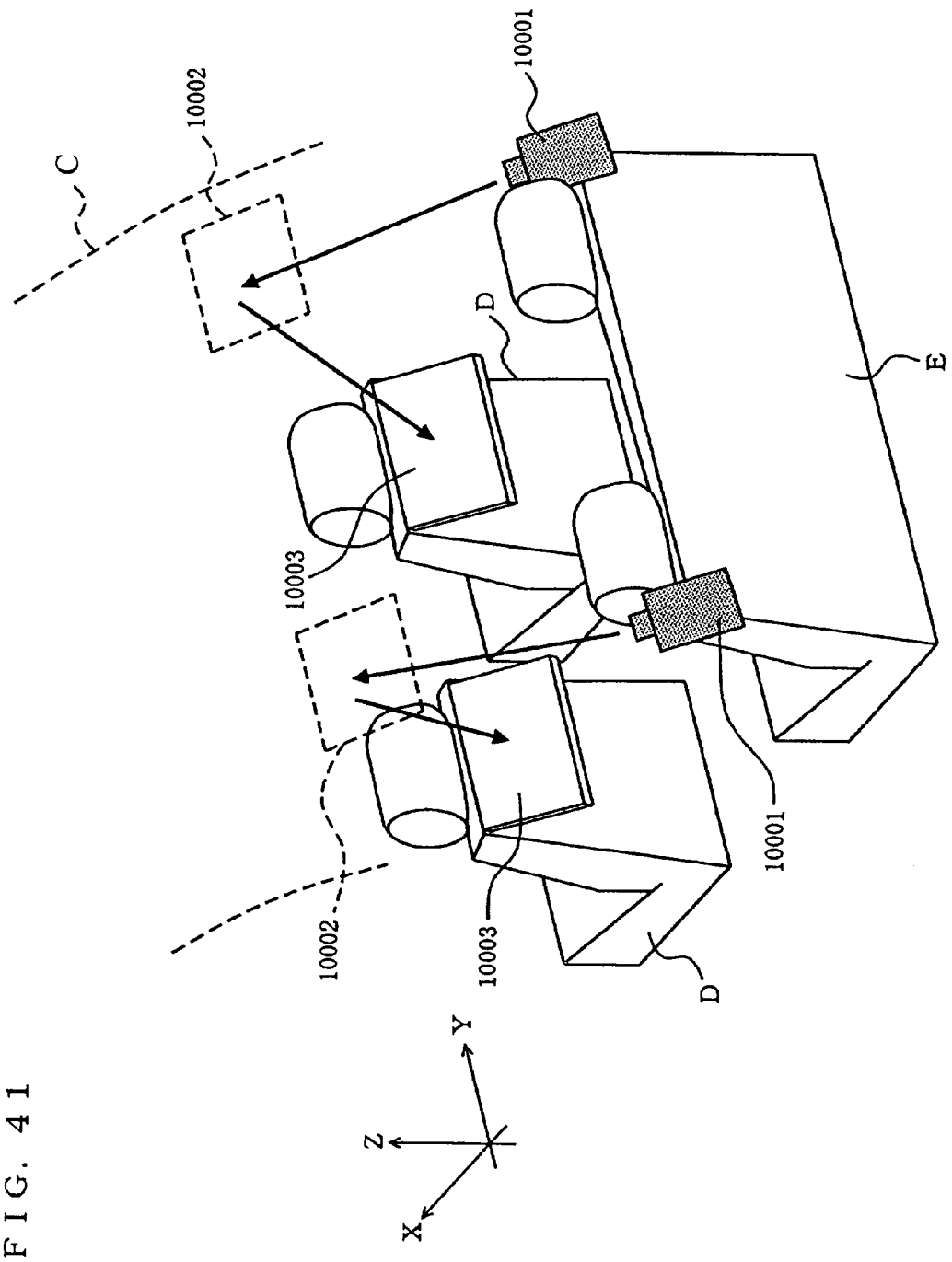
Figure 42:
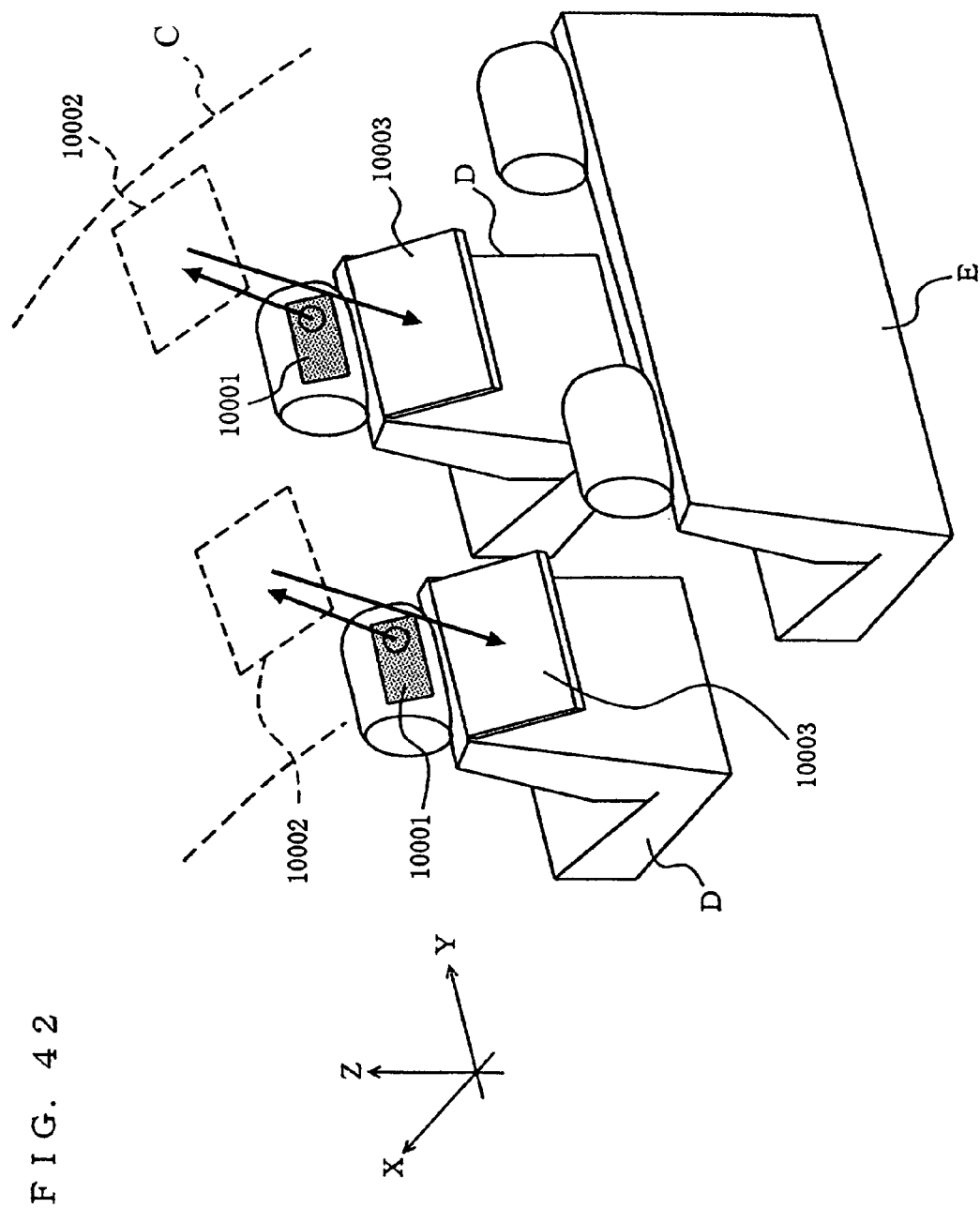

For example, as illustrated in FIGS. 40 through 42, the display system may include a first projector 10001, a first screen 10002, a first reflecting member 10003 for the left rear seat E, and a second projector 10001, a second screen 10002, a second reflecting member 10003 for the right rear seat E.

In FIGS. 40 through 42, the first projector 10001 is mounted near the head rest of the left rear seat E (refer to FIGS. 40 and 41) or on the head rest of a left front seat D (refer to FIG. 42). Also, the second projector 10001 is mounted near the head rest of the right rear seat E (refer to FIGS. 40 and 41) or on the head rest of a right front seat D (refer to FIG. 42).

The first screen 10002 is exemplarily mounted on the ceiling C on a left side of a portion directly above a midpoint between the front seats D and the rear seats E. Also, the second screen 10002 is exemplarily mounted on the ceiling C on a right side of a portion directly above the midpoint.

The first reflecting member 10003 is mounted on the head rest (refer to FIG. 40) or the back surface of the back rest (FIG. 41) of the left front seat D. Also, the second reflecting member 10003 is mounted on the head rest (refer to FIG. 40) or the back surface of the back rest (FIG. 41) of the right front seat D. If space allows, the first and second reflecting members 10003 are preferably accommodated inside the relevant head rest or the relevant back rest when image viewing is not performed, and are taken out at the time of image viewing. Also, since being mounted on the above-described positions, these reflecting members 10003 do not obstruct the entire or almost the entire driver's rear visibility. Therefore, these reflecting members 10003 are preferably implemented by total reflection mirrors.

(First Exemplary Modification)

Figure 43:
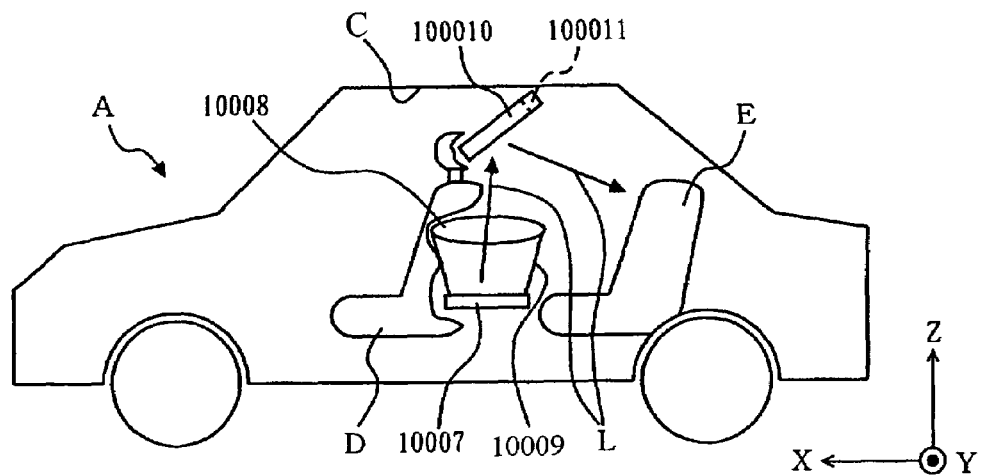
FIG. 43 is a schematic illustration showing the structure of a display system according to a first exemplary modification of the third embodiment.
Figure 44:
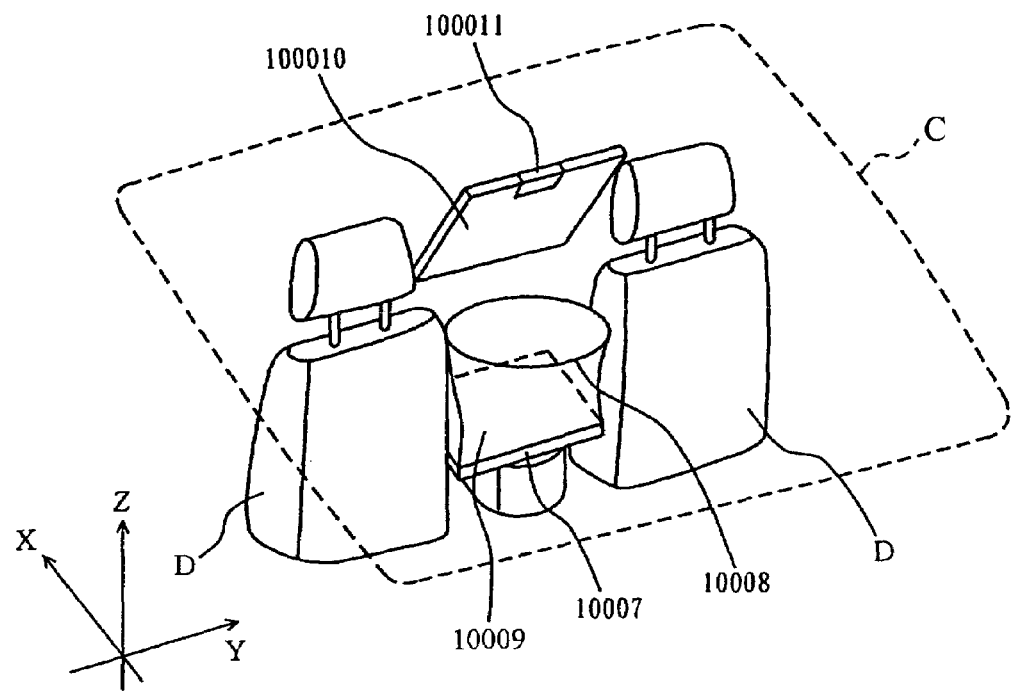
FIG. 44 is a perspective view of the display system illustrated in FIG. 43 when viewed from the left rear angle of the vehicle A.

FIG. 43 is a schematic illustration showing the structure of a display system according to a first exemplary modification of the third embodiment. FIG. 44 is a perspective view of the display system when viewed from the left rear angle of the vehicle A. As with the third embodiment, each of these drawings also shows an orthogonal coordinate system for the sake of convenience of description.

In FIGS. 43 and 44, the display system includes a display device 10007, a lens 10008, a first supporting member 10009, a reflecting member 100010, and a second supporting member 100011.

The display device 10007 is mounted between two front seats D aligned along the Y axis and on a floor side of the vehicle. The display device 10007 mounted as described above is typically a liquid crystal display device for displaying an image based on an image (video) signal that is fed by a video source (not shown). With this, the display device 10007 emits a light beam L representing an image.

The lens 10008 is typically a Fresnel lens for diverging the light beam L emitted by the display device 10007 to form an image on the reflecting member 100010. The lens 10008 is mounted on the upper end of the first supporting member 10009 fixed to the perimeter of an image display surface of the display device 10007. The lens 10008 is preferably mounted at a height so as not to obstruct the rear visibility of the driver sitting in the front seat D. For example, the lens 10008 is mounted at a height lower than the upper end of a back rest of the front seat D.

The first supporting member 10009 is made of a material having adequate stiffness, and extends to a predetermined height approximately in the Z axis direction from the perimeter of the display surface of the display unit 10007. Here, the first supporting member 10009 is mounted so as not to cross an optical path from the display device 10007 to the lens 10008. The lens 10008 is fixed to the upper end of the above-structured first supporting member 10009. Other than the above-described structure and function, in the present exemplary modification, the first supporting member 10009 can serve as a cover for covering the optical path of the light beam L from the display device 10007 to the lens 10008. With this, the light beam L emitted by the display unit 10007 can be protected from external ambient light.

The reflecting member 100010 is typically implemented by a half mirror, and is mounted at a position which allows viewers sitting in rear seats E to easily view images. By way of example, in the present exemplary modification, the reflecting member 100010 is rotatably mounted on a ceiling C of the vehicle at a position directly above a midpoint between the front seats D and the rear seat E via the second supporting member 100011 for rotation about the Y axis. When the light beam L diverged by the lens 10008 enters, the reflecting member 100010 reflects the incident light beam L toward the viewers sitting in the rear seats E. Here, the reason why a half mirror is used as the reflecting member 100010 is that the driver has to view behind with his or her own eyes. Note that if the reflecting member 100010 is mounted at a position so as not to obstruct the driver in checking behind, a total reflection mirror is preferably used as the reflecting member 100010. With this, the viewers sitting in the rear seats E can view high quality images.

The second supporting member 100011 is mounted on the ceiling C of the vehicle A and rotatably supports the reflecting member 100010 about the Y axis, for example. The second supporting member 100011 may be structured so as to change the orientation of a reflection surface of the reflecting member 100010 in a three-dimensional space specified by the X, Y and Z axes. Such a position-changeable structure allows the reflecting member 100010 to stand still at a position so as not to obstruct the driver's view to the rear even if a total reflection mirror is used as the reflecting member 100010.

The operation of the above-structured display system is described below. First, the display device 10007 performs image processing on a first image signal which is indicative of an original image (video) given from a video source (not shown) so as to generate a second image (video) signal which is indicative of an image obtained by rotating the original image around the vertical axis by 180 degrees. Furthermore, based on the second image (video) signal, the display device 10007 displays an image, thereby emitting a light beam L representing the image. At the time of displaying the image, the display unit 10007 changes, as required, the brightness or luminance of the display image. The light beam L emitted in the above manner is propagated through an optical path in the first supporting member 10009 to enter the lens 10008.

The lens 10008 diverges the incident light beam L to form an image on the reflecting member 100010. When the light beam L diverged by the lens 10008 enters, the reflecting member 100010 reflects the incident light beam L toward the viewers sitting in the rear seats E.

As described above, also in the present exemplary modification, the viewer views virtual images reflected on the reflecting member 100010. This causes less eye strain for the viewers.

Figure 45A:
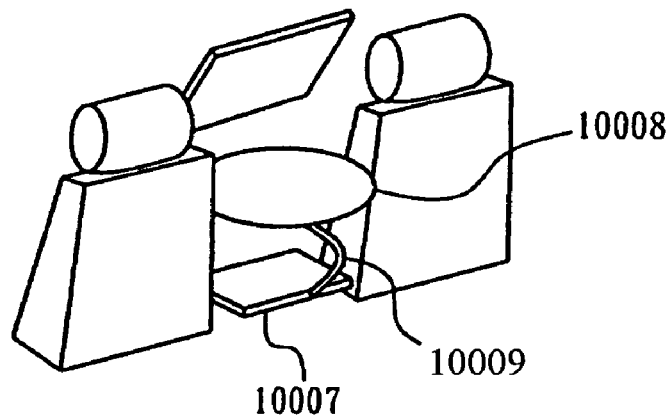
FIGS. 45A and 45B are schematic illustrations showing other exemplary structures of the display system illustrated in FIG. 43.
Figure 45B:
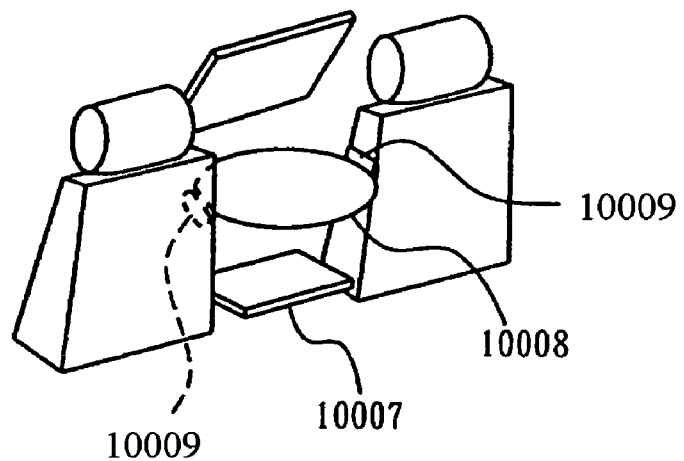

The first supporting member 10009 is not restricted to those illustrated in FIGS. 43 and 44, but may be those illustrated in FIGS. 45A and 45B. In FIG. 45, the first supporting member 100010 is a stick-like member having adequate stiffness for connecting the display device 10007 and the lens 10008 together. Also, preferably, in view of securing the optical path of the light beam L, the first supporting member 10009 is formed so as to have an appropriate shape. Still further, in FIG. 45B, the first supporting member 10009 is attached to the inside surfaces of each of the two front seats D aligned in the Y axis to support the lens 10008. The lens 10008 may be supported by a seat-fixed-type supporting units 11b attached to the side surfaces of the driver's seat and the passenger's seat.

Also, in the present exemplary modification, the display device 10007 is mounted between the two front seats D. This is not meant to be restrictive. Alternatively, the display device 10007 can be mounted anywhere in the vehicle A where appropriate.

Furthermore, in the present exemplary modification, the display device 10007, the lens 10008, and the reflecting member 100010 are arranged along the vertical center plane of the vehicle A based on the assumption of viewers sitting in the two rear seats E. Alternatively, these components may be arranged on a right or left side with respect to the vertical center plane based on the assumption of only a viewer sitting in either one of the right and left rear seats E.

Still further, in the present exemplary modification, the display device 10007 is placed on a floor side of the vehicle while the reflecting member 100010 is placed on a side of the ceiling C. This is not meant to be restrictive. Alternatively, the display device 10007 can be placed on the side of the ceiling C while the reflecting member 100010 is placed on the floor side.

Still further, in the present exemplary modification, the reflecting member 100010 is implemented by a half mirror or a total reflection mirror. This is not meant to be restrictive. Alternatively, the reflecting member 100010 may be a generally-known light-control mirror. The light-control mirror is externally given an electric impulse to change the transmittance of a visible light beam. More specifically, the reflecting member 100010 is provided with a control circuit (not shown) for adjusting the transmittance of a visible light beam. Based on an output signal from an optical sensor (not shown) for detecting brightness of the surrounding or the reflection surface, the control circuit generates a control signal for controlling the transmittance of a visible light beam, and feeds the generated control signal to the light-control mirror. With this, the display system can provide images of appropriate brightness to the viewer. Note that, the light-control mirror can be applied to the third embodiment.

The control circuit may control the transmittance of a visible light beam at the light-control mirror depending on the type of images currently being displayed. Alternatively, the control circuit may determine whether or not the vehicle A is traveling. If the driver of the vehicle A is in a situation where he or she is not required to view behind him or her, the control circuit may control the transmittance of a visible light beam at the light-control mirror so that the transmittance is substantially zero. Furthermore, the control circuit may control the above transmittance depending on the preferences of the viewer(s) sitting in the rear seat(s) E.

Still further, instead of the light-control mirror, the reflecting member 100010 may be implemented by a plurality of mirrors having different transmittances of a visible light beam. In this case, a switching mechanism for automatically selecting an appropriate mirror depending on the brightness of the surrounding or the reflection surface, or the type of the images has to be provided near the reflecting member 100010.

(Second Exemplary Modification)

Figure 46:
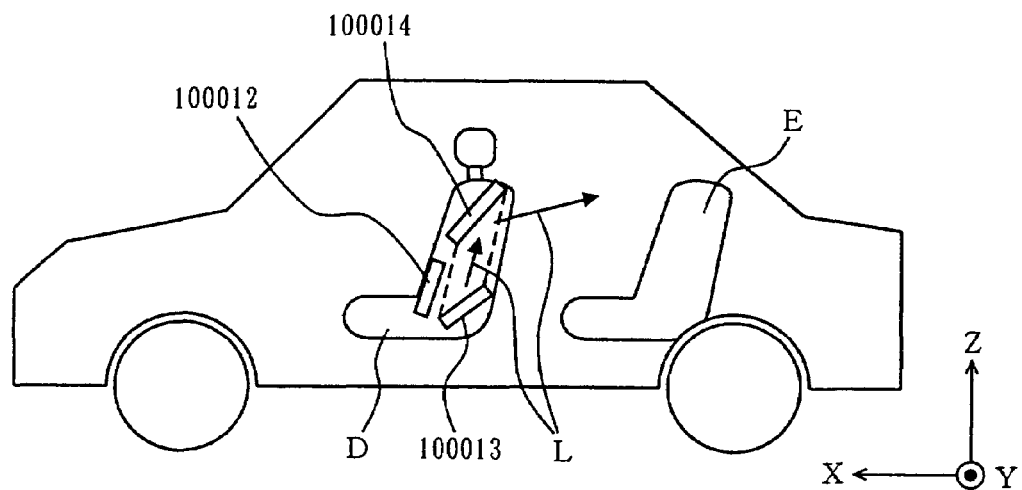
FIG. 46 is a schematic illustration showing the structure of a display system according to a second exemplary modification of the third embodiment.
Figure 47:
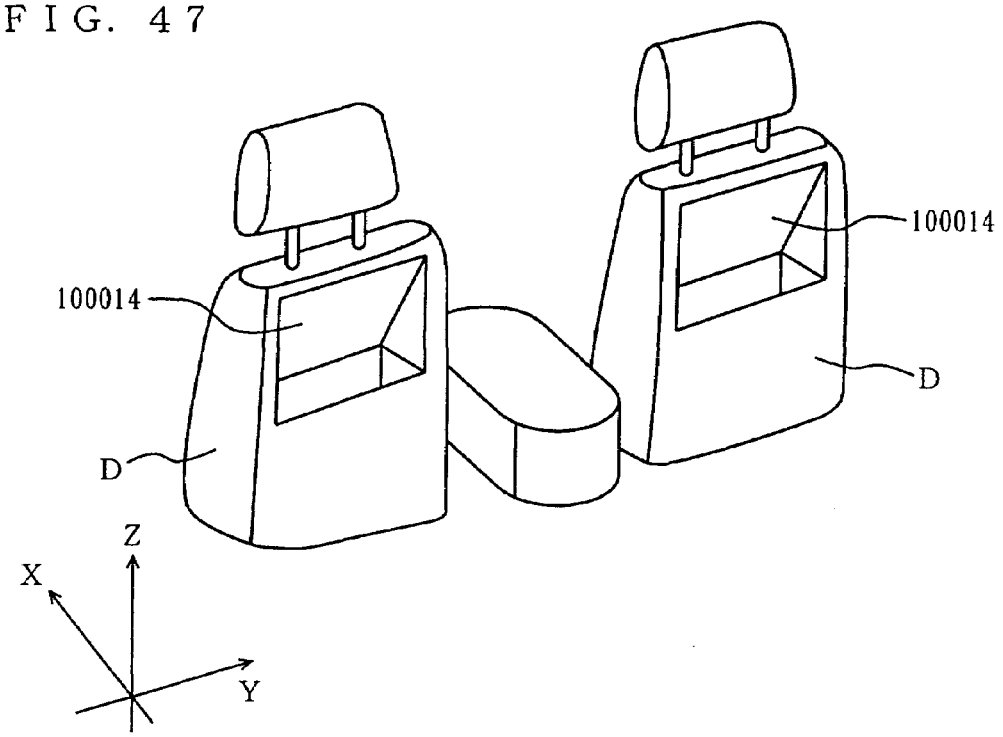
FIG. 47 is a perspective view of the display system illustrated in FIG. 46 when viewed from the left rear angle of the vehicle A.

FIG. 46 is a schematic illustration showing the structure of a display system according to a second exemplary modification of the third embodiment. FIG. 47 is a perspective view of the present display system when viewed from the left rear angle of the vehicle A. As with the third embodiment, each of these drawings also shows an orthogonal coordinate system for the sake of convenience of description.

In FIGS. 46 and 47, the display system is mounted for each of the front seats D of the vehicle A, including a display device 100012, a first reflecting member 100013, and a second reflecting member 100014.

Each of the display devices 100012 is mounted inside the relevant front seat D for displaying an image based on an image (video) signal that is fed from a video source (not shown). With this, the display device 100012 emits a light beam L representing an image to a predetermined direction.

Each of the first reflecting members 100013 is preferably implemented by a total reflection mirror, and is mounted at a position so as to be able to reflect the light beam L emitted from the display device 100012 mounted on the relevant front seat D to the relevant second reflecting member 100014.

Each of the second reflecting members 100014 is preferably implemented by a total reflection mirror, and is mounted at a position so as to be able to reflect the light beam L reflected by the relevant first reflecting member 100013 to a viewer sitting in a rear seat E.

The operation of the above-structure display system is described below. First, the display device 100012 performs necessary image processing on the video signal fed from the video source (not shown) for displaying an image represented by the video signal. Consequently, the light beam L representing the image is emitted from the display device 100012. When the light beam L emitted by the display device 100012 at the previous stage enters, the first reflecting member 100013 reflects the incident light beam L toward the second reflecting member 100014. When the light beam L from the first reflecting member 100013 at the previous stage enters, the second reflecting member 100014 reflects the incident light beam L toward the viewer sitting in the rear seat E. With this, the viewer sitting in the rear seat E can view images generated by the video source (not shown) through the second reflecting member 100014.

As described above, in the present exemplary modification, the viewer views virtual images on the second reflecting member 100014 to recognize the images generated by the video source. While viewing, the viewer's eyes are focusing not on a point farther away from the second reflecting member 100014, which causes less eye strain. Also, in the present exemplary modification, by increasing the number of reflections, the focal point of the viewer can be moved still farther. This causes less eye strain of the viewer when viewing images of a large size.

Still further, if the optical path from the display device 100012 to the second reflecting member 100014 cannot be secured, the first reflecting member 100013 and/or the second reflecting member 100014 may be mounted so as to be located outside the front seat D.

(Third Exemplary Modification)

Figure 48:
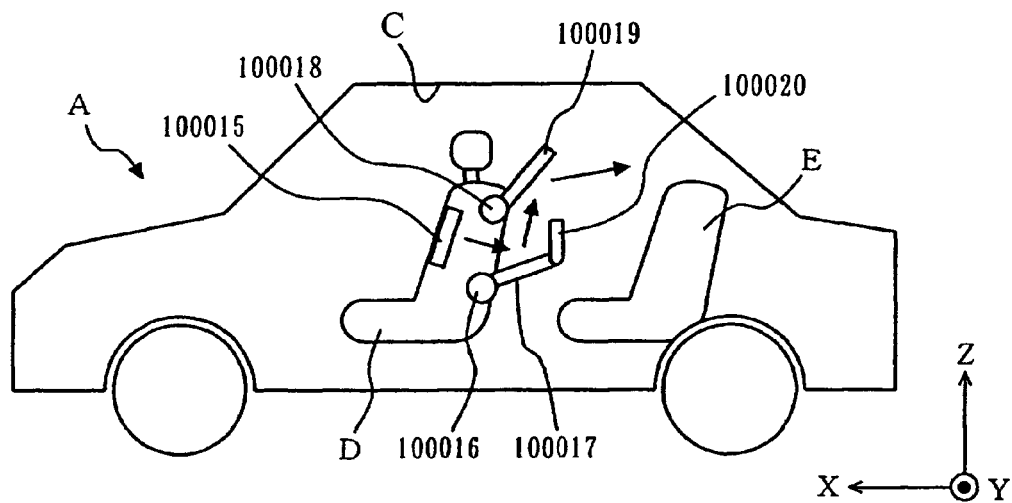
FIG. 48 is a schematic illustration showing the structure of a display system according to a third exemplary modification of the third embodiment.
Figure 49:
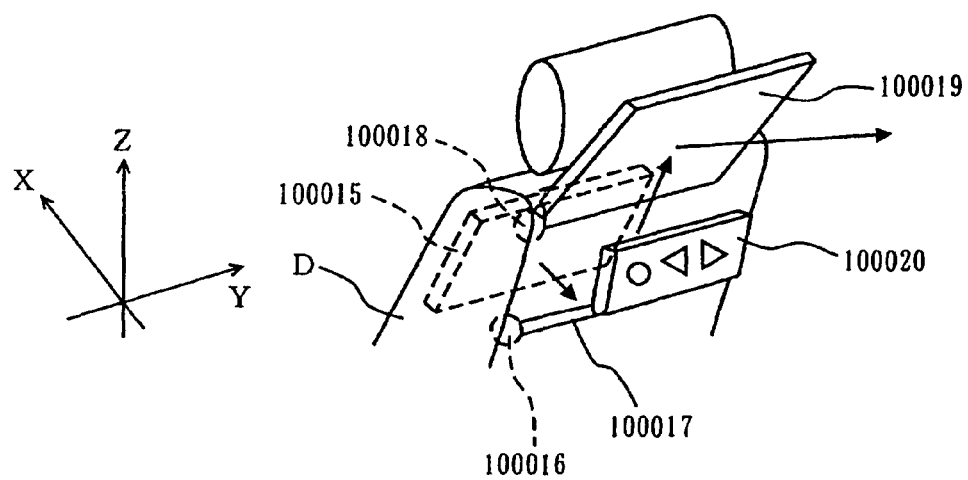
FIG. 49 is a perspective view of the display system illustrated in FIG. 48 when viewed from the left rear angle of the front seat of the vehicle A.

FIG. 48 is a schematic illustration showing the structure of a display system according to a third exemplary modification of the third embodiment. FIG. 49 is a perspective view of the present display system when viewed from the left rear angle of the front seat D of the vehicle A. As with the third embodiment, each of these drawings also shows an orthogonal coordinate system for the sake of convenience of description.

In FIGS. 48 and 49, the display system is preferably mounted for each of the front seats D of the vehicle A, including a display device 100015, a first supporting member 100016, a first reflecting member 100017, a second supporting member 100018, a second reflecting member 100019, and an operation panel 100020.

Each of the display devices 100015 is similar to each of the display devices 100012, and is therefore not described in detail herein.

Each of the first supporting members 100016 is mounted on the rear surface of the backrest of the relevant front seat D or slightly inside of the back rest from the rear surface, typically supporting the relevant first reflecting member 100017 about the Y axis. Alternatively, the first supporting member 100016 can support the first reflecting member 100017 so as to be able to change the position of the first reflecting member 100017 in a three-dimensional space specified by the X, Y, and Z axes.

The first reflecting member 100017 is supported by the first supporting member 100016. With this, the first reflecting member 100017 can be supported so as to be changed in position within the space that is limited by the movable range of the first supporting member 100016. The first reflecting member 100017 is preferably implemented by a total reflection mirror for reflecting the light beam L emitted from the display device 1000015 mounted on the relevant front seat D toward the relevant second reflecting member 100019.

The second supporting member 100018 is mounted at a position which is on the rear surface of the back rest of the relevant front seat D or slightly inside of the back rest from the rear surface, and is located closer to a side of the ceiling C than the first supporting member 100016. Typically, the second supporting member 100018 supports the relevant second reflecting member 100019 about the Y-axis. Alternatively, the second supporting member 100018 may support the second reflecting member 100019 so as to change the position of the second reflecting member 100019 in a three-dimensional space specified by the X, Y, and Z axes.

The second reflecting member 10019 is supported by the second supporting member 100018. With this, the second reflecting member 100019 can be supported so as to be changed in position within the space that is limited by the movable range of the second supporting member 100018. The second reflecting member 100019 is preferably implemented by a total reflection mirror for reflecting the light beam L reflected by the first reflecting member 100017 toward the relevant rear seat E of the vehicle A.

The operation panel 100020 protrudes from the upper end of the first reflecting member 100017 preferably to the positive direction of the X axis (i.e., to the rear seat E). The operation panel 100020 is provided with an input unit placed on a surface opposite to the rear seat E for performing various settings on the display device 100015. In the operation panel 100020, the surface opposite to the rear seat E is formed with a non-translucent material prohibiting the viewer sitting in the rear seat E from directly viewing a display device 100015.

The operation of the above-structured display system is described below. First, the display device 100015 performs necessary image processing on the video signal fed from the video source (not shown) for displaying an image represented by the video signal. Consequently, the light beam L representing the image is emitted from the display device 100015. When the light beam L emitted by the display device 100015 at the previous stage enters, the first reflecting member 100017 reflects the incident light beam L toward the second reflecting member 100019. When the light beam L from the first reflecting member 100017 at the previous stage enters, the second reflecting member 100019 reflects the incident light beam L toward the viewer sitting in the rear seat E. With this, the viewer sitting in the rear seat E can view images generated by the video source (not shown) through the first and second reflecting members 100017 and 100019.

Also, when the viewer cannot view images appropriately, the viewer changes the orientation or the position of the first reflecting member 100017 and/or the second reflecting member 100019 with his/her hand. Furthermore, the viewer operates the operation panel 100020 to control the brightness or color tone of the images from the display device 100015.

As described above, as with the second exemplary modification, the viewer views virtual images on the second reflecting member 100019 in the present exemplary modification. This causes less eye strain. Also, in the present exemplary modification, increasing the number of reflections of the light beam L causes less eye strain of the viewer when viewing images of a large size.

Still further, in the present exemplary modification, the front seat D preferably has a first space formed therein for accommodating the first reflecting member 100017 and a second space for accommodating the second reflecting member 000019. Also, the first supporting member 100016 has a movable range to allow the first reflecting member 100017 to be accommodated in the first space, and the second supporting member 100018 has a movable range to allow the second reflecting member 100019 to be accommodated in the second space. Therefore, when the viewer does not view images, the first and second reflecting members 100017 and 100019 can be accommodated in the front seat D. With this, it is possible to provide a practical display system which does not obstruct the movement of the viewer(s) sitting in the rear seat(s) E.

Also, the front seat D generally has a reclining mechanism. Therefore, the light beam L emitted from the display device 100015 changes in accordance with the tilt of the back rest of the front seat D. Therefore, a eye position and/or an orientation of a viewer's line of sight which is assumed to allow the viewer to easily view images is predefined. The eye position and/or the orientation of the viewer's line of sight is stored in a control circuit (not shown). Preferably, the control circuit obtains the current tilt of the back rest of the front seat D with an angle sensor typified by a rotary encoder and then, in accordance with the obtained tilt, matches the direction to which the second reflecting member 100019 reflects the light beam L with the eye position and/or the orientation of the viewer's line of sight stored in advance.

(Fourth Exemplary Modification)

Figure 50:
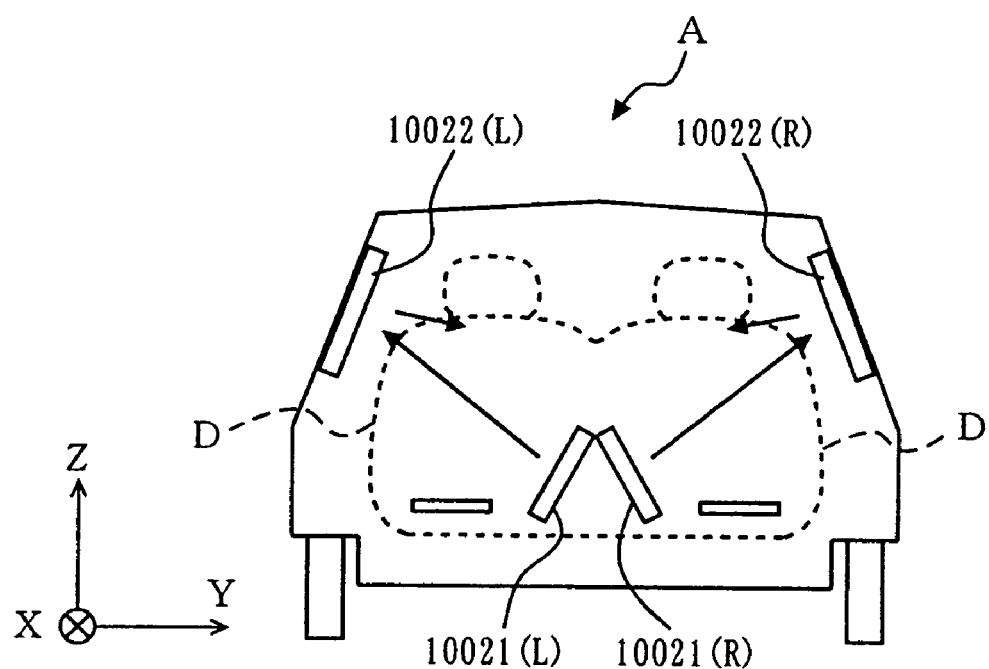
FIG. 50 is a schematic illustration showing the structure of a display system according to a fourth exemplary modification of the third embodiment.

FIG. 50 is a schematic illustration showing the structure of a display system according to a fourth exemplary modification of the third embodiment when viewed from behind the vehicle A. As with the third embodiment, FIG. 50 also shows an orthogonal coordinate system for the sake of convenience of description.

In FIG. 50, the display system is mounted preferably on the rear seat D (refer to a dotted portion) of the vehicle A, and includes display devices 10021 and reflecting members 10022.

The display devices 10021 are mounted at approximately a midpoint between the two rear seats D aligned along the Y axis. One display device 10021 for the left rear seat D (hereinafter referred to as display device 10021L) displays an image based on a video signal that is fed from the a video source (not shown). With this, the display device 10021L emits a light beam L representing the image from its mounting position toward one reflecting member 10022 mounted on a window for the left rear seat of the vehicle A (hereinafter referred to as reflecting member 10022L). On the other hand, the other display device 10021 for the right rear seat D (hereinafter referred to as display device 10021R) is mounted at a position that is symmetrical to that of the display device 10021L with respect to the vertical center plane of the vehicle A, and emits a light beam L in a manner similar to the display device 10021L.

Each of the reflecting members 10022 are implemented by light-control mirrors mounted on the windows for the rear seats. The light-control mirrors are as those that have been described above. The reflecting member 10022L reflects the entire or part of the light beam L emitted by the display device 10021L to the viewer sitting in the left rear seat D. The other reflecting member 10022 mounted on the window for the right rear seat (here in after referred to as reflecting member 10022R) is mounted at a position that is symmetrical to that of the display device 10021R with respect to the vertical center plane of the vehicle A, and reflects the entire or part of the light beam L emitted by the display device 10021R to the viewer sitting in the right rear seat D.

With the above-described structure, according to the present exemplary modification, the viewer can view virtual images reflected on the relevant reflecting member 10022 to recognize images generated by the video source. This causes less eye strain.

The display devices 10021 may be mounted on the ceiling C. In this case, each of the display devices 10021 may emit the light beam L directly toward the relevant reflecting member 10022. Alternatively, each of the display devices 10021 may emit the light beam L via a total reflection mirror mounted on the vehicle A toward the relevant reflecting member 10022.

Furthermore, the display systems according to the third embodiment and its exemplary modifications described above may be applied to a case of displaying videos representing the state of an open-air zoo park or a marine park. In this case, it is preferable, in view of an entertainment aspect for the rear seat D, that a virtual position in such a zoo park or a marine park be controlled to be changed in accordance with the position, orientation, and the speed of the vehicle A.

(Fifth Exemplary Modification)

Figure 51:
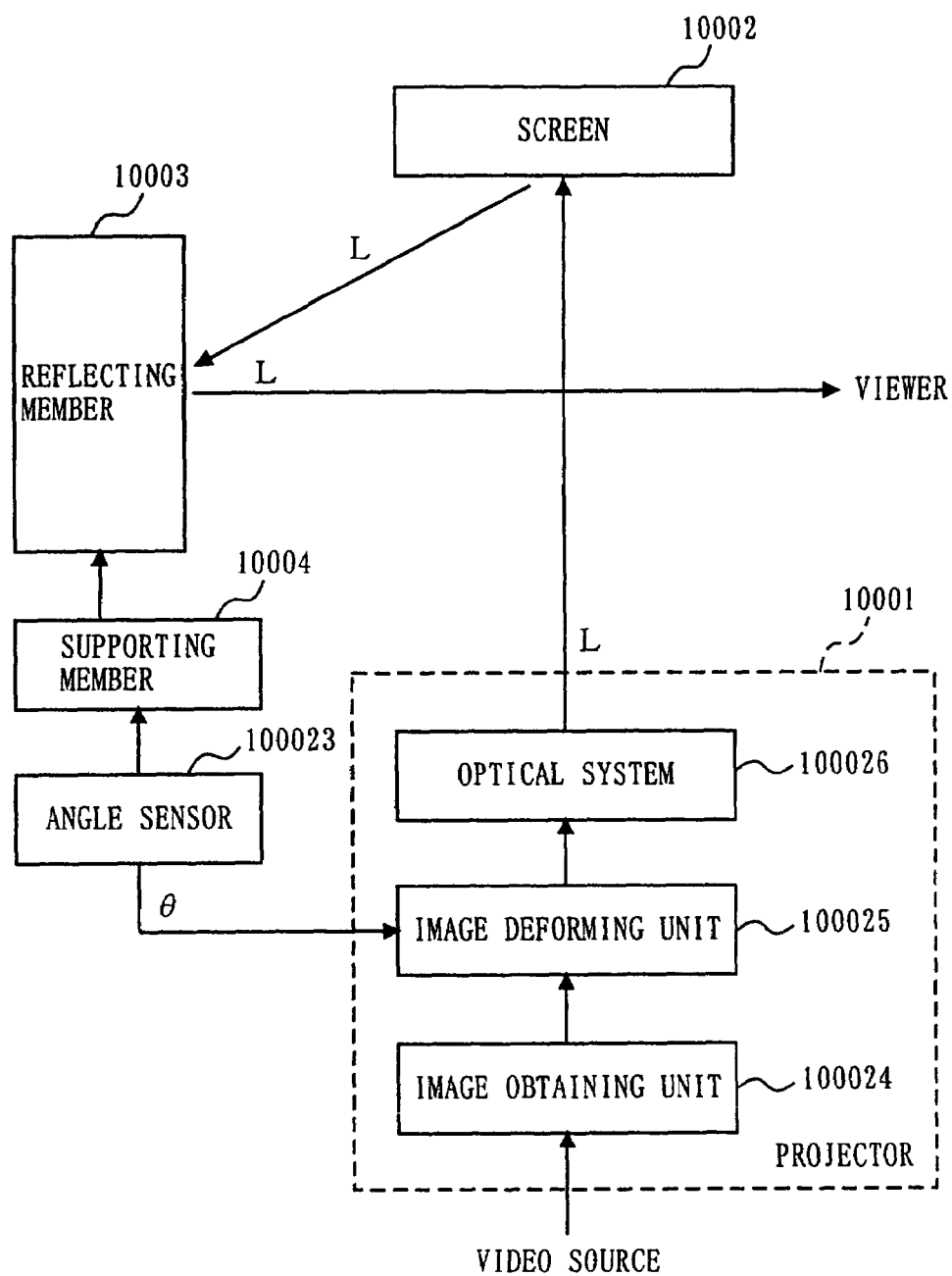
FIG. 51 is a block diagram illustrating the structure of a display system according to a fifth exemplary modification of the third embodiment.

FIG. 51 is a block diagram illustrating the structure of a display system according to a fifth exemplary modification of the third embodiment. The display system in FIG. 51 is similar to those in FIGS. 38 and 39 except that an angle sensor 100023 is further provided and that the projector 10001 performs an image deforming process. Therefore, in FIG. 51, components corresponding to those illustrated in FIGS. 38 and 39 are provided with the same reference numerals, and are not described herein.

The angle sensor 100023 is implemented by a rotary encoder, for example, for detecting a rotation angle θ formed by the reflecting member 10003 which can rotate around the Y axis, for example, with respect to a predetermined reference position.

In order to project images subjected to a deforming process, the projector 10001 includes an image obtaining unit 100024, an image deforming unit 100025, and an optical system 100026. The image obtaining unit 100024 obtains, from a video source (not shown), an image signal representing an image to be projected. Based on the angle θ detected by the angle sensor 100023, the image deforming unit 100025 deforms the image represented by the image signal which is obtained by the image obtaining unit 100024. The optical system 100026 generates a light beam L based on an image signal representing the image which his deformed by the image deforming unit 100025, and then projects the generated light beam L toward the reflecting member 10003.

Figure 52:
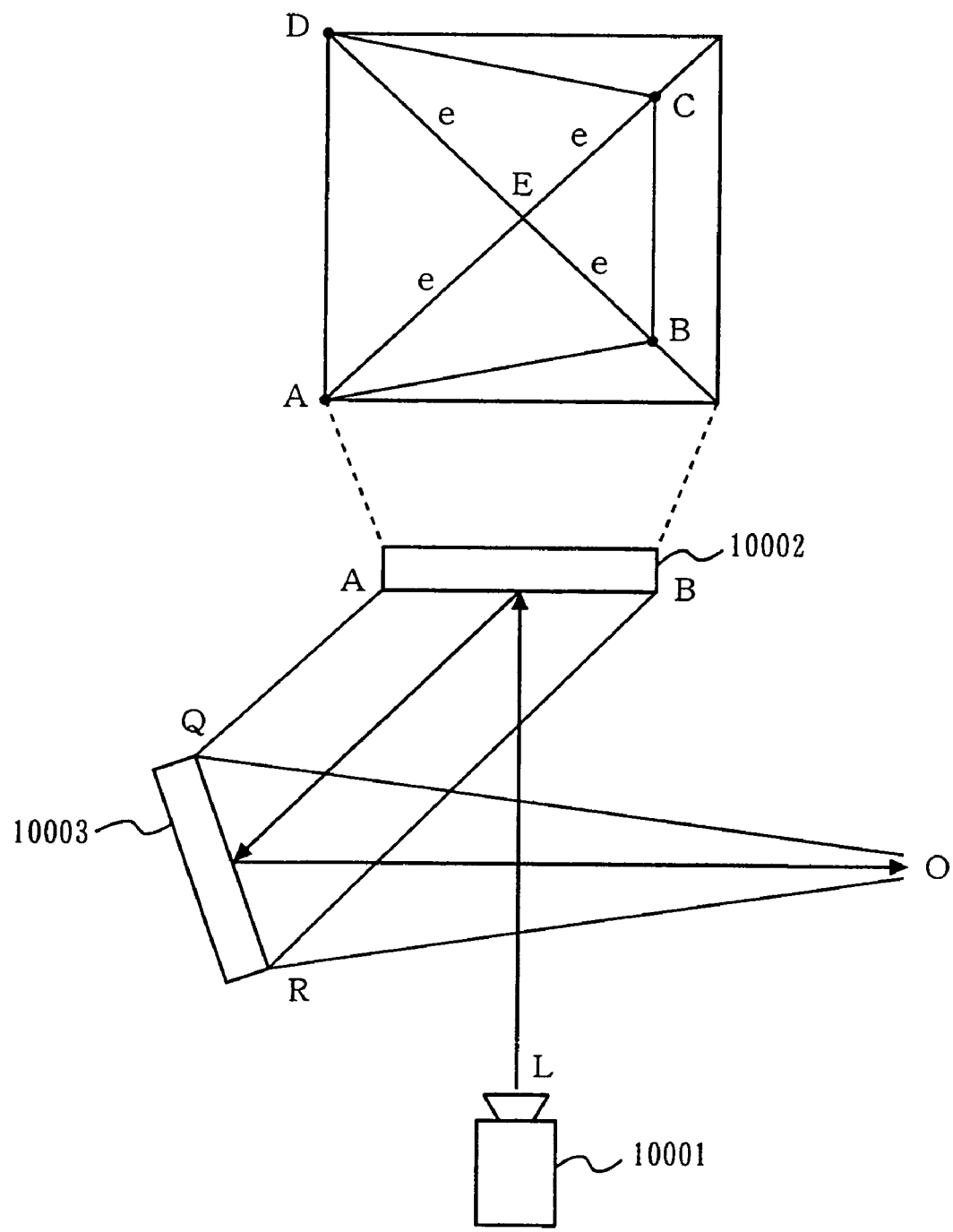
FIG. 52 is a schematic illustration showing an image deforming process which is performed when a reflecting member 100023 illustrated in FIG. 51 stands still at a reference position.

In the above-structured projector 10001, the image deforming unit performs a deforming process as described below. First, as illustrated in FIG. 52, in a case where the reflecting member 10003 stands still at the reference position, that is, the angle θ is zero, a display surface of the screen 10002 is taken as a quadrilateral having points A, B, C, and D, and a position of the viewer's eyes is taken as O. Then, the display surface of the screen 10002, after the reflecting member 10003 is rotated by the angle θ, is taken as a quadrilateral having points A', B', C', and D'. For the sake of convenience of description, it is assumed herein that the position of the viewer's eyes is not changed before and after rotation of the reflecting member 10003. Furthermore, optical distances from the viewing position O to the points A, B, A', and B' are taken as distances a, b, a', and b', respectively. Under such assumptions, a=AQ+QO, b=BR+RO, a'=A'Q'+Q'O, and b'=B'R'+R'O. Here, Q denotes an upper end of the image (light beam L) when the reflecting member 10003 is located at the reference position, while R denotes a lower end thereof. Also, Q' denotes an upper end of the image (light beam L) after the reflecting member 10003 is rotated by the angle θ, while R' denotes a lower end thereof.

Furthermore, when the image deforming unit 100025 does not deform the image and the projector 10001 is mounted vertically below the screen 10002, the image projected on the screen 10002 has a rectangular shape. However, there is a difference in optical path length between the screen 10002 and the reflecting member 10003. Therefore, when the projector 10001 projects the rectangular image on the screen 10002, a deformed image is recognized by the viewer. Here, a point of intersection between diagonal lines in the projected image is taken as E, and a distance between each vertex of the projected image and the point of intersection E is taken as a known e. Under such an assumption, when the rotation angle θ of the reflecting member 10003 is zero, the image deforming unit 10002 deforms the image obtained by the image obtaining unit 100024, as illustrated in FIG. 52. Specifically, in FIG. 52, BE=CE=(e×a/b) holds. Therefore, the image deforming unit 100025 deforms the obtained rectangular image to an image in which a distance between the points B and E and a distance between the points C and E are both (e×a/b).

Figure 53:
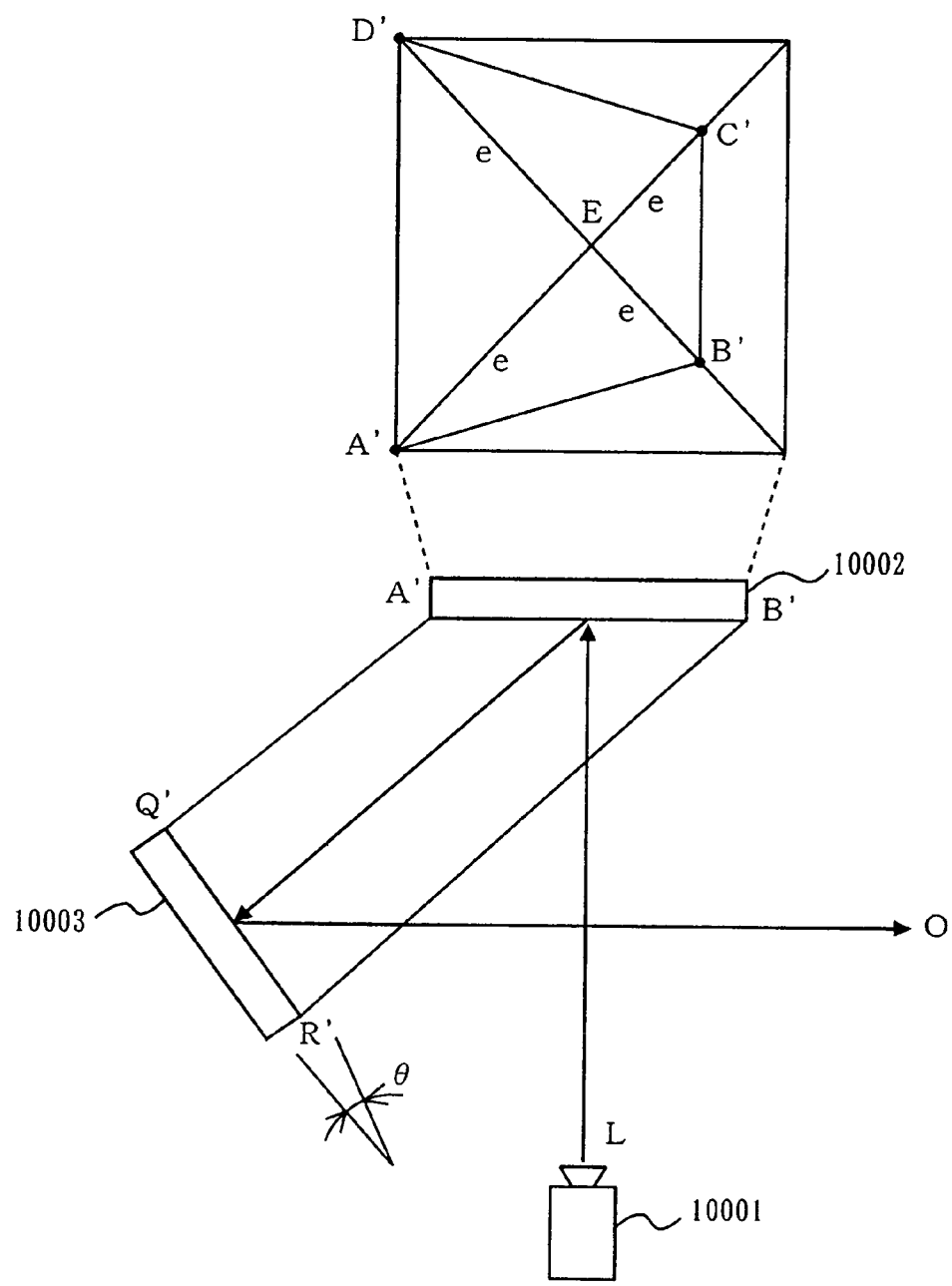
FIG. 53 is a schematic illustration showing an image deforming process which is performed when the reflecting member 100023 illustrated in FIG. 51 rotates.

Also, when the rotation angle θ of the reflecting member 10003 is other than zero, as illustrated in FIG. 53, the image deforming unit 100025 deforms the image obtained by the image obtaining unit 100024 to an image in which a distance between the points B' and E and a distance between the points C' and E are both (e×a'/b'). Here, the distances a' and b' are represented through a geometric operation only with the known a, b, and θ. Therefore, when the shape of the image with respect to the distances a and b when the reflecting member 10003 stands still at the reference position, the distance B'E (=C'E) is represented by a function of θ. Therefore, by obtaining the angle θ from the angle sensor 100023, the image deforming unit 100025 can deform the input image to an appropriate shape.

While the present invention has been described in detail, the foregoing description is in all aspects illustrative and not restrictive. It is to be understood that numerous other modifications and variations can be devised without departing from the scope of the present invention.

What is claimed is:

1. A display system comprising:
    a projector mounted inside a vehicle for emitting a light beam, which is generated based on an image signal;
    an exterior screen extendable toward an opening formed at a portion near a rear end of the vehicle and made of a material having low stiffness for displaying an image by allowing the light beam emitted by said projector to pass therethrough while being extended toward the opening;
    an interior screen mounted inside the vehicle for displaying an image by allowing the light beam emitted by said projector to pass therethrough or by reflecting the light beam; and
    a housing unit mounted on or near one of a rear hatch and a back door of the vehicle for accommodating said exterior screen;
    wherein said projector is operable to project the light beam selectively upon either said exterior screen or said interior screen.

2. The display system according to claim 1, further comprising a loudspeaker mounted on said housing unit for outputting sound based on an input sound signal.

3. The display system according to claim 2, further comprising an orientation setting mechanism for setting an orientation of said loudspeaker toward either one of the inside of the vehicle and the outside of the vehicle.

4. The display system according to claim 1, further comprising:
    a fixing member mounted on a portion near an end of said exterior screen for removably fixing said exterior screen near either one of the opening and ground; and
    an elastic member for providing said exterior screen with tension from an end of said exterior screen toward said housing unit.

5. The display system according to claim 1, wherein said projector is mounted at a mounting position on one of a ceiling of the vehicle and a back surface of a rear seat included in the vehicle.

6. The display system according to claim 5, wherein said projector is operable to emit the light beam toward said exterior screen while a back rest of the rear seat is tilted toward the front of the vehicle.

7. The display system according to claim 5, further comprising a reflecting member for reflecting the light beam emitted from the projector toward the exterior screen, wherein:
    the mounting position of said projector is on a back surface of a rear seat included in the vehicle; and
    said projector is operable to emit the light beam from the mounting position on the back surface of the rear seat toward said reflecting member.

8. The display system according to claim 1, wherein:
    said interior screen is mounted near a front seat of the vehicle; and
    said display system further comprises a reflecting member for reflecting the light beam emitted by said projector toward either one of said exterior screen and said interior screen; and
    either one of said exterior screen and said interior screen to which the light beam enters is operable to diffuse the light beam reflected by said reflecting member for displaying the image.

9. The display system according to claim 1, wherein:
    said interior screen is mounted near a front seat of the vehicle for displaying an image by reflecting the light beam emitted by said projector; and
    said display system further comprises a reflecting member mounted on a rear surface of said interior screen for reflecting the light beam emitted by said projector toward said interior screen while said interior screen is changed in position.

10. The display system according to claim 1, further comprising a reflecting member mounted near a front seat of the vehicle for reflecting the light beam emitted by said projector toward said exterior screen;
    wherein said interior screen is mounted on a rear surface of said reflecting member and is operable to reflect the light beam emitted by said projector for displaying an image while said reflecting member is changed in position.

11. The display system according to claim 8, wherein said projector is mounted to a rear seat of the vehicle, and is operable to emit, in accordance with a state of the rear seat, the light beam toward either said exterior screen or said interior screen.

12. The display system according to claim 8, further comprising at least one additional interior screen mounted near the front seat of the vehicle.

13. The display system according to claim 9, further comprising at least one additional interior screen mounted near the front seat of the vehicle for displaying the image by reflecting the light beam emitted by said projector.

14. The display system according to claim 10, further comprising at least one additional interior screen mounted near the front seat of the vehicle for reflecting the light beam emitted by said projector toward said exterior screen.

15. A display system comprising:
   a projector mounted inside a vehicle for emitting a light beam generated based on an image signal;
   a screen mounted inside the vehicle for displaying an image by reflecting the light beam emitted by said projector;
   a supporting member for rotatably supporting said screen;
   a reflecting member mounted inside the vehicle for reflecting the light beam reflected by said screen toward a rear seat of the vehicle; and
   a detector for detecting a rotation angle of said screen;
   wherein said projector includes:
      an image deforming unit for deforming the image based on the rotation angle detected by said detector and a position of said screen; and
      an optical system for generating a light beam based on the image deformed by said image deforming unit and emitting the light beam.

* * * * *